US012598212B2

(12) United States Patent
Shete et al.

(10) Patent No.: US 12,598,212 B2
(45) Date of Patent: Apr. 7, 2026

(54) CYBERSECURITY RISK ANALYSIS AND MODELING OF RISK DATA ON AN INTERACTIVE DISPLAY

(71) Applicant: Zscaler, Inc., San Jose, CA (US)

(72) Inventors: Shriyash Shete, Bloomington, IN (US); Chakkaravarthy Periyasamy Balaiah, San Jose, CA (US); Karthikeyan Thamilarasu, Cumming, GA (US); Deepen Desai, San Ramon, CA (US); Rubin Azad, San Jose, CA (US); Jithin Prajeev Nair, San Jose, CA (US); Raj Krishna, San Jose, CA (US)

(73) Assignee: Zscaler, Inc., San Jose, CA (US)

( * ) Notice: Subject to any disclaimer, the term of this patent is extended or adjusted under 35 U.S.C. 154(b) by 266 days.

(21) Appl. No.: 18/365,371

(22) Filed: Aug. 4, 2023

(65) Prior Publication Data

US 2024/0039954 A1     Feb. 1, 2024

Related U.S. Application Data

(63) Continuation-in-part of application No. 18/332,133, filed on Jun. 9, 2023, which is a continuation-in-part
(Continued)

(30) Foreign Application Priority Data

Nov. 23, 2021     (IN) .............................. 202111053875

(51) Int. Cl.
H04L 9/40          (2022.01)
G06F 3/048         (2013.01)
(52) U.S. Cl.
CPC ...... H04L 63/1491 (2013.01); H04L 63/1416 (2013.01); H04L 63/1425 (2013.01); G06F 3/048 (2013.01)

(58) Field of Classification Search
CPC ............. H04L 63/1491; H04L 63/1416; H04L 63/1425
See application file for complete search history.

(56) References Cited

U.S. PATENT DOCUMENTS 10,142,362 B2    11/2018  Weith et al.
10,419,477 B2     9/2019  Desai et al.
(Continued)

FOREIGN PATENT DOCUMENTS

CN          111 641 620 A       9/2020

OTHER PUBLICATIONS

Mar. 20, 2023, Extended European Search Report issued for European Patent Application No. EP 22 19 3125.

*Primary Examiner* — Nicholas Augustine
(74) *Attorney, Agent, or Firm* — Baratta Law PLLC; Lawrence A. Baratta, Jr.

(57) ABSTRACT

Systems and methods are provided for performing risk assessment activities and preparing attained risk data for display on one or more user interfaces. In one implementation, a method may include the step of detecting one or more cybersecurity risk factors associated with an organization to determine a risk posture of the organization. The method may further include the step of attaining one or more remediation recommendations for enabling a person associated with the organization to select one or more actions for mitigating the one or more cybersecurity risk factors and improving the risk posture of the organization. Then, the method is configured to communicate display information to a user device associated with the organization, the display information including at least the one or more cybersecurity risk factors and the one or more remediation recommendations to be exhibited on a Graphical User Interface (GUI) of the user device.

20 Claims, 50 Drawing Sheets

Related U.S. Application Data of application No. 17/724,625, filed on Apr. 20, 2022, which is a continuation of application No. 17/571, 460, filed on Jan. 8, 2022, now Pat. No. 12,107,889.

(60) Provisional application No. 63/507,958, filed on Jun. 13, 2023.

(56) References Cited

U.S. PATENT DOCUMENTS

| | | | | |
|---|---|---|---|---|
| 10,498,605 B2 | 12/2019 | Weith et al. | | |
| 10,521,584 B1 * | 12/2019 | Sharifi Mehr | ...... | H04L 63/1433 |
| 10,855,722 B1 | 12/2020 | Vadlamani | | |
| 11,997,115 B1 * | 5/2024 | Higbee | ............ | G06F 16/35 |
| 12,107,888 B2 * | 10/2024 | Wu | ............ | H04L 63/1425 |
| 2016/0301705 A1 * | 10/2016 | Higbee | ............ | H04L 51/42 |
| 2017/0214707 A1 * | 7/2017 | Grubel | ............ | G06F 21/564 |
| 2017/0223052 A1 * | 8/2017 | Stutz | ............ | H04L 63/1491 |
| 2018/0032736 A1 * | 2/2018 | Inagaki | ............ | G06F 3/04817 |
| 2019/0281073 A1 | 9/2019 | Weith et al. | | |
| 2019/0319972 A1 | 10/2019 | Desai | | |
| 2020/0244699 A1 * | 7/2020 | Hutchinson | ......... | H04L 63/1466 |
| 2020/0320192 A1 | 10/2020 | Ma et al. | | |
| 2020/0329067 A1 * | 10/2020 | Dani | ............ | H04L 63/1416 |
| 2020/0329070 A1 * | 10/2020 | Dani | ............ | H04L 63/1433 |
| 2020/0351306 A1 * | 11/2020 | Nedbal | ............ | H04L 63/20 |
| 2020/0410001 A1 * | 12/2020 | Sarkissian | ............ | G06F 3/0482 |
| 2021/0021612 A1 * | 1/2021 | Higbee | ............ | H04L 63/1416 |
| 2021/0058428 A1 | 2/2021 | Arlitt et al. | | |
| 2021/0105289 A1 | 4/2021 | Desai et al. | | |
| 2021/0192043 A1 | 6/2021 | Bhary et al. | | |
| 2021/0344693 A1 | 11/2021 | Azad et al. | | |
| 2024/0039954 A1 * | 2/2024 | Shete | ............ | H04L 63/1425 |
| 2024/0098100 A1 * | 3/2024 | Lal | ............ | H04L 63/1491 |
| 2024/0163312 A1 * | 5/2024 | Azad | ............ | H04L 63/20 |

* cited by examiner

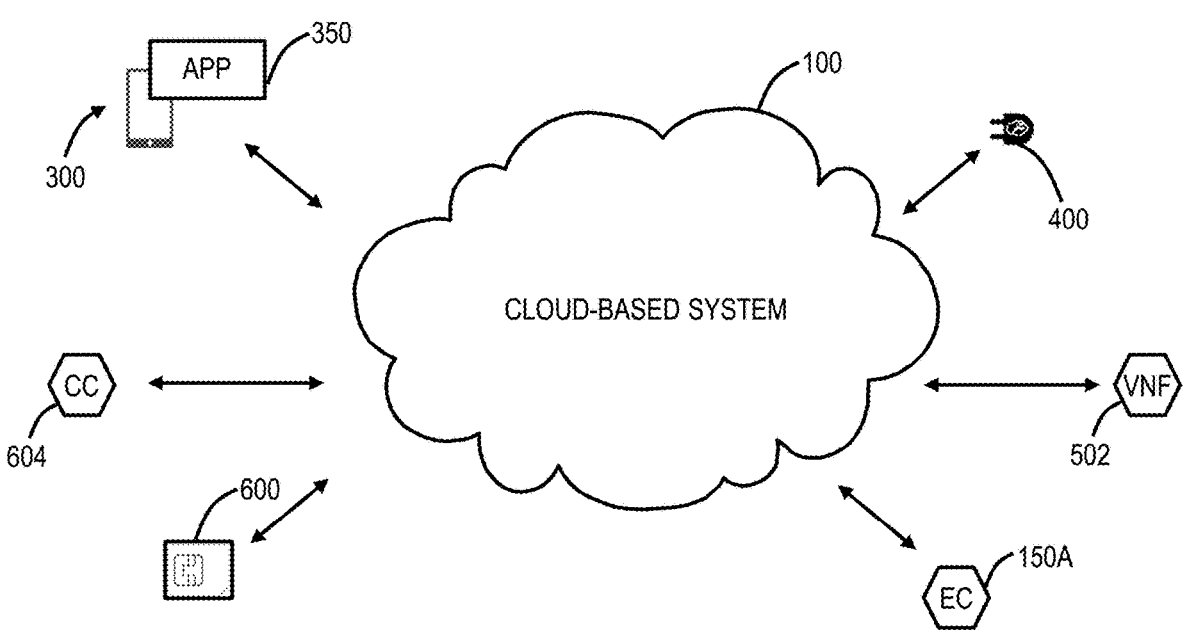
FIG. 9
SIGNATURES
ACCURATE, BUT THREAT
SPECIFIC AND EVADABLE
BEHAVIORS
BROAD, BUT PRONE
TO FALSE POSITIVES
DECEPTION
HIGHLY ACCURATE
AND BROAD COVERAGE
FIG. 10

Figure 13:
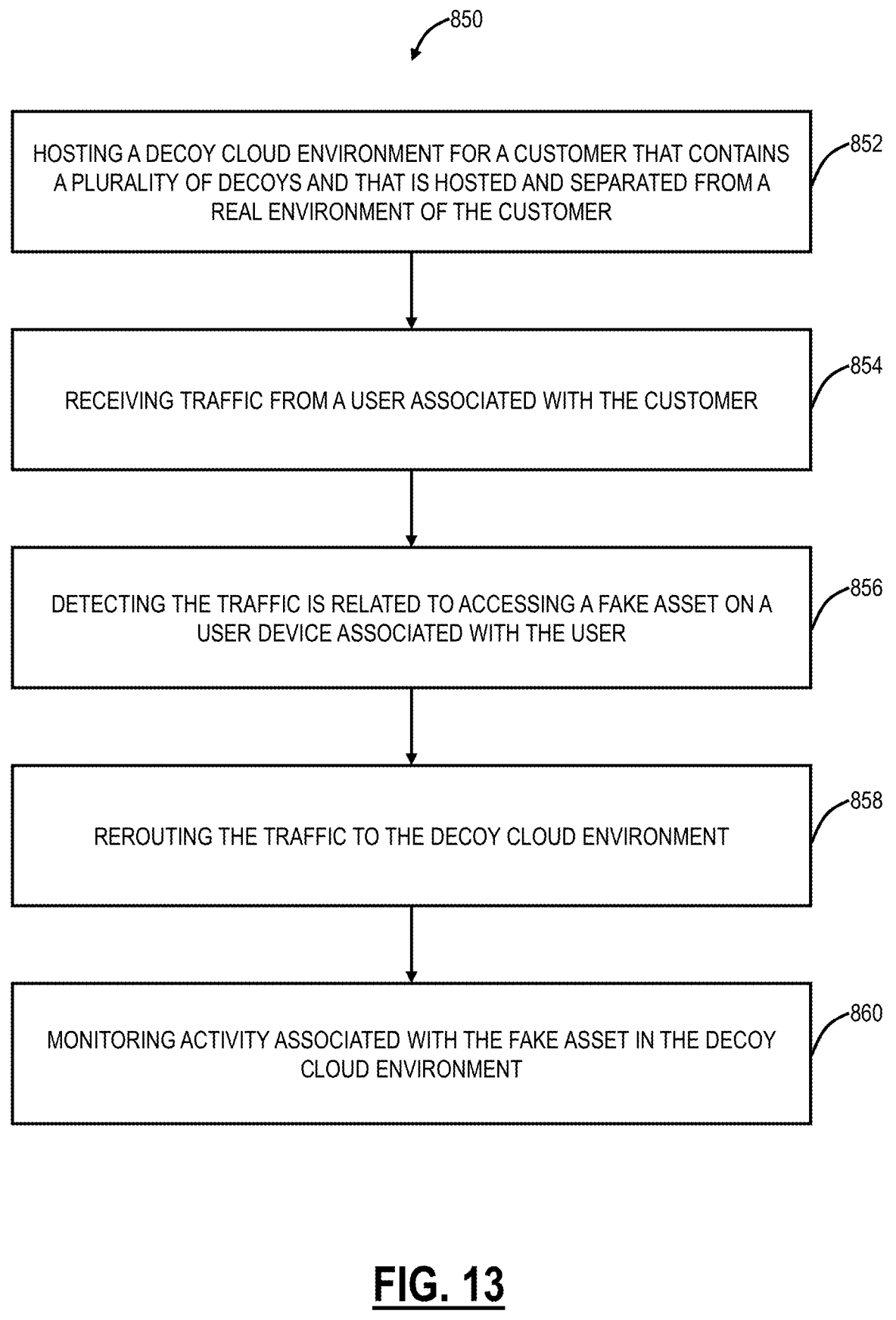

850

| |
|---|
| HOSTING A DECOY CLOUD ENVIRONMENT FOR A CUSTOMER THAT CONTAINS A PLURALITY OF DECOYS AND THAT IS HOSTED AND SEPARATED FROM A REAL ENVIRONMENT OF THE CUSTOMER |

852

| |
|---|
| RECEIVING TRAFFIC FROM A USER ASSOCIATED WITH THE CUSTOMER |

854

| |
|---|
| DETECTING THE TRAFFIC IS RELATED TO ACCESSING A FAKE ASSET ON A USER DEVICE ASSOCIATED WITH THE USER |

856

| |
|---|
| REROUTING THE TRAFFIC TO THE DECOY CLOUD ENVIRONMENT |

858

| |
|---|
| MONITORING ACTIVITY ASSOCIATED WITH THE FAKE ASSET IN THE DECOY CLOUD ENVIRONMENT |

Figure 15:
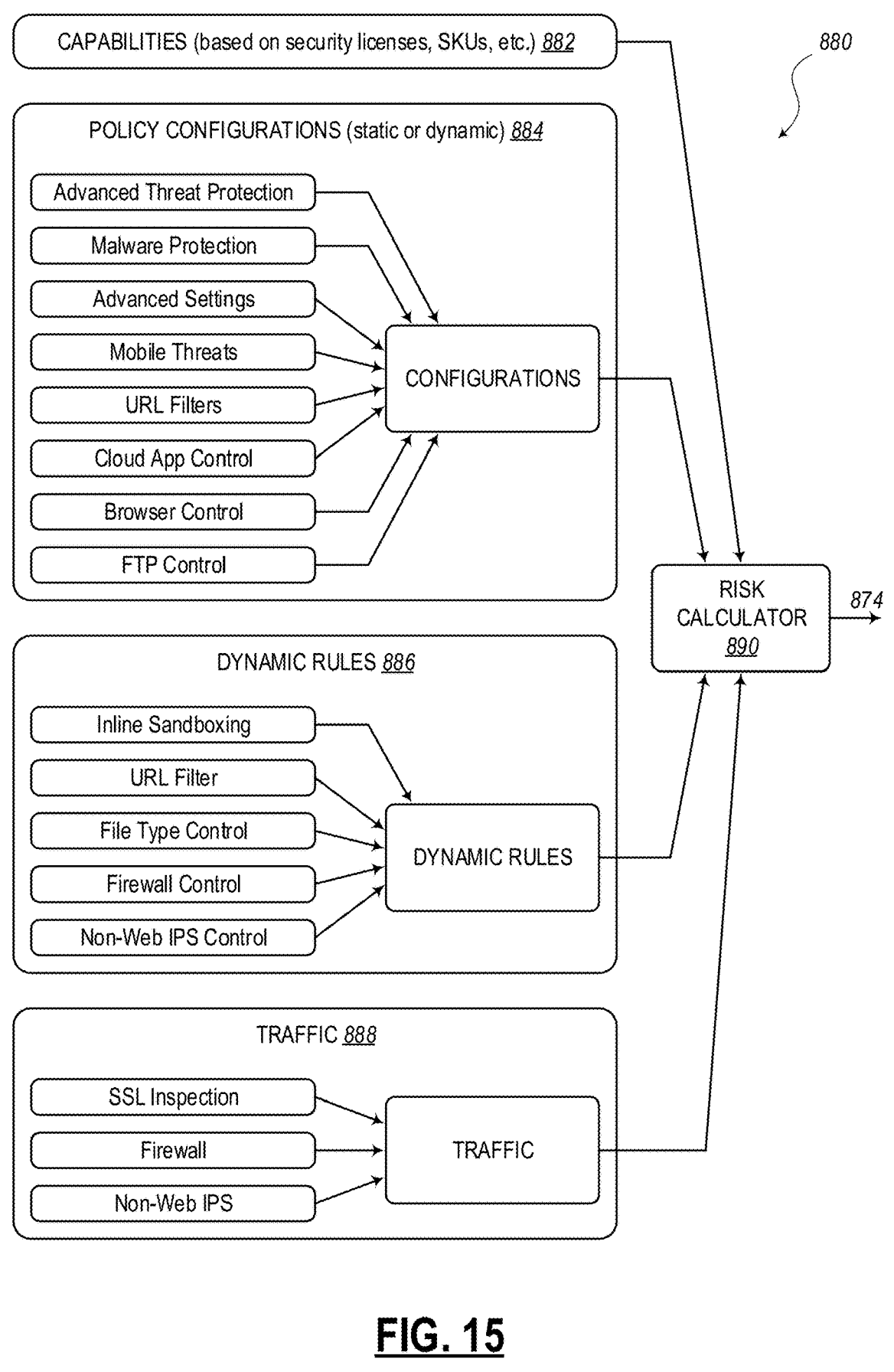

CAPABILITIES (based on security licenses, SKUs, etc.) _882_

_880_

POLICY CONFIGURATIONS (static or dynamic) _884_

- Advanced Threat Protection
- Malware Protection
- Advanced Settings
- Mobile Threats
- URL Filters
- Cloud App Control
- Browser Control
- FTP Control

CONFIGURATIONS

DYNAMIC RULES _886_

- Inline Sandboxing
- URL Filter
- File Type Control
- Firewall Control
- Non-Web IPS Control

DYNAMIC RULES

TRAFFIC _888_

- SSL Inspection
- Firewall
- Non-Web IPS

TRAFFIC

RISK CALCULATOR _890_

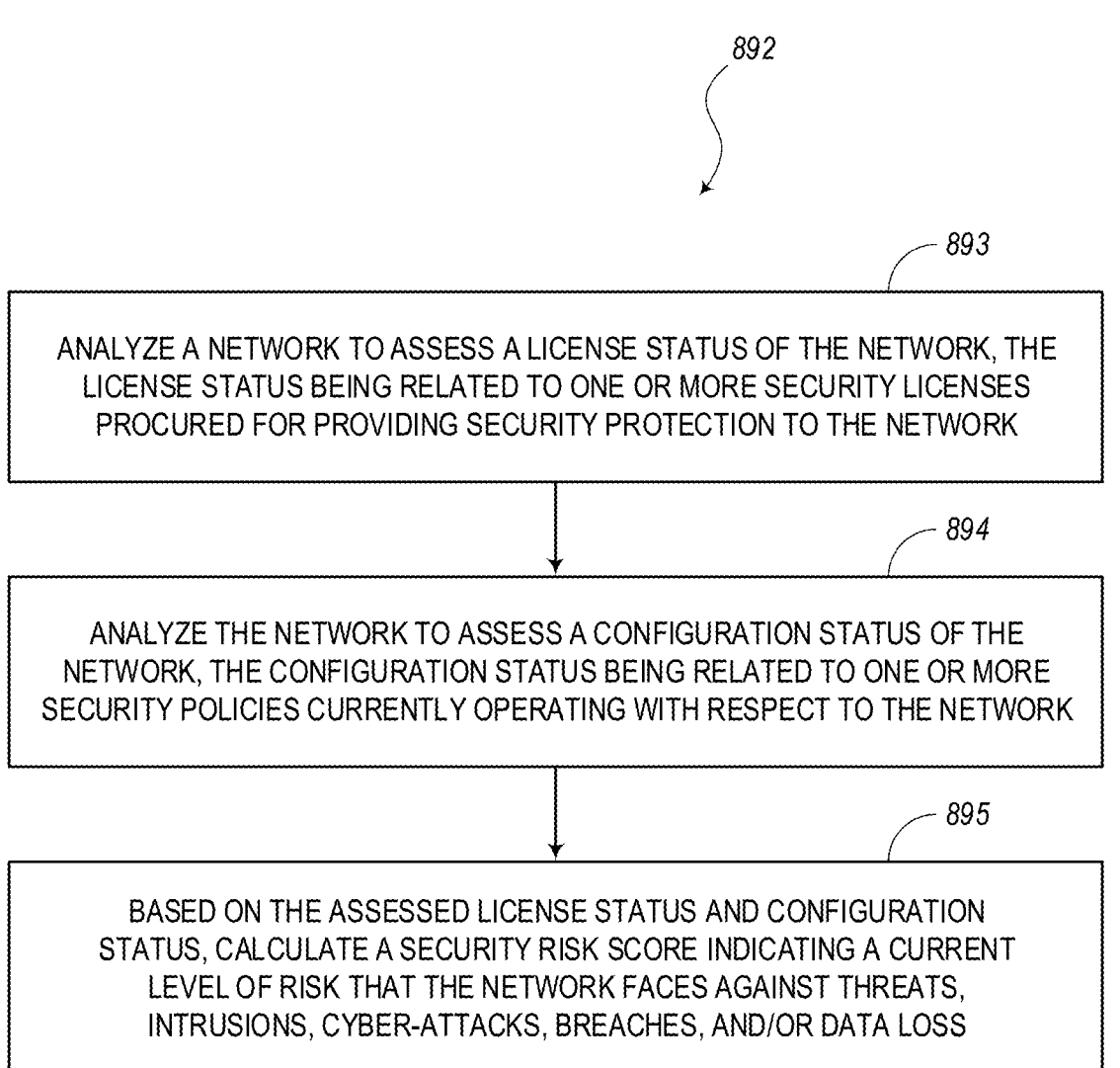

892

893

ANALYZE A NETWORK TO ASSESS A LICENSE STATUS OF THE NETWORK, THE LICENSE STATUS BEING RELATED TO ONE OR MORE SECURITY LICENSES PROCURED FOR PROVIDING SECURITY PROTECTION TO THE NETWORK

894

ANALYZE THE NETWORK TO ASSESS A CONFIGURATION STATUS OF THE NETWORK, THE CONFIGURATION STATUS BEING RELATED TO ONE OR MORE SECURITY POLICIES CURRENTLY OPERATING WITH RESPECT TO THE NETWORK

895

BASED ON THE ASSESSED LICENSE STATUS AND CONFIGURATION STATUS, CALCULATE A SECURITY RISK SCORE INDICATING A CURRENT LEVEL OF RISK THAT THE NETWORK FACES AGAINST THREATS, INTRUSIONS, CYBER-ATTACKS, BREACHES, AND/OR DATA LOSS

FIG. 16

Org Name: Customer X (Medium)

Org ID: #########
Risk Score: 39/100
Risk Level: Medium

Policies & Configuration: 27
Management Settings: 12

Policies & Configuration Details
- Advanced Settings: Medium
  - Block Tunneling to Non-HTTP/HTTPS Ports: Disabled
  - Block Non-RFC Compliant HTTP Traffic on HTTP/HTTPS Ports: Disabled
  - Allow Cascading to URL Filtering: Disabled
  - Override Zscaler Global SSL Exemptions List: Disabled
  - Log Internal IPs from XFF Headers: Disabled
- Advanced Threat Protection: Low
  - SSH Tunnel: Enabled
- URL Filtering Policy: Critical
  - Enable Newly Registered Domain Lookup: Disabled
  - You are not blocking "Misc" URL category
- FTP Control Policy: Critical
  - Enable FTP: True
  - Enable FtpOverHttp: True
- Malware Protection Policy: Critical
  - Download of Password-Protected Files: Allowed
  - Download of Unscannable Files: Allowed
- Mobile Malware Protection Policy: Medium
  - Sending Unencrypted User Credentials: Allowed
  - Sending Location Information: Allowed
  - Sending Personally Identifiable Information: Allowed
  - Sending Device Identifiers: Allowed
  - Communication with Ad Servers: Allowed
  - Communication with Unknown Servers: Allowed p. 1

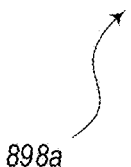

- Browser Control Policy: Critical
  - Bypass All Browsers: True
  - Allow All Browsers: True
  - Enable Warnings: False
- Cloud Sandbox: Low
  - DLLs: "Allow & Scan" if DLLs are downloaded from URL categories other than suspicious ones -> Does not protect from all destination types
- SSL Inspection Policy: Medium
  - Block Undecryptable Traffic : False
  - Revoked Server Certificates: Pass-Through
- Inline DLP Protection: Critical
  - All DLP rules are set to "Allowed"

Management Settings Details

- Unauthenticated Traffic: Critical
  - Unauthenticated Traffic > 90%
- SSL Inspected Traffic: Critical
  - Uninspected SSL Traffic > 90%
- Traffic not protected by Firewall: None
  - All locations with traffic have Firewall enabled
- Traffic not protected by IPS: None
  - All locations with traffic have IPS enabled p. 2

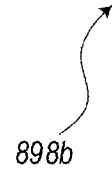

| Policy Impact Score | Max Score |
|---|---|
| Global Settings | 53.25 |
| Advanced Threat Protection | 16 |
| Malware Protection | 13.5 (virus 2 + spyware 11.5) |
| Advanced Settings | 7.5 |
| Mobile Malware Settings | 7 |
| Advanced URL Filtering & Cloud App Settings | 5 |
| Browser Control Settings | 3.25 |
| FTP Settings | 1 |
| Rule-Based Policies | 29.75 |
| URLF Rules (dynamic) | 8.75 |
| Sandbox Rules (dynamic) | 6 |
| SSL Rules | 5 |
| File Type Rules | 3 |
| Firewall IPS Rules (default) | 3.5 |
| Firewall Filtering Rules (default) | 3.5 |
| Max Possible Score | 78 |

| Traffic Impact | Max Score |
|---|---|
| SSL | 8.50 |
| Firewall | 6.75 |
| Intrusion Prevention | 6.75 |
| Max Possible Score | 22.00 |

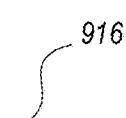

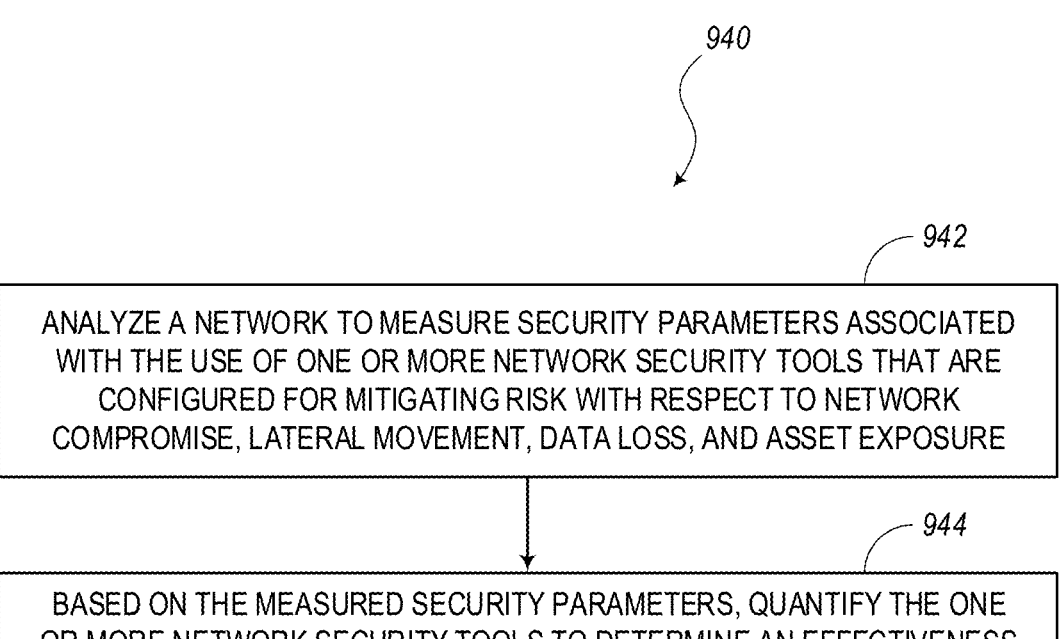

_940_

_942_

ANALYZE A NETWORK TO MEASURE SECURITY PARAMETERS ASSOCIATED WITH THE USE OF ONE OR MORE NETWORK SECURITY TOOLS THAT ARE CONFIGURED FOR MITIGATING RISK WITH RESPECT TO NETWORK COMPROMISE, LATERAL MOVEMENT, DATA LOSS, AND ASSET EXPOSURE

_944_

BASED ON THE MEASURED SECURITY PARAMETERS, QUANTIFY THE ONE OR MORE NETWORK SECURITY TOOLS TO DETERMINE AN EFFECTIVENESS SCORE DEFINING AN ABILITY OF THE ONE OR MORE NETWORK SECURITY TOOLS, IN COMBINATION, TO COUNTERACT THE NEWORK COMPROMISE, LATERAL MOVEMENT, DATA LOSS, AND ASSET EXPOSURE

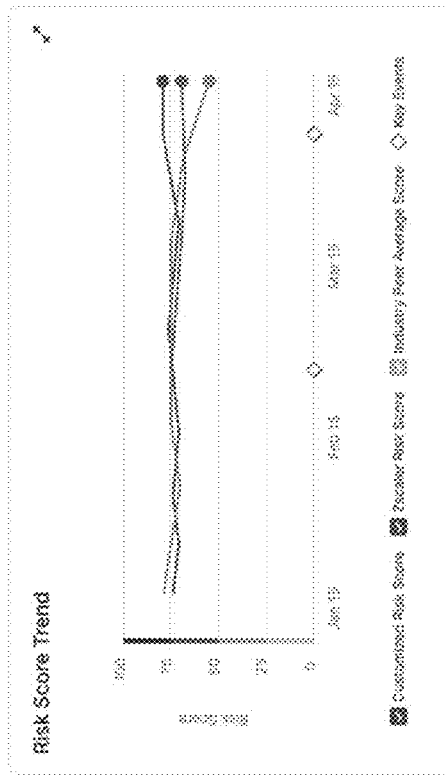
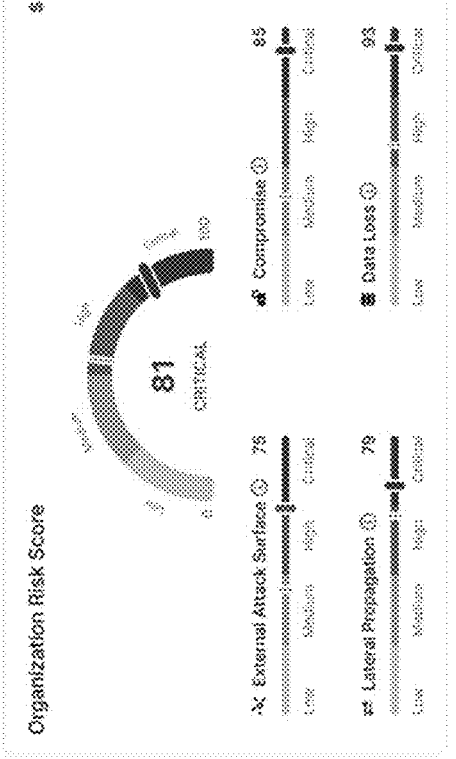
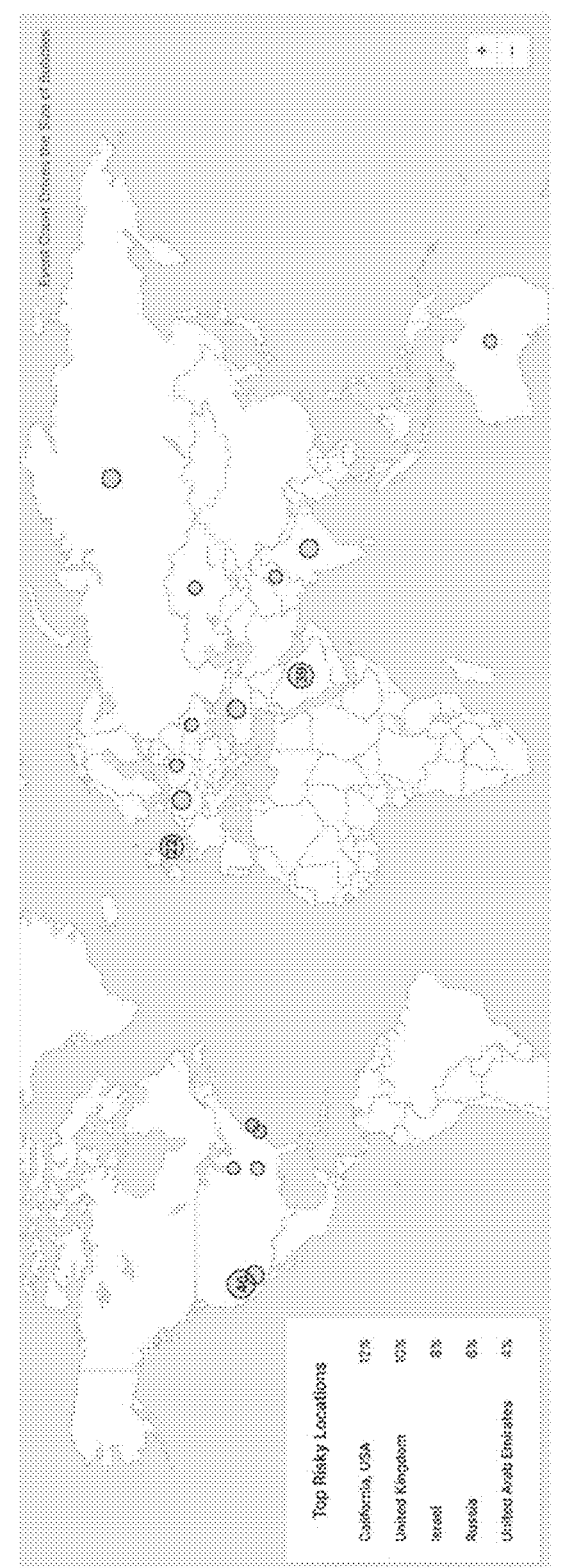
FIG. 26

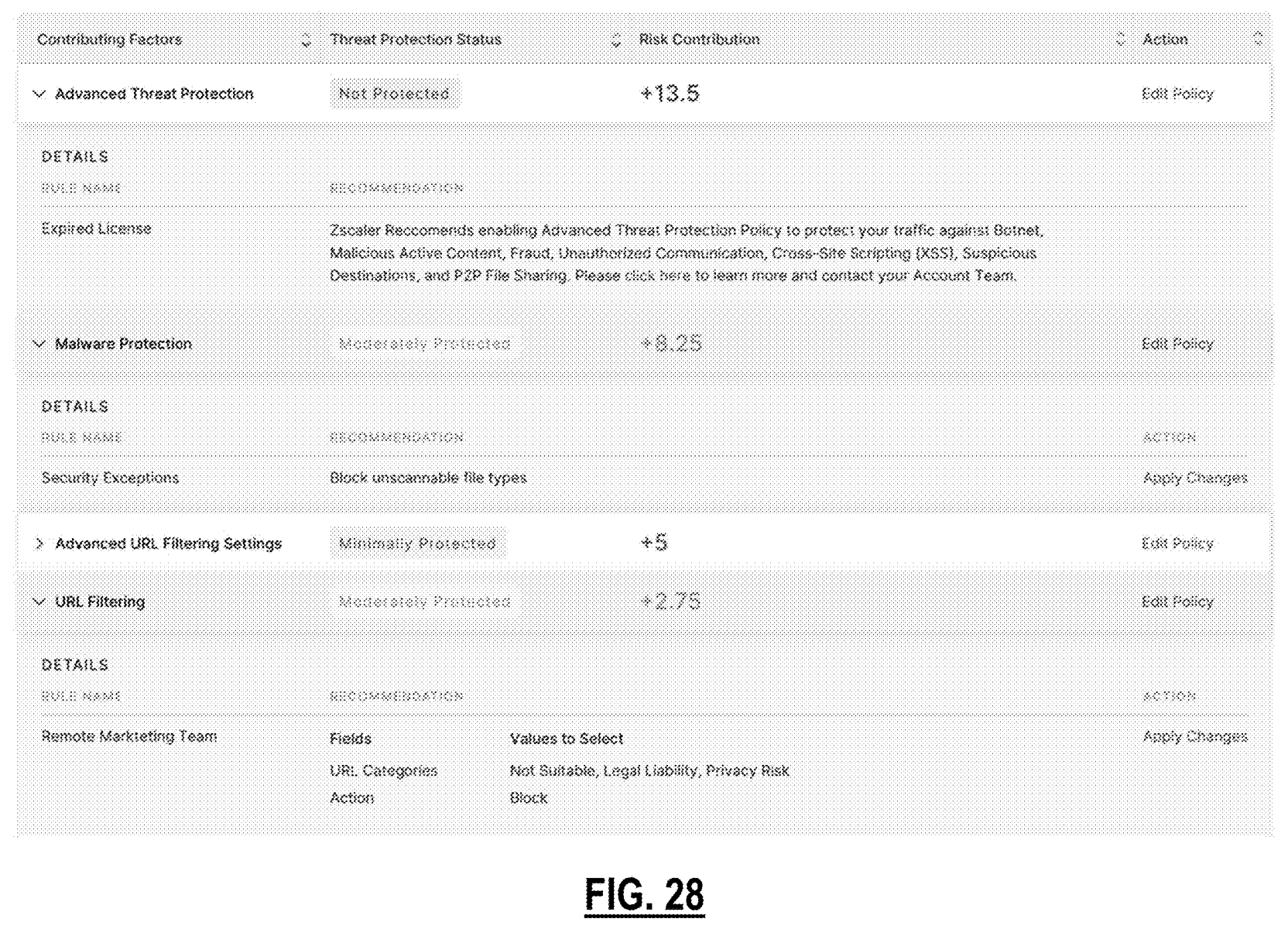

| Contributing Factors | Threat Protection Status | Risk Contribution | Action |
|---|---|---|---|
| ∨ Advanced Threat Protection | Not Protected | +13.5 | Edit Policy |
| DETAILS | | | |
| RULE NAME | | | |
| Expired License | | Zscaler reccomends enabling Advanced Threat Protection Policy to protect your traffic against Botnet, Malicious Active Content, Fraud, Unauthorized Communication, Cross-Site Scripting (XSS), Suspicious Destinations, and P2P File Sharing. Please click here to learn more and contact your Account Team. | |
| ∨ Malware Protection | Moderately Protected | +8.25 | Edit Policy |
| DETAILS | | | |
| RULE NAME | | | ACTION |
| Security Exceptions | Block unscannable file types | | Apply Changes |
| ∧ Advanced URL Filtering Settings | Minimally Protected | +5 | Edit Policy |
| ∨ URL Filtering | Moderately Protected | +2.75 | Edit Policy |
| DETAILS | | | |
| RULE NAME | Fields | Values to Select | |
| Remote Marketing Team | URL Categories | Not Suitable, Legal Liability, Privacy Risk | |
| | Action | Block | Apply Changes |

FIG. 28

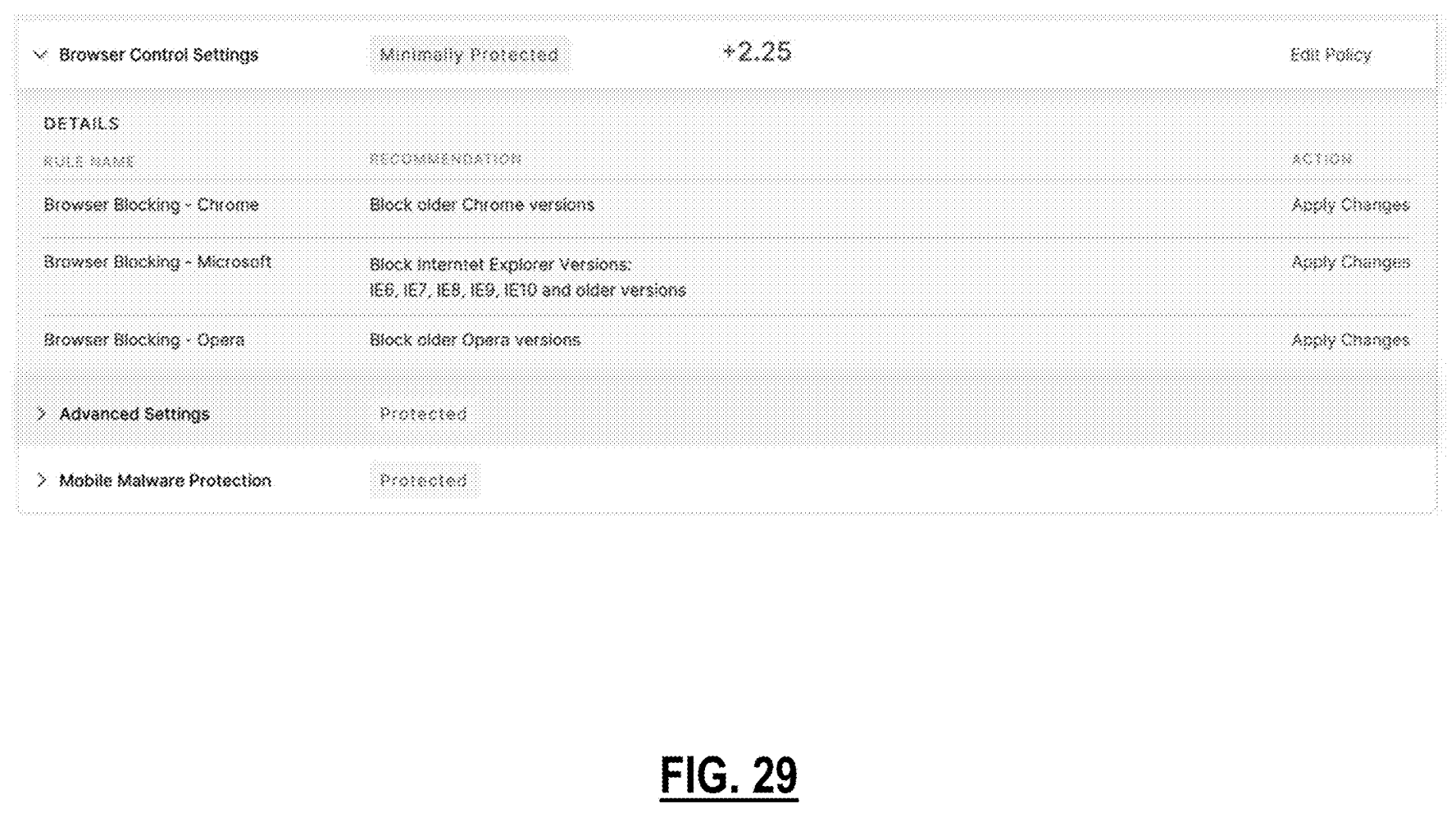

∨ Browser Control Settings

Minimally Protected        +2.25        Edit Policy

DETAILS

RULE NAME        RECOMMENDATION        ACTION

Browser Blocking - Chrome        Block older Chrome versions        Apply Changes Browser Blocking - Microsoft        Block Internet Explorer Versions:
IE6, IE7, IE8, IE9, IE10 and older versions        Apply Changes Browser Blocking - Opera        Block older Opera versions        Apply Changes ∨ Advanced Settings        Protected ∧ Mobile Malware Protection        Protected

FIG. 29

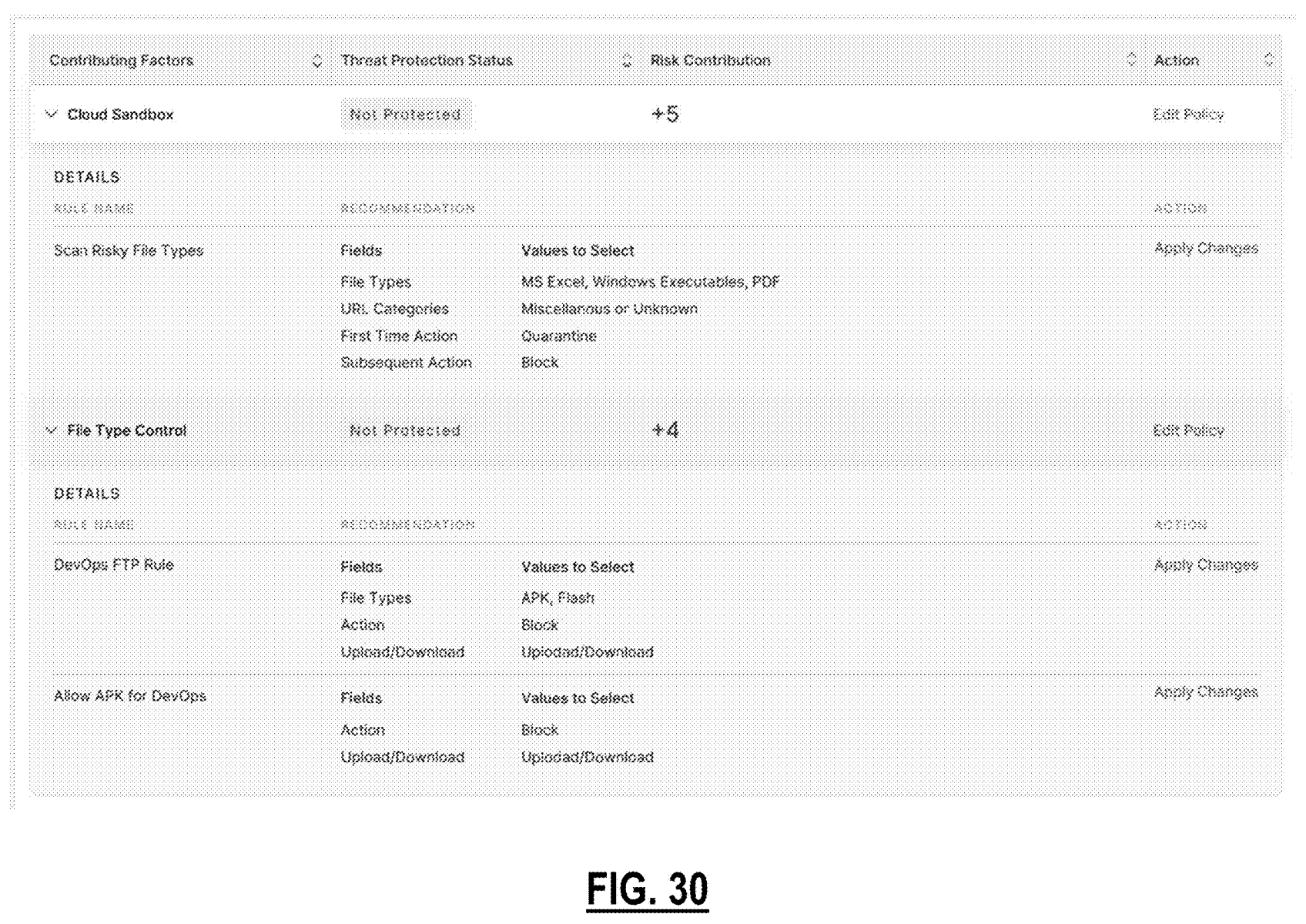

| Contributing Factors | Threat Protection Status | Risk Contribution | Action |
|---|---|---|---|
| ∨ Cloud Sandbox | Not Protected | +5 | Edit Policy |
| DETAILS | | | |
| RULE NAME | RECOMMENDATION | | ACTION |
| Scan Risky File Types | Fields | Values to Select | Apply Changes |
| | File Types | MS Excel, Windows Executables, PDF | |
| | URL Categories | Miscellaneous or Unknown | |
| | First Time Action | Quarantine | |
| | Subsequent Action | Block | |
| ∨ File Type Control | Not Protected | +4 | Edit Policy |
| DETAILS | | | |
| RULE NAME | RECOMMENDATION | | ACTION |
| DevOps FTP Rule | Fields | Values to Select | Apply Changes |
| | File Types | APK, Flash | |
| | Action | Block | |
| | Upload/Download | Upload/Download | |
| Allow APK for DevOps | Fields | Values to Select | Apply Changes |
| | Action | Block | |
| | Upload/Download | Upload/Download | |

FIG. 30

Figure 31:
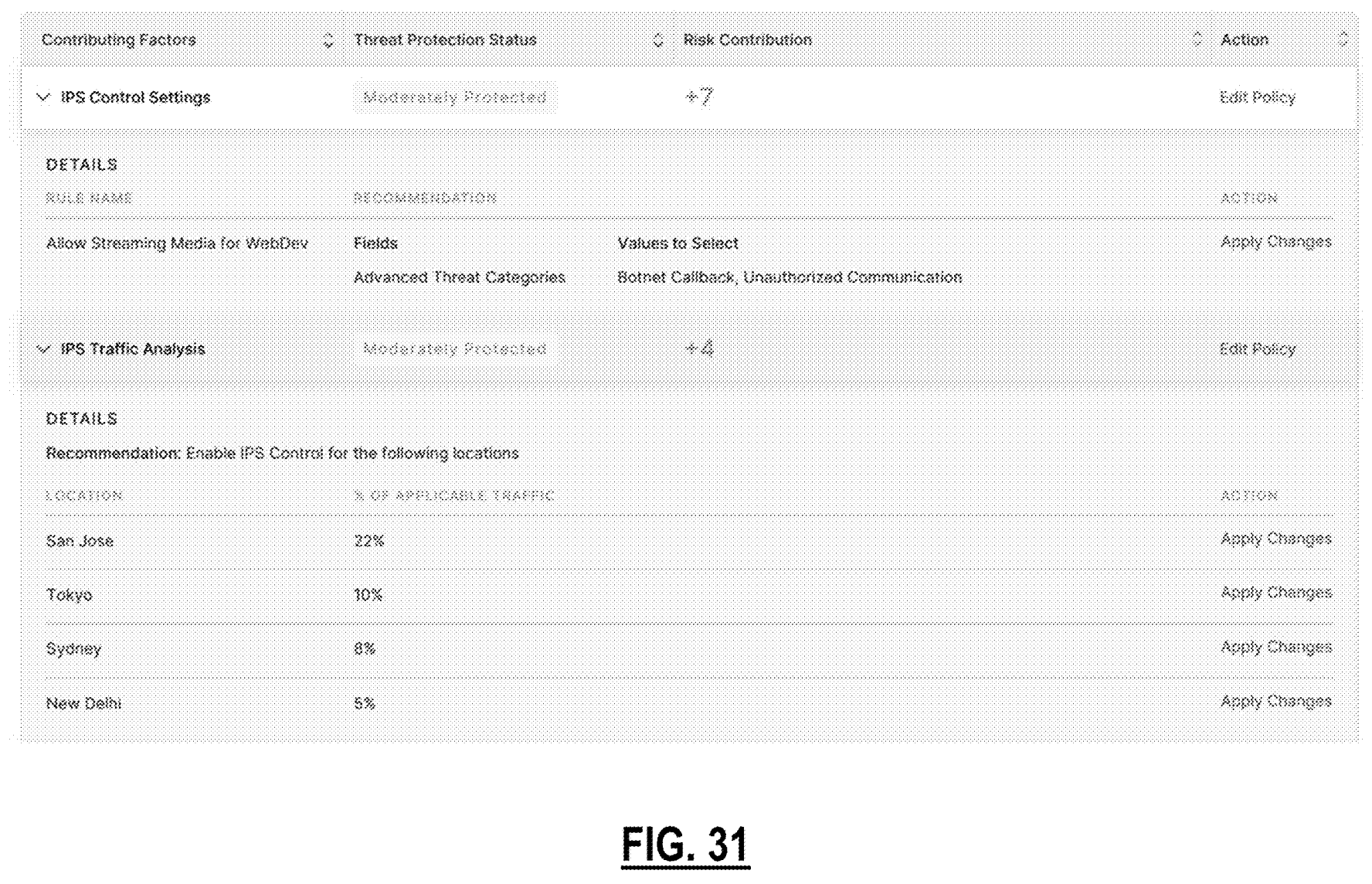

| Contributing Factors | Threat Protection Status | Risk Contribution | Action |
|---|---|---|---|
| ∨ IPS Control Settings | Moderately Protected | +7 | Edit Policy |

DETAILS

| RULE NAME | RECOMMENDATION | | ACTION |
|---|---|---|---|
| Allow Streaming Media for WebDev | Fields | Values to Select | Apply Changes |
| | Advanced Threat Categories | Botnet Callback, Unauthorized Communication | |

| ∨ IPS Traffic Analysis | Moderately Protected | +4 | Edit Policy |

DETAILS

Recommendation: Enable IPS Control for the following locations

| LOCATION | % OF APPLICABLE TRAFFIC | | ACTION |
|---|---|---|---|
| San Jose | 32% | | Apply Changes |
| Tokyo | 10% | | Apply Changes |
| Sydney | 8% | | Apply Changes |
| New Delhi | 5% | | Apply Changes |

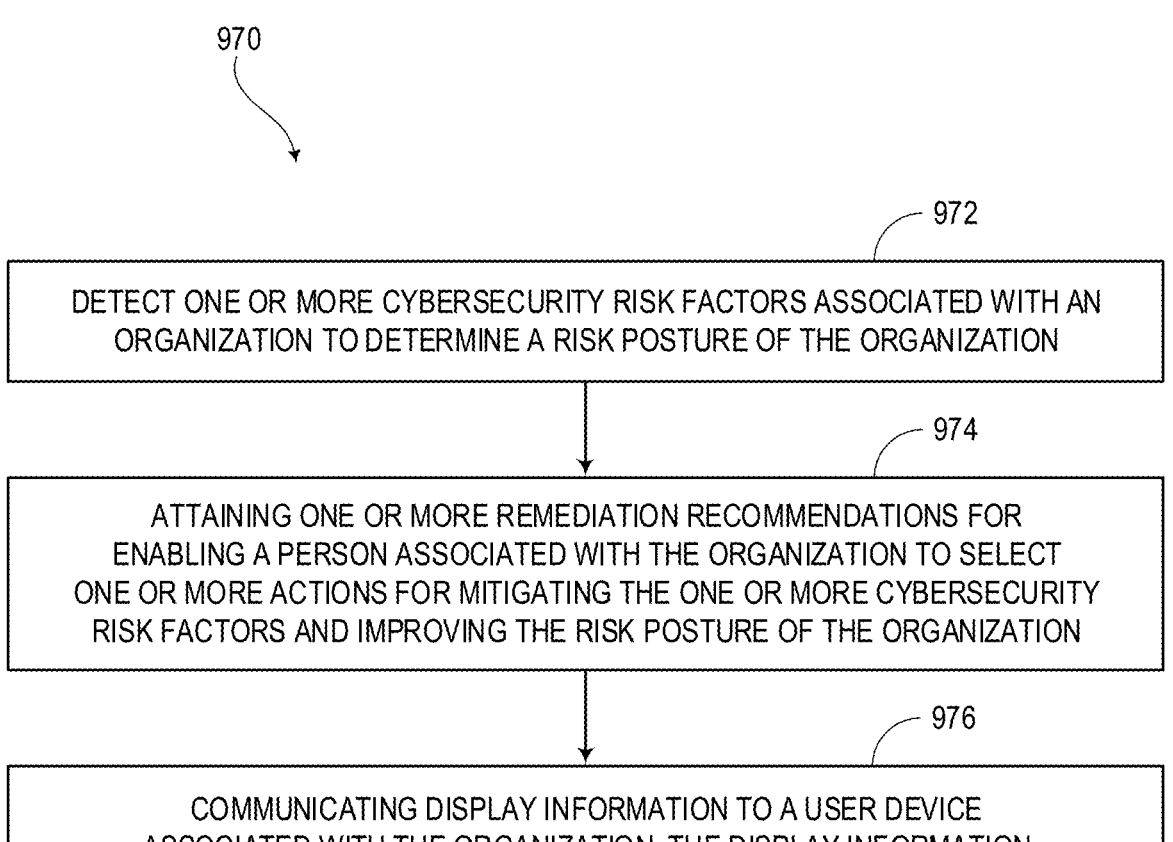

970

972

DETECT ONE OR MORE CYBERSECURITY RISK FACTORS ASSOCIATED WITH AN ORGANIZATION TO DETERMINE A RISK POSTURE OF THE ORGANIZATION

974

ATTAINING ONE OR MORE REMEDIATION RECOMMENDATIONS FOR ENABLING A PERSON ASSOCIATED WITH THE ORGANIZATION TO SELECT ONE OR MORE ACTIONS FOR MITIGATING THE ONE OR MORE CYBERSECURITY RISK FACTORS AND IMPROVING THE RISK POSTURE OF THE ORGANIZATION

976

COMMUNICATING DISPLAY INFORMATION TO A USER DEVICE ASSOCIATED WITH THE ORGANIZATION, THE DISPLAY INFORMATION INCLUDING AT LEAST THE ONE OR MORE CYBERSECURITY RISK FACTORS AND THE ONE OR MORE REMEDIATION RECOMMENDATIONS TO BE EXHIBITED ON A GRAPHICAL USER INTERFACE (GUI) OF THE USER DEVICE

FIG. 54

CYBERSECURITY RISK ANALYSIS AND MODELING OF RISK DATA ON AN INTERACTIVE DISPLAY

CROSS-REFERENCE TO RELATED APPLICATION(S)

The present disclosure claims priority to U.S. Provisional Patent Application No. 63/507,958, filed Jun. 13, 2023, and the present disclosure is a continuation-in-part (CIP) of U.S. patent application Ser. No. 18/332,133, filed Jun. 9, 2023, entitled "Calculation of Security Risk Score of Network Security Services," which is a continuation-in-part (CIP) of U.S. patent application Ser. No. 17/724,625, filed Apr. 20, 2022, entitled "Cloud-based deception technology with granular scoring for breach detection," which is a continuation of U.S. patent application Ser. No. 17/571,460, filed Jan. 8, 2022, which claims priority to Indian Patent Application No. 202111053875, filed Nov. 23, 2021, wherein the contents of each are incorporated by reference in their entirety herein.

FIELD OF THE DISCLOSURE

The present disclosure relates generally to networking and computing. More particularly, the present disclosure relates to systems and methods for calculating cybersecurity risk factors and exhibiting information related to risk factors and recommended remediation actions on an interactive Graphical User Interface (GUI) display.

BACKGROUND OF THE DISCLOSURE

Cyberthreats are evolving and becoming advanced as well as critically impacting business. For example, the Colonial Pipeline ransomware attack shut down operations for days and there was a need for immediate, high-confidence detections to drive effective response. Deception technology can provide rich threat intelligence, telemetry, and emerging adversary tactics and techniques. Conventional deception technology involves placing decoys (also known as honeypots, traps, etc.) on user devices and enterprise networks. These are typically placed at critical infrastructure where there cannot be a breach. The deception technology is able to monitor malicious actors to catch them and provide insight into how they operate. Security teams cannot separate the signal from the noise to take a proactive stance against the stealthiest attackers. Security analysts lose time chasing ghosts, the role of active defense (deception technology) has never been more critical. By taking the fight to the attacker, leading them down false paths with decoys deployed across networks, endpoints, and applications, and gathering the highest-fidelity security telemetry, it is possible to dramatically speed up threat hunting and containment.

Existing deception technology solutions typically require agents that are executed on user devices as well as on-site appliances located in the enterprise network. Cloud-based security solutions have emerged, such as Zscaler Internet Access (ZIA) and Zscaler Private Access (ZPA), available from Zscaler, Inc., the applicant and assignee of the present application. The problem with hardware-based solutions (with appliances) is they do not scale and require infrastructure in the customer network.

BRIEF SUMMARY OF THE DISCLOSURE

The present disclosure relates to systems and methods for analyzing the online presence of an organization or enterprise in order to calculate cybersecurity risk factors associated with the organization or enterprise. According to various embodiments of the present disclosure, the systems and methods described herein are configured to analyze the risk factors and display risk data at multiple levels to allow a user to view general risk information and then further drill down to lower-level views to see risk data in greater detail.

In one implementation, a method includes the step of detecting one or more cybersecurity risk factors associated with an organization to determine a risk posture of the organization. The method also includes the step of attaining one or more remediation recommendations for enabling a person associated with the organization to select one or more actions for mitigating the one or more cybersecurity risk factors and improving the risk posture of the organization. Also, the method includes the step of communicating display information to a user device associated with the organization. For example, the display information includes at least the one or more cybersecurity risk factors and the one or more remediation recommendations to be exhibited on a Graphical User Interface (GUI) of the user device.

In some embodiments, the method may further include the step of prioritizing the display information to cause the GUI to exhibit a prioritized list of a plurality of remediation recommendations. The step of communicating the display information may include the step of causing the GUI of the user device to exhibit a high-level view of the display information on a general dashboard and enabling the person to drill down to view one or more lower-level views exhibiting the display information in greater detail. Also, the step of communicating the display information may include the step of customizing the display information based on responsibilities that are assigned to the person associated with the organization. The person associated with the organization, for instance, may be a technician, an Information Technology (IT) professional, a Chief Information Officer (CIO), a Chief Information Security Officer (CISO), an administrator, or a security operator.

The method, according to some implementations, may further include the steps of a) computing a risk score from the one or more cybersecurity risk factors, and b) causing the GUI of the user device to display the risk score. In some cases, the method may include the steps of a) computing a first risk component related to an External Attack Surface risk of the organization, a second risk component related to a Security Compromise risk of the organization, a third risk component related to a Lateral Propagation risk of the organization, and a fourth risk component related to a Data Loss risk of the organization, and b) causing the GUI of the user device to display the first risk component, the second risk component, the third risk component, and the fourth risk component.

The GUI described herein may be configured to exhibit one or more of a risk score trend, a map showing locations of risk events, and/or information regarding one or more comparisons with peers of the organization. The GUI may be configured to enable the person to select a view showing one or more cards, wherein each card may include a) risk index information, b) detection time information, c) a title of a risk event, d) a problem associated with the risk event, and/or e) recommendation action information for resolving the problem.

The step of communicating the display information may also include the step of enabling the person to select an entity category among a plurality of entity categories related to the organization, the entity categories including a user workforce, third party actors, applications, and assets. The GUI, for example, may include a first section configured to exhibit information related to the one or more cybersecurity risk factors, a second section configured to exhibit information related to the one or more remediation recommendations, and one or more additional sections configured to exhibit other information related to risks, risk levels, risky users, trends, graphs, maps, most significant asset types, most significant regions, most significant categories, most significant contributing factors to financial risk, cyber insurance information, high impact risk mitigation recommendations, and/or insights regarding known vulnerabilities.

BRIEF DESCRIPTION OF THE DRAWINGS

The present disclosure is illustrated and described herein with reference to the various drawings, in which like reference numbers are used to denote like system components/method steps, as appropriate, and in which:

FIG. 3 is a block diagram of a server that may be used in the cloud-based system of FIGS. 1 and 2 or the like.

FIG. 4 is a block diagram of a user device that may be used with the cloud-based system of FIGS. 1 and 2 or the like.

FIG. 9 is a diagram illustrating various techniques to forward traffic to the cloud-based system.

FIG. 10 is a diagram illustrating signatures vs. behavior vs. deception.

FIG. 13 is a flowchart of a cloud-based deception process.

FIG. 15 is a diagram illustrating a system for calculating a risk score.

FIG. 16 is a flowchart of a method for calculating a risk score that is an indication of a level of risk associated with a network or domain.

FIGS. 17A and 17B show an example of a report having information that may be reported to an Enterprise License Agreement (ELA) customer.

FIG. 19 is a table showing policy impact scores and maximum scores for multiple global settings and rule-based policies.

FIG. 20 is a table showing the traffic impact and maximum scores for multiple types of traffic.

FIG. 22 is a flow diagram illustrating an embodiment of a method for determining the effectiveness of combination of security components for mitigating risk in a network.

FIG. 26 is a screenshot of a user interface for displaying a risk score.

FIGS. 27-33 are a series of screenshots of another user interface for displaying a risk score.

FIGS. 34-53 are screenshots showing various GUIs for exhibiting risk data to a user.

FIG. 54 is a flow diagram illustrating an embodiment of a method for analyzing cybersecurity risk and exhibiting risk data on a user interface.

DETAILED DESCRIPTION OF THE DISCLOSURE

Again, the present disclosure relates to systems and methods for detecting cybersecurity risks associated with an organization, processing and organizing detected risk factors, and then displaying the risk factors as well as recommended remediation actions on a Graphical User Interface (GUI) or other type of user interface, display screen, etc. The systems and methods may be configured to detect one or more cybersecurity risk factors associated with the organization to determine a risk posture of the organization. The systems and methods may also be configured to attain one or more remediation recommendations for enabling a person associated with the organization to select one or more actions for mitigating the one or more cybersecurity risk factors and improving the risk posture of the organization. Also, the systems and methods may be configured to communicate display information to a user device associated with the organization, whereby the display information may include at least the one or more cybersecurity risk factors and the one or more remediation recommendations to be exhibited on a Graphical User Interface (GUI) of the user device.

More generally, the systems and methods of the present disclosure are related to cloud-based deception technology to identify threat intelligence, telemetry, and emerging adversary tactics and techniques. Variously, the present disclosure includes integration of deception technology with a cloud-based security system, namely without on-premises appliances. Further, the present disclosure includes targeted threat detection where activity is logged only related to breadcrumbs (fake data intentionally put on the user device). Also, the present disclosure includes dynamic risk scoring where all hits on a breadcrumb/honeypot are malicious by definition—this risk scoring covers a unique way to convey the actual threat. The present disclosure includes an approach to rapidly deploy breadcrumbs/honeypots to make each one look unique and look like a customer environment, so the attackers do not know. Even further, the present disclosure enables the breadcrumbs/honeypots based on user type, e.g., sales, marketing, legal, R&D, etc.

§ 1.0 EXAMPLE CLOUD-BASED SYSTEM ARCHITECTURE

Figure 1:
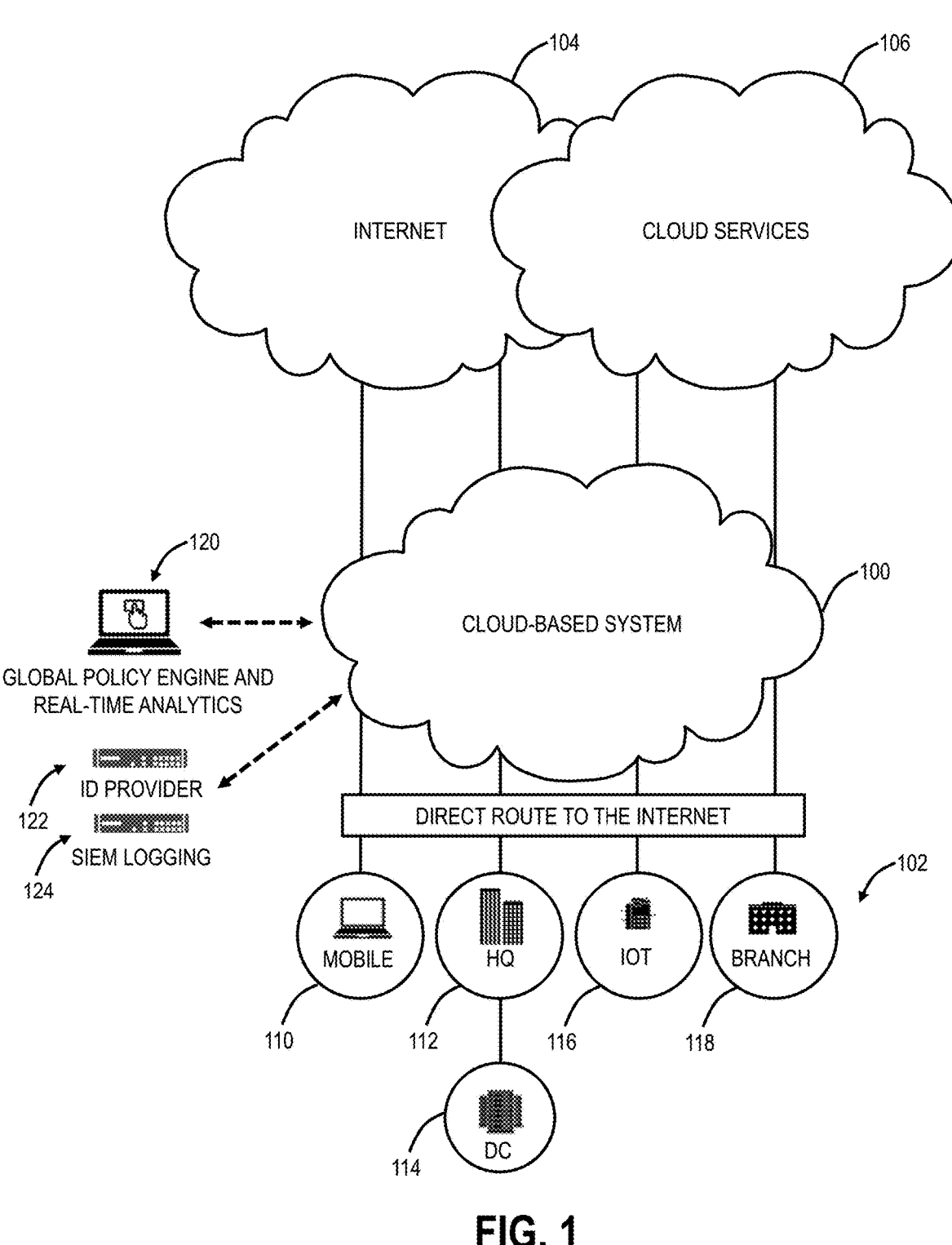
FIG. 1 is a network diagram of a cloud-based system offering security as a service.

FIG. 1 is a network diagram of a cloud-based system 100 offering security as a service. Specifically, the cloud-based system 100 can offer a Secure Internet and Web Gateway as a service to various users 102, as well as other cloud services. In this manner, the cloud-based system 100 is located between the users 102 and the Internet as well as any cloud services 106 (or applications) accessed by the users 102. As such, the cloud-based system 100 provides inline monitoring inspecting traffic between the users 102, the Internet 104, and the cloud services 106, including Secure Sockets Layer (SSL) traffic. The cloud-based system 100 can offer access control, threat prevention, data protection, etc. The access control can include a cloud-based firewall, cloud-based intrusion detection, Uniform Resource Locator (URL) filtering, bandwidth control, Domain Name System (DNS) filtering, etc. The threat prevention can include cloud-based intrusion prevention, protection against advanced threats (malware, spam, Cross-Site Scripting (XSS), phishing, etc.), cloud-based sandbox, antivirus, DNS security, etc. The data protection can include Data Loss Prevention (DLP), cloud application security such as via a Cloud Access Security Broker (CASB), file type control, etc.

The cloud-based firewall can provide Deep Packet Inspection (DPI) and access controls across various ports and protocols as well as being application and user aware. The URL filtering can block, allow, or limit website access based on policy for a user, group of users, or entire organization, including specific destinations or categories of URLs (e.g., gambling, social media, etc.). The bandwidth control can enforce bandwidth policies and prioritize critical applications such as relative to recreational traffic. DNS filtering can control and block DNS requests against known and malicious destinations.

The cloud-based intrusion prevention and advanced threat protection can deliver full threat protection against malicious content such as browser exploits, scripts, identified botnets and malware callbacks, etc. The cloud-based sandbox can block zero-day exploits (just identified) by analyzing unknown files for malicious behavior. Advantageously, the cloud-based system 100 is multi-tenant and can service a large volume of the users 102. As such, newly discovered threats can be promulgated throughout the cloud-based system 100 for all tenants practically instantaneously. The antivirus protection can include antivirus, antispyware, anti-malware, etc. protection for the users 102, using signatures sourced and constantly updated. The DNS security can identify and route command-and-control connections to threat detection engines for full content inspection.

The DLP can use standard and/or custom dictionaries to continuously monitor the users 102, including compressed and/or SSL-encrypted traffic. Again, being in a cloud implementation, the cloud-based system 100 can scale this monitoring with near-zero latency on the users 102. The cloud application security can include CASB functionality to discover and control user access to known and unknown cloud services 106. The file type controls enable true file type control by the user, location, destination, etc. to determine which files are allowed or not.

The cloud-based system 100 can provide other security functions, including, for example, micro-segmentation, workload segmentation, API security, Cloud Security Posture Management (CSPM), user identity management, and the like. That is, the cloud-based system 100 provides a network architecture that enables delivery of any cloud-based security service, including emerging frameworks.

Figure 5:
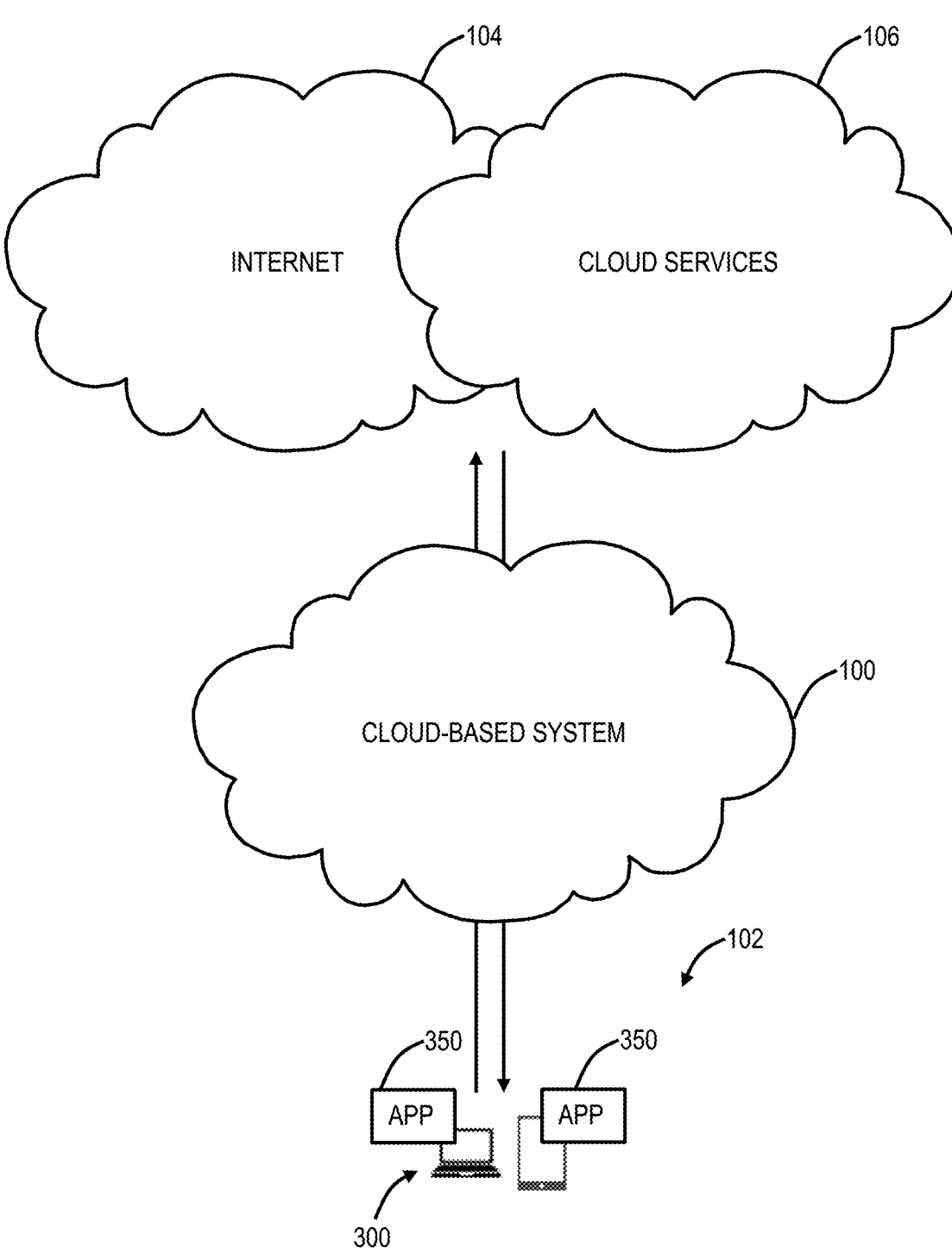
FIG. 5 is a network diagram of the cloud-based system illustrating an application on user devices with users configured to operate through the cloud-based system.

For illustration purposes, the users 102 of the cloud-based system 100 can include a mobile device 110, a headquarters (HQ) 112 which can include or connect to a data center (DC) 114, Internet of Things (IoT) devices 116, a branch office/remote location 118, etc., and each includes one or more user devices (an example user device 300 is illustrated in FIG. 5). The devices 110, 116, and the locations 112, 114, 118 are shown for illustrative purposes, and those skilled in the art will recognize there are various access scenarios and other users 102 for the cloud-based system 100, all of which are contemplated herein. The users 102 can be associated with a tenant, which may include an enterprise, a corporation, an organization, etc. That is, a tenant is a group of users who share a common access with specific privileges to the cloud-based system 100, a cloud service, etc. In an embodiment, the headquarters 112 can include an enterprise's network with resources in the data center 114. The mobile device 110 can be a so-called road warrior, i.e., users that are off-site, on-the-road, etc. Those skilled in the art will recognize a user 102 has to use a corresponding user device 300 for accessing the cloud-based system 100 and the like, and the description herein may use the user 102 and/or the user device 300 interchangeably.

Further, the cloud-based system 100 can be multi-tenant, with each tenant having its own users 102 and configuration, policy, rules, etc. One advantage of the multi-tenancy and a large volume of users is the zero-day/zero-hour protection in that a new vulnerability can be detected and then instantly remediated across the entire cloud-based system 100. The same applies to policy change, rule change, configuration change, etc.—they are instantly remediated across the entire cloud-based system 100. Also, new features in the cloud-based system 100 can also be rolled up simultaneously across the user base, as opposed to selective and time-consuming upgrades on every device at the locations 112, 114, 118, and the devices 110, 116.

Logically, the cloud-based system 100 can be viewed as an overlay network between users (at the locations 112, 114, 118, and the devices 110, 116) and the Internet 104 and the cloud services 106. Previously, the IT deployment model included enterprise resources and applications stored within the data center 114 (i.e., physical devices) behind a firewall (perimeter), accessible by employees, partners, contractors, etc. on-site or remote via Virtual Private Networks (VPNs), etc. The cloud-based system 100 is replacing the conventional deployment model. The cloud-based system 100 can be used to implement these services in the cloud without requiring the physical devices and management thereof by enterprise IT administrators. As an ever-present overlay network, the cloud-based system 100 can provide the same functions as the physical devices and/or appliances regardless of geography or location of the users 102, as well as independent of platform, operating system, network access technique, network access provider, etc. The cloud-based system 100 can be viewed as providing Zero Trust Network Access (ZTNA).

There are various techniques to forward traffic between the users 102 at the locations 112, 114, 118, and via the devices 110, 116, and the cloud-based system 100. Typically, the locations 112, 114, 118 can use tunneling where all traffic is forward through the cloud-based system 100. For example, various tunneling protocols are contemplated, such as GRE, L2TP, IPsec, customized tunneling protocols, etc. The devices 110, 116, when not at one of the locations 112, 114, 118 can use a local application that forwards traffic, a proxy such as via a Proxy Auto-Config (PAC) file, and the like. An application of the local application is the application 350 described in detail herein as a connector application. A key aspect of the cloud-based system 100 is all traffic between the users 102 and the Internet 104 or the cloud services 106 is via the cloud-based system 100. As such, the cloud-based system 100 has visibility to enable various functions, all of which are performed off the user device in the cloud.

The cloud-based system 100 can also include a management system 120 for tenant access to provide global policy and configuration as well as real-time analytics. This enables IT administrators to have a unified view of user activity, threat intelligence, application usage, etc. For example, IT administrators can drill-down to a per-user level to understand events and correlate threats, to identify compromised devices, to have application visibility, and the like. The cloud-based system 100 can further include connectivity to an Identity Provider (IDP) 122 for authentication of the users 102 and to a Security Information and Event Management (SIEM) system 124 for event logging. The system 124 can provide alert and activity logs on a per-user 102 basis.

Figure 2:
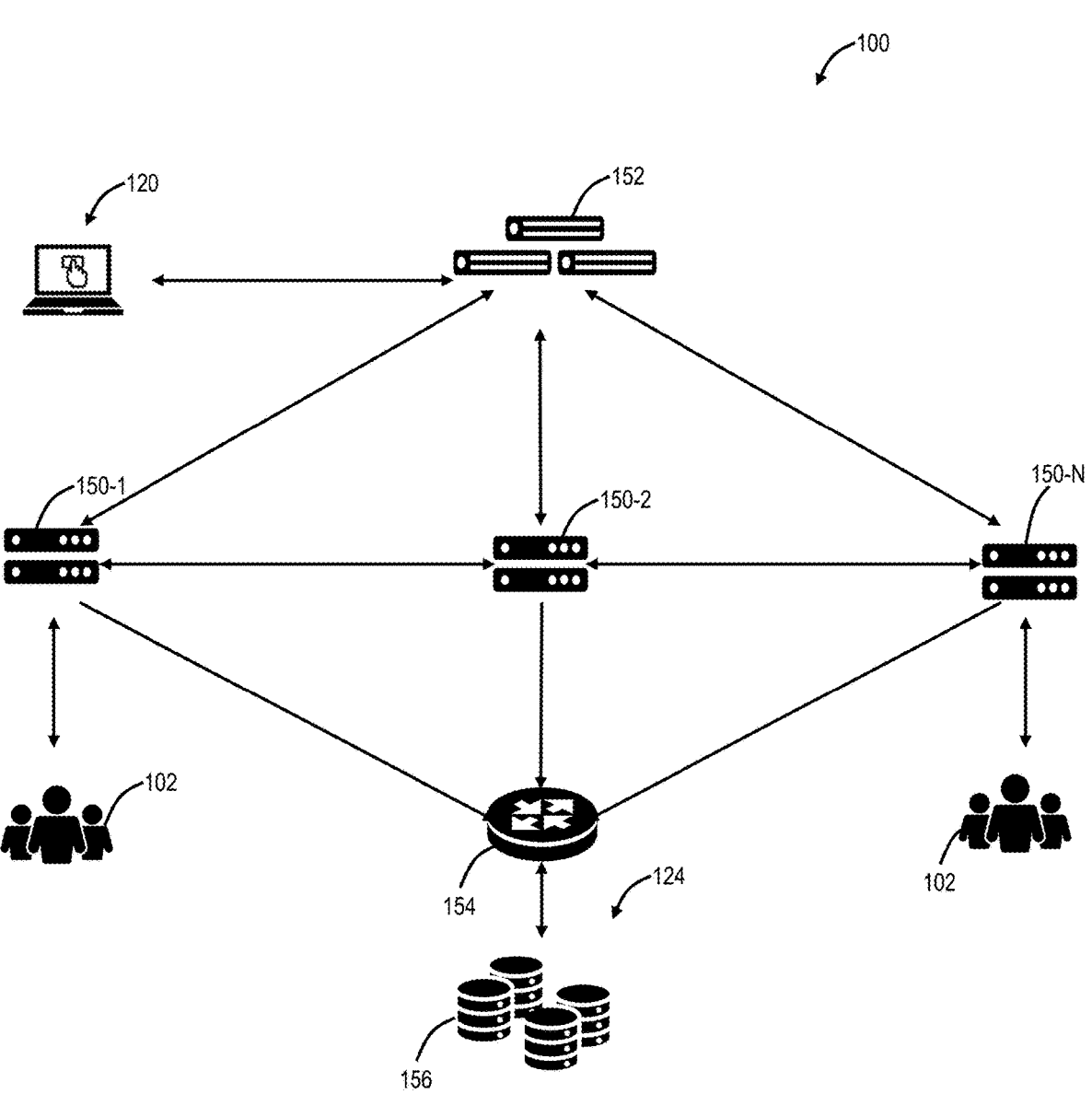
FIG. 2 is a network diagram of an example implementation of the cloud-based system.
Figures 3, 4:
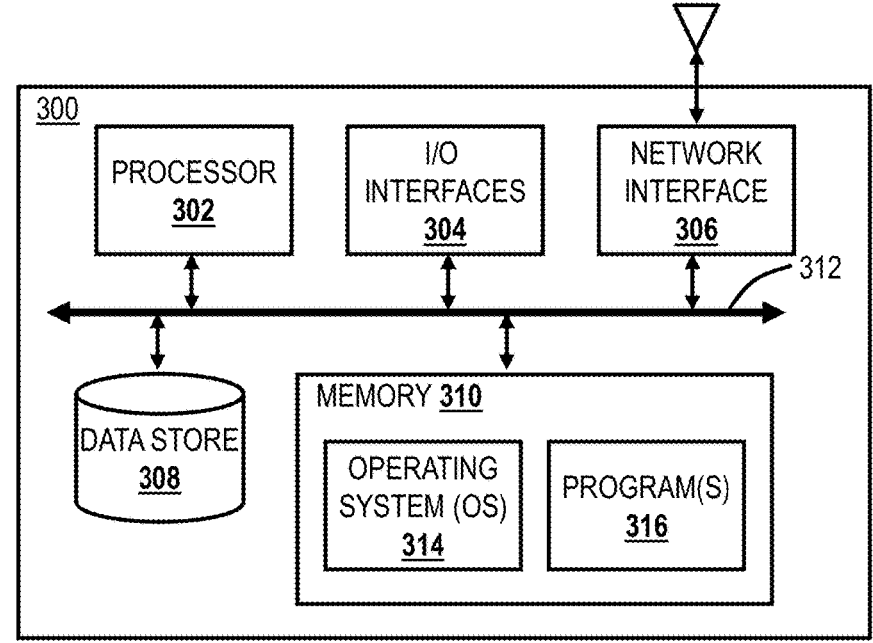

FIG. 2 is a network diagram of an example implementation of the cloud-based system 100. In an embodiment, the cloud-based system 100 includes a plurality of enforcement nodes (EN) 150, labeled as enforcement nodes 150-1, 150-2, 150-N, interconnected to one another and interconnected to a central authority (CA) 152. Note, the nodes 150 are called "enforcement" nodes 150 but they can be simply referred to as nodes 150 in the cloud-based system 100. Also, the nodes 150 can be referred to as service edges. The nodes 150 and the central authority 152, while described as nodes, can include one or more servers, including physical servers, virtual machines (VM) executed on physical hardware, etc. An example of a server is illustrated in FIG. 4. The cloud-based system 100 further includes a log router 154 that connects to a storage cluster 156 for supporting log maintenance from the enforcement nodes 150. The central authority 152 provides centralized policy, real-time threat updates, etc. and coordinates the distribution of this data between the enforcement nodes 150. The enforcement nodes 150 provide an onramp to the users 102 and are configured to execute policy, based on the central authority 152, for each user 102. The enforcement nodes 150 can be geographically distributed, and the policy for each user 102 follows that user 102 as he or she connects to the nearest (or other criteria) enforcement node 150. Of note, the cloud-based system is an external system meaning it is separate from tenant's private networks (enterprise networks) as well as from networks associated with the devices 110, 116, and locations 112, 118.

The enforcement nodes 150 are full-featured secure internet gateways that provide integrated internet security. They inspect all web traffic bi-directionally for malware and enforce security, compliance, and firewall policies, as described herein, as well as various additional functionality. In an embodiment, each enforcement node 150 has two main modules for inspecting traffic and applying policies: a web module and a firewall module. The enforcement nodes 150 are deployed around the world and can handle hundreds of thousands of concurrent users with millions of concurrent sessions. Because of this, regardless of where the users 102 are, they can access the Internet 104 from any device, and the enforcement nodes 150 protect the traffic and apply corporate policies. The enforcement nodes 150 can implement various inspection engines therein, and optionally, send sandboxing to another system. The enforcement nodes 150 include significant fault tolerance capabilities, such as deployment in active-active mode to ensure availability and redundancy as well as continuous monitoring.

In an embodiment, customer traffic is not passed to any other component within the cloud-based system 100, and the enforcement nodes 150 can be configured never to store any data to disk. Packet data is held in memory for inspection and then, based on policy, is either forwarded or dropped. Log data generated for every transaction is compressed, tokenized, and exported over secure Transport Layer Security (TLS) connections to the log routers 154 that direct the logs to the storage cluster 156, hosted in the appropriate geographical region, for each organization. In an embodiment, all data destined for or received from the Internet is processed through one of the enforcement nodes 150. In another embodiment, specific data specified by each tenant, e.g., only email, only executable files, etc., is processed through one of the enforcement nodes 150.

Each of the enforcement nodes 150 may generate a decision vector D=[d1, d2, . . . , dn] for a content item of one or more parts C=[c1, c2, . . . , cm]. Each decision vector may identify a threat classification, e.g., clean, spyware, malware, undesirable content, innocuous, spam email, unknown, etc. For example, the output of each element of the decision vector D may be based on the output of one or more data inspection engines. In an embodiment, the threat classification may be reduced to a subset of categories, e.g., violating, non-violating, neutral, unknown. Based on the subset classification, the enforcement node 150 may allow the distribution of the content item, preclude distribution of the content item, allow distribution of the content item after a cleaning process, or perform threat detection on the content item. In an embodiment, the actions taken by one of the enforcement nodes 150 may be determinative on the threat classification of the content item and on a security policy of the tenant to which the content item is being sent from or from which the content item is being requested by. A content item is violating if, for any part C=[c1, c2, . . . , cm] of the content item, at any of the enforcement nodes 150, any one of the data inspection engines generates an output that results in a classification of "violating."

The central authority 152 hosts all customer (tenant) policy and configuration settings. It monitors the cloud and provides a central location for software and database updates and threat intelligence. Given the multi-tenant architecture, the central authority 152 is redundant and backed up in multiple different data centers. The enforcement nodes 150 establish persistent connections to the central authority 152 to download all policy configurations. When a new user connects to an enforcement node 150, a policy request is sent to the central authority 152 through this connection. The central authority 152 then calculates the policies that apply to that user 102 and sends the policy to the enforcement node 150 as a highly compressed bitmap.

The policy can be tenant-specific and can include access privileges for users, websites and/or content that is disallowed, restricted domains, DLP dictionaries, etc. Once downloaded, a tenants policy is cached until a policy change is made in the management system 120. The policy can be tenant-specific and can include access privileges for users, websites and/or content that is disallowed, restricted domains, DLP dictionaries, etc. When this happens, all of the cached policies are purged, and the enforcement nodes 150 request the new policy when the user 102 next makes a request. In an embodiment, the enforcement node 150 exchange "heartbeats" periodically, so all enforcement nodes 150 are informed when there is a policy change. Any enforcement node 150 can then pull the change in policy when it sees a new request.

The cloud-based system 100 can be a private cloud, a public cloud, a combination of a private cloud and a public cloud (hybrid cloud), or the like. Cloud computing systems and methods abstract away physical servers, storage, networking, etc., and instead offer these as on-demand and elastic resources. The National Institute of Standards and Technology (NIST) provides a concise and specific definition which states cloud computing is a model for enabling convenient, on-demand network access to a shared pool of configurable computing resources (e.g., networks, servers, storage, applications, and services) that can be rapidly provisioned and released with minimal management effort or service provider interaction. Cloud computing differs from the classic client-server model by providing applications from a server that are executed and managed by a client's web browser or the like, with no installed client version of an application required. Centralization gives cloud service providers complete control over the versions of the browser-based and other applications provided to clients, which removes the need for version upgrades or license management on individual client computing devices. The phrase "Software as a Service" (SaaS) is sometimes used to describe application programs offered through cloud computing. A common shorthand for a provided cloud computing service (or even an aggregation of all existing cloud services) is "the cloud." The cloud-based system 100 is illustrated herein as an example embodiment of a cloud-based system, and other implementations are also contemplated.

As described herein, the terms cloud services and cloud applications may be used interchangeably. The cloud service 106 is any service made available to users on-demand via the Internet, as opposed to being provided from a company's on-premises servers. A cloud application, or cloud app, is a software program where cloud-based and local components work together. The cloud-based system 100 can be utilized to provide example cloud services, including Zscaler Internet Access (ZIA), Zscaler Private Access (ZPA), and Zscaler Digital Experience (ZDX), all from Zscaler, Inc. (the assignee and applicant of the present application). Also, there can be multiple different cloud-based systems 100, including ones with different architectures and multiple cloud services. The ZIA service can provide the access control, threat prevention, and data protection described above with reference to the cloud-based system 100. ZPA can include access control, microservice segmentation, etc. The ZDX service can provide monitoring of user experience, e.g., Quality of Experience (QoE), Quality of Service (QoS), etc., in a manner that can gain insights based on continuous, inline monitoring. For example, the ZIA service can provide a user with Internet Access, and the ZPA service can provide a user with access to enterprise resources instead of traditional Virtual Private Networks (VPNs), namely ZPA provides Zero Trust Network Access (ZTNA). Those of ordinary skill in the art will recognize various other types of cloud services 106 are also contemplated. Also, other types of cloud architectures are also contemplated, with the cloud-based system 100 presented for illustration purposes.

§ 1.1 Private Nodes Hosted by Tenants or Service Providers

The nodes 150 that service multi-tenant users 102 may be located in data centers. These nodes 150 can be referred to as public nodes 150 or public service edges. In embodiment, the nodes 150 can be located on-premises with tenants (enterprise) as well as service providers. These nodes can be referred to as private nodes 150 or private service edges. In operation, these private nodes 150 can perform the same functions as the public nodes 150, can communicate with the central authority 152, and the like. In fact, the private nodes 150 can be considered in the same cloud-based system 100 as the public nodes 150, except located on-premises. When a private node 150 is located in an enterprise network, the private node 150 can be single tenant for the corresponding enterprise; of course, the cloud-based system 100 is still multi-tenant, but these particular nodes are serving only a single tenant. When a private node 150 is located in a service provider's network, the private node 150 can be multi-tenant for customers of the service provider. Those skilled in the art will recognize various architectural approaches are contemplated. The cloud-based system 100 is a logical construct providing a security service.

§ 2.0 EXAMPLE SERVER ARCHITECTURE

FIG. 3 is a block diagram of a server 200, which may be used in the cloud-based system 100, in other systems, or standalone. For example, the enforcement nodes 150 and the central authority 152 may be formed as one or more of the servers 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 2 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any volatile memory elements (e.g., random access memory (RAM), such as DRAM, SRAM, SDRAM, and the like), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any volatile memory elements (e.g., random access memory (RAM), such as DRAM, SRAM, SDRAM, etc.), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

§ 3.0 EXAMPLE USER DEVICE ARCHITECTURE

FIG. 4 is a block diagram of a user device 300, which may be used with the cloud-based system 100 or the like. Specifically, the user device 300 can form a device used by one of the users 102, and this may include common devices such as laptops, smartphones, tablets, netbooks, personal digital assistants, MP3 players, cell phones, e-book readers, IoT devices, servers, desktops, printers, televisions, streaming media devices, and the like. The user device 300 can be a digital device that, in terms of hardware architecture, generally includes a processor 302, I/O interfaces 304, a network interface 306, a data store 308, and memory 310. It should be appreciated by those of ordinary skill in the art that FIG. 5 depicts the user device 300 in an oversimplified manner, and a practical embodiment may include additional components and suitably configured processing logic to support known or conventional operating features that are not described in detail herein. The components (302, 304, 306, 308, and 302) are communicatively coupled via a local interface 312. The local interface 312 can be, for example, but not limited to, one or more buses or other wired or wireless connections, as is known in the art. The local interface 312 can have additional elements, which are omitted for simplicity, such as controllers, buffers (caches), drivers, repeaters, and receivers, among many others, to enable communications. Further, the local interface 312 may include address, control, and/or data connections to enable appropriate communications among the aforementioned components.

The processor 302 is a hardware device for executing software instructions. The processor 302 can be any custom made or commercially available processor, a CPU, an auxiliary processor among several processors associated with the user device 300, a semiconductor-based microprocessor (in the form of a microchip or chipset), or generally any device for executing software instructions. When the user device 300 is in operation, the processor 302 is configured to execute software stored within the memory 310, to communicate data to and from the memory 310, and to generally control operations of the user device 300 pursuant to the software instructions. In an embodiment, the processor 302 may include a mobile optimized processor such as optimized for power consumption and mobile applications. The I/O interfaces 304 can be used to receive user input from and/or for providing system output. User input can be provided via, for example, a keypad, a touch screen, a scroll ball, a scroll bar, buttons, a barcode scanner, and the like. System output can be provided via a display device such as a Liquid Crystal Display (LCD), touch screen, and the like.

The network interface 306 enables wireless communication to an external access device or network. Any number of suitable wireless data communication protocols, techniques, or methodologies can be supported by the network interface 306, including any protocols for wireless communication. The data store 308 may be used to store data. The data store 308 may include any volatile memory elements (e.g., random access memory (RAM), such as DRAM, SRAM, SDRAM, and the like), nonvolatile memory elements (e.g., ROM, hard drive, tape, CDROM, and the like), and combinations thereof. Moreover, the data store 308 may incorporate electronic, magnetic, optical, and/or other types of storage media.

The memory 310 may include any volatile memory elements (e.g., random access memory (RAM), such as DRAM, SRAM, SDRAM, etc.), nonvolatile memory elements (e.g., ROM, hard drive, etc.), and combinations thereof. Moreover, the memory 310 may incorporate electronic, magnetic, optical, and/or other types of storage media. Note that the memory 310 may have a distributed architecture, where various components are situated remotely from one another but can be accessed by the processor 302. The software in memory 310 can include one or more software programs, each of which includes an ordered listing of executable instructions for implementing logical functions. In the example of FIG. 3, the software in the memory 310 includes a suitable operating system 314 and programs 316. The operating system 314 essentially controls the execution of other computer programs and provides scheduling, input-output control, file and data management, memory management, and communication control and related services. The programs 316 may include various applications, add-ons, etc. configured to provide end user functionality with the user device 300. For example, example programs 316 may include, but not limited to, a web browser, social networking applications, streaming media applications, games, mapping and location applications, electronic mail applications, financial applications, and the like. In a typical example, the end-user typically uses one or more of the programs 316 along with a network such as the cloud-based system 100.

§ 4.0 USER DEVICE APPLICATION FOR TRAFFIC FORWARDING AND MONITORING

FIG. 5 is a network diagram of the cloud-based system 100 illustrating an application 350 on user devices 300 with users 102 configured to operate through the cloud-based system 100. Different types of user devices 300 are prolif-erating, including Bring Your Own Device (BYOD) as well as IT-managed devices. The conventional approach for a user device 300 to operate with the cloud-based system 100 as well as for accessing enterprise resources includes com-plex policies, VPNs, poor user experience, etc. The appli-cation 350 can automatically forward user traffic with the cloud-based system 100 as well as ensuring that security and access policies are enforced, regardless of device, location, operating system, or application. The application 350 auto-matically determines if a user 102 is looking to access the open Internet 104, a SaaS app, or an internal app running in public, private, or the datacenter and routes mobile traffic through the cloud-based system 100. The application 350 can support various cloud services, including ZIA, ZPA, ZDX, etc., allowing the best-in-class security with zero trust access to internal apps. As described herein, the application 350 can also be referred to as a connector application.

The application 350 is configured to auto-route traffic for seamless user experience. This can be protocol as well as application-specific, and the application 350 can route traffic with a nearest or best fit enforcement node 150. Further, the application 350 can detect trusted networks, allowed appli-cations, etc. and support secure network access. The appli-cation 350 can also support the enrollment of the user device 300 prior to accessing applications. The application 350 can uniquely detect the users 102 based on fingerprinting the user device 300, using criteria like device model, platform, operating system, etc. The application 350 can support Mobile Device Management (MDM) functions, allowing IT personnel to deploy and manage the user devices 300 seamlessly. This can also include the automatic installation of client and SSL certificates during enrollment. Finally, the application 350 provides visibility into device and app usage of the user 102 of the user device 300.

The application 350 supports a secure, lightweight tunnel between the user device 300 and the cloud-based system 100. For example, the lightweight tunnel can be HTTP-based. With the application 350, there is no requirement for PAC files, an IPsec VPN, authentication cookies, or user 102 setup.

§ 5.0 CLOUD TUNNEL

Figure 6:
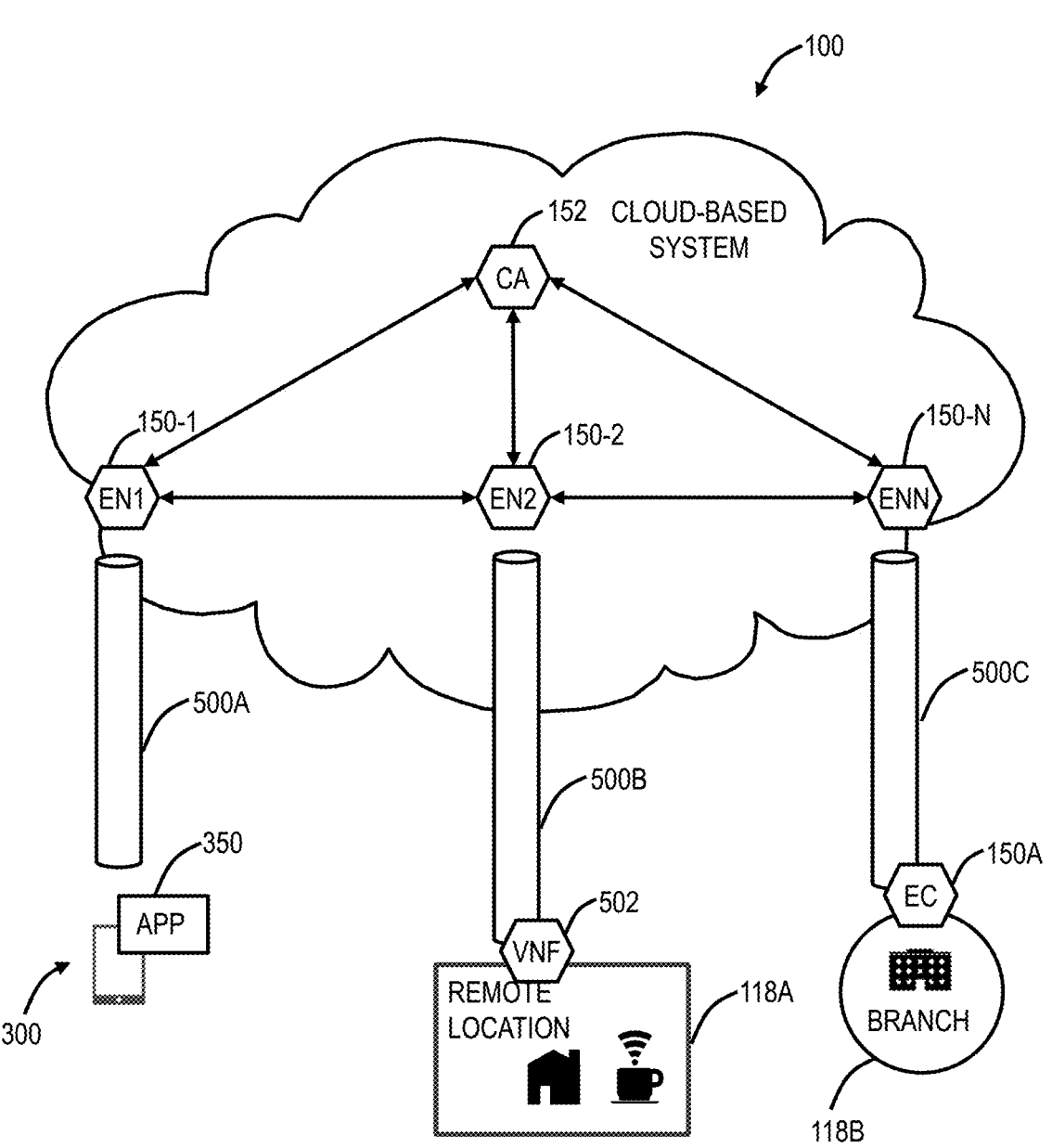
FIG. 6 is a network diagram of the cloud-based system of FIGS. 1 and 2 with various cloud tunnels, labeled as cloud tunnels, for forwarding traffic.
Figure 7:
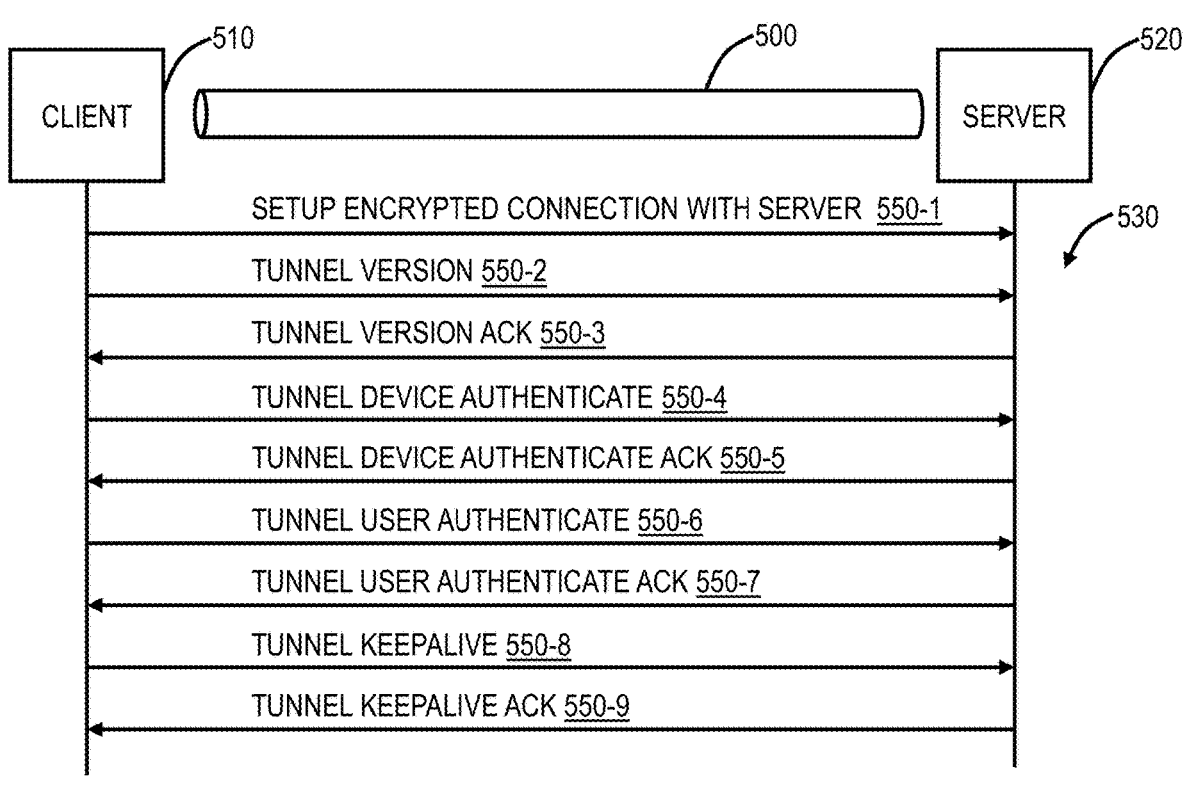
FIGS. 7 and 8 are flow diagrams of a cloud tunnel illustrating a control channel (FIG. 7) and a data channel (FIG. 8), with the tunnel illustrated between a client and a server.
Figure 8:
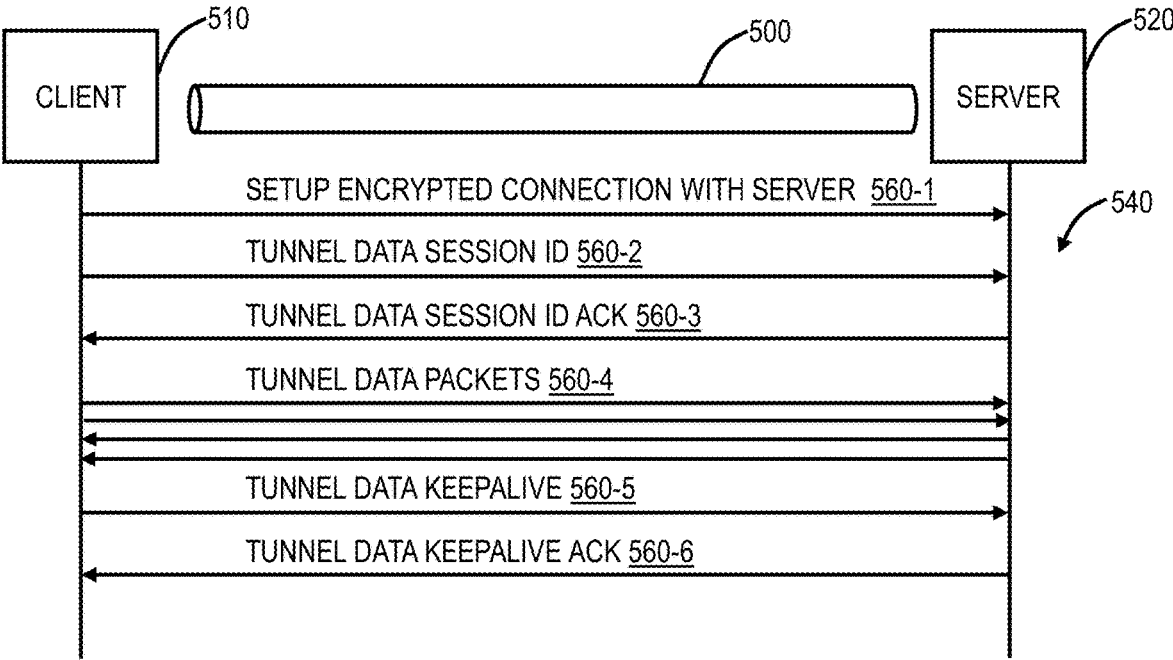

FIG. 6 is a network diagram of the cloud-based system 100 with various cloud tunnels 500, labeled as cloud tunnels 500A, 500B, 500C, for forwarding traffic. FIGS. 7 and 8 are flow diagrams of a cloud tunnel 500 illustrating a control channel (FIG. 7) and a data channel (FIG. 8), with the tunnel illustrated between a client 510 and a server 520. The cloud tunnel 500 is a lightweight tunnel that is configured to forward traffic between the client 510 and the server 520. The present disclosure focuses on the specific mechanisms used in the cloud tunnel 500 between two points, namely the client 510 and the server 520. Those skilled in the art will recognize the cloud tunnel 500 can be used with the cloud-based system 100 as an example use case, and other uses are contemplated. That is, the client 510 and the server 520 are just endpoint devices that support the exchange of data traffic and control traffic for the tunnel 500. For description, the server 520 can be referred to as a local node and the client 510 as a remote node, where the tunnel operates between the local and remote nodes.

In an embodiment, the cloud-based system 100 can use the cloud tunnel 500 to forward traffic to the enforcement nodes 150, such as from a user device 300 with the appli-cation 350, from a branch office/remote location 118, etc. FIG. 6 illustrates three example use cases for the cloud tunnel 500 with the cloud-based system 100, and other uses are also contemplated. In a first use case, a cloud tunnel 500A is formed between a user device 300, such as with the application 350, and an enforcement node 150-1. For example, when a user 102 associated with the user device 300 connects to a network, the application 350 can establish the cloud tunnel 500A to the closest or best enforcement node 150-1 and forward the traffic through the cloud tunnel 500A so that the enforcement node 150-1 can apply the appropriate security and access policies. Here, the cloud tunnel 500A supports a single user 102, associated with the user device 300.

In a second use case, a cloud tunnel 500B is formed between a Virtual Network Function (VNF) 502 or some other device at a remote location 118A and an enforcement node 150-2. Here, the VNF 502 is used to forward traffic from any user 102 at the remote location 118A to the enforcement node 150-2. In a third use case, a cloud tunnel 110C is formed between an on-premises enforcement node, referred to as an Edge Connector (EC) 150A, and an enforcement node 150-N. The edge connector 150A can be located at a branch office 118A or the like. In some embodi-ments, the edge connector 150A can be an enforcement node 150 in the cloud-based system 100 but located on-premises with a tenant. Here, in the second and third use cases, the cloud tunnels 500B, 500C support multiple users 102.

There can be two versions of the cloud tunnel 500, referred to as tunnel 1 and tunnel 2. The tunnel 1 can only support Web protocols as an HTTP connect tunnel operating on Transmission Control Protocol (TCP) streams. That is, the tunnel 1 can send all proxy-aware traffic or port 80/443 traffic to the enforcement node 150, depending on the forwarding profile configuration. This can be performed via CONNECT requests, similar to a traditional proxy.

The tunnel 2 can support multiple ports and protocols, extending beyond only web protocols. As described herein, the cloud tunnels 500 are the tunnel 2. In all of the use cases, the cloud tunnel 500 enables each user device 300 to redirect traffic destined to all ports and protocols to a corresponding enforcement node 150. Note, the cloud-based system 100 can include load balancing functionality to spread the cloud tunnels 500 from a single source IP address. The cloud tunnel 500 supports device logging for all traffic, firewall, etc., such as in the storage cluster 156. The cloud tunnel 500 utilizes encryption, such as via TLS or Datagram TLS (DTLS), to tunnel packets between the two points, namely the client 510 and the server 520. As described herein, the client 510 can be the user device 300, the VNF 502, and/or the edge connector 150A, and the server 520 can be the enforcement node 150. Again, other devices are contem-plated with the cloud tunnel 500.

The cloud tunnel 500 can use a Network Address Trans-lation (NAT) device that does not require a different egress IP for each device's 300 separate sessions. Again, the cloud tunnel 500 has a tunneling architecture that uses DTLS or TLS to send packets to the cloud-based system 100. Because of this, the cloud tunnel 500 is capable of sending traffic from all ports and protocols.

Thus, the cloud tunnel 500 provides complete protection for a single user 102, via the application 350, as well as for multiple users at remote locations 118, including multiple security functions such as cloud firewall, cloud IPS, etc. The cloud tunnel 500 includes user-level granularity of the traffic, enabling different users 102 on the same cloud tunnel 500 for the enforcement nodes 150 to provide user-based granular policy and visibility. In addition to user-level granularity, the cloud tunnel 500 can provide application-level granularity, such as by mapping mobile applications (e.g., Facebook, Gmail, etc.) to traffic, allowing for app-based granular policies.

FIGS. 7 and 8 illustrate the two communication channels, namely a control channel 530 and a data channel 540, between the client 510 and the server 520. Together, these two communication channels 530, 540 form the cloud tunnel 500. In an embodiment, the control channel 530 can be an encrypted TLS connection or SSL connection, and the control channel 530 is used for device and/or user authentication and other control messages. In an embodiment, the data channel 540 can be an encrypted DTLS or TLS connection, i.e., the data channel can be one or more DTLS or TLS connections for the transmit and receive of user IP packets. There can be multiple data channels 540 associated with the same control channel 530. The data channel 540 can be authenticated using a Session Identifier (ID) from the control channel 530.

Of note, the control channel 530 always uses TLS because some locations (e.g., the remote location 118A, the branch office 118B, other enterprises, hotspots, etc.) can block UDP port 443, preventing DTLS. Whereas TLS is widely used and not typically blocked. The data channel 540 preferably uses DTLS, if it is available, i.e., not blocked on the client 510. If it is blocked, the data channel 540 can use TLS instead. For example, DTLS is the primary protocol for the data channel 540 with TLS used as a fallback over TCP port 443 if DTLS is unavailable, namely if UDP port 443 is blocked at the client 510.

In FIG. 7, the control channel 530 is illustrated with exchanges between the client 510 and the server 520. Again, the control channel 530 includes TLS encryption, which is established through a setup or handshake between the client 510 and the server 520 (step 550-1). The client 510 can send its version of the tunnel 500 to the server 520 (step 550-2) to which the server 520 can acknowledge (step 550-3). For example, the version of the tunnel can include a simple version number or other indication, as well as an indication of whether the client 510 supports DTLS for the data channel 540. Again, the control channel 530 is fixed with TLS or SSL, but the data channel 540 can be either DTLS or TLS.

The client 510 can perform device authentication (step 550-4), and the server 520 can acknowledge the device authentication (step 550-5). The client 510 can perform user authentication (step 550-6), and the server 520 can acknowledge the user authentication (step 550-7). Note, the device authentication includes authenticating the user device 300, such as via the application 350, the VNF 502, the edge connector 150A, etc. The user authentication includes authenticating the users 102 associated with the user devices 300. Note, in an embodiment, the client 510 is the sole device 300, and here the user authentication can be for the user 102 associated with the client 510, and the device authentication can be for the user device 300 with the application 350. In another embodiment, the client 510 can have multiple user devices 300 and corresponding users 102 associated with it. Here, the device authentication can be for the VNF 502, the edge connector 150A, etc., and the user authentication can be for each user device 300 and corresponding user 102, and the client 510 and the server 520 can have a unique identifier for each user device 300, for user-level identification.

The device authentication acknowledgment can include a session identifier (ID) that is used to bind the control channel 530 with one or more data channels 540. The user authentication can be based on a user identifier (ID) that is unique to each user 102. The client 510 can periodically provide keep alive packets (step 550-8), and the server 520 can respond with keep alive acknowledgment packets (step 550-9). The client 510 and the server 520 can use the keep alive packets or messages to maintain the control channel 530. Also, the client 510 and the server 520 can exchange other relevant data over the control channel 530, such as metadata, which identifies an application for a user 102, location information for a user device 300, etc.

Figure 11:
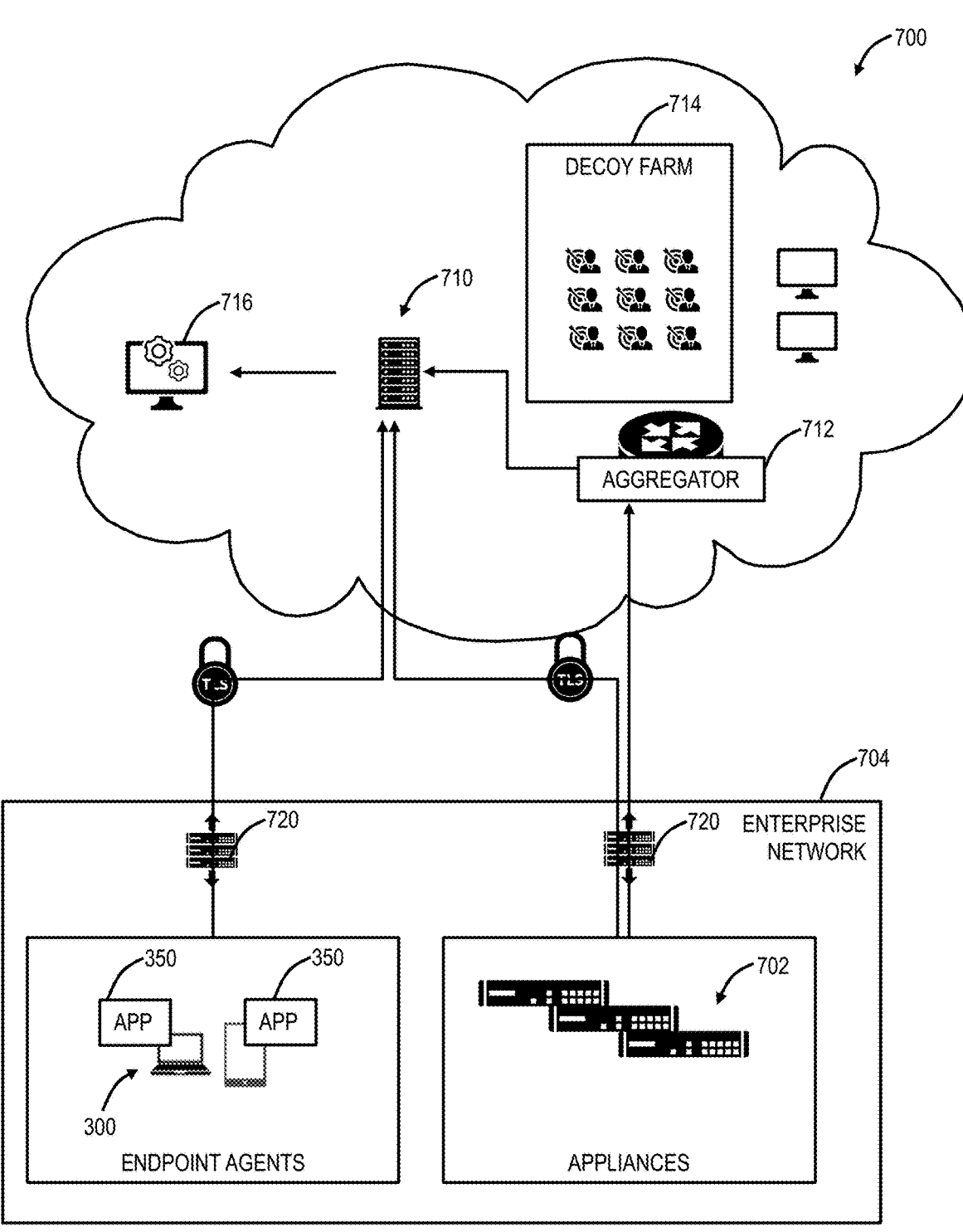
FIG. 11 is a network diagram of a deception system with endpoint agents such as the application and with appliances in an enterprise network.

In FIG. 8, similar to FIG. 7, the data channel 540 is illustrated with exchanges between the client 510 and the server 520. Again, the data channel 540 includes TLS or DTLS encryption, which is established through a setup or handshake between the client 510 and the server 520 (step 560-1). An example of a handshake is illustrated in FIG. 11. Note, the determination of whether to use TLS or DTLS is based on the session ID, which is part of the device authentication acknowledgment, and which is provided over the data channel 540 (steps 560-2, 560-3). Here, the client 510 has told the server 520 its capabilities, and the session ID reflects what the server 520 has chosen, namely TLS or DTLS, based on the client's 510 capabilities. In an embodiment, the server 520 chooses DTLS if the client 510 supports it, i.e., if UDP port 443 is not blocked, otherwise the server 520 chooses TLS. Accordingly, the control channel 530 is established before the data channel 540. The data channel 540 can be authenticated based on the session ID from the control channel 530.

The data channel 540 includes the exchange of data packets between the client 510 and the server 520 (step 560-4). The data packets include an identifier such as the session ID and a user ID for the associated user 102. Additionally, the data channel 540 can include keep alive packets between the client 510 and the server 520 (steps 560-5, 560-6).

The cloud tunnel 500 can support load balancing functionality between the client 510 and the server 520. The server 520 can be in a cluster, i.e., multiple servers 200. For example, the server 520 can be an enforcement node 150 cluster in the cloud-based system 100. Because there can be multiple data channels 540 for a single control channel 530, it is possible to have the multiple data channels 540, in a single cloud tunnel 500, connected to different physical servers 200 in a cluster. Thus, the cloud-based system 100 can include load balancing functionality to spread the cloud tunnels 500 from a single source IP address, i.e., the client 510.

Also, the use of DTLS for the data channels 540 allows the user devices 300 to switch networks without potentially impacting the traffic going through the tunnel 500. For example, a large file download could continue uninterrupted when a user device 300 moves from Wi-Fi to mobile, etc. Here, the application 350 can add some proprietary data to the DTLS client-hello server name extension. That proprietary data helps a load balancer balance the new DTLS connection to the same server 200 in a cluster where the connection prior to network change was being processed. So, a newly established DTLS connection with different IP addresses (due to network change) can be used to tunnel packets of the large file download that was started before the network change. Also, some mobile carriers use different IP addresses for TCP/TLS (control channel) and UDP/DTLS (data channel) flows. The data in DTLS client-hello helps the load balancer balance the control and data connection to the same server 200 in the cluster.

§ 6.0 CLOUD CONNECTIVITY

FIG. 9 is a diagram illustrating various techniques to forward traffic to the cloud-based system 100. These include, for example, use of the application 350 as a client connector for forwarding traffic, use of the connector 400 app, use of the VNF 502 or some other device, use of the edge connector 150A, and use of an eSIM/iSIM/SIM-card 600. The application 350 can be referred to as a client connector and it is via a native application executed on the user device 300 as well as being user ID-based. The connector 400 can be referred to as an app connector. The edge connector 150A can be referred to as a private service edge.

There is a requirement to get any customer traffic to/from the cloud-based system 100. However, there is a gap on some devices. The current approach, e.g., with the application 350, the connector 400, etc. there is a reliance on the device, namely installation of a forwarding app, a reliance on an operating system, namely virtual interfaces, and a reliance on forwarding gateways, namely the edge connector 150A. However, these may not be available with other types of devices such as IoT devices and the like. As described herein, the present disclosure utilizes the term client device to include, without limitations IoT devices (e.g., smart scooters, etc.), Operational Technology (OT) platforms (e.g., Supervisory Control and Data Acquisition (SCADA) systems, Industrial Control Systems (ICS), etc.), medical equipment (e.g., CAT and MRI scanners, etc.), connected vehicles, and practically any device that has a Subscriber Identification Module (SIM) in the form of a card, an eSIM, or an iSIM. Those skilled in the art will recognize that a client device differs from the user device 300 as it may not have the ability to implement the application 350, not support a user ID for identifying the user 102, etc.

The present disclosure includes two additional techniques for cloud connectivity for IoT devices including an eSIM/iSIM/SIM-card 600 based approach and a cloud/branch/thing connector 604. The ESIM/iSIM/SIM-card 600 based approach can be referred to as a device connector. The ESIM/iSIM/SIM-card 600 based approach is used for forwarding traffic from any SIM-based device (e.g., 2G to 5G and beyond). The key here is identity is based on the ESIM/iSIM/SIM-card 600, namely the International Mobile Equipment Identity (IMEI), as opposed to a user ID.

The connection between the cloud-based system 100 and on-premises connector 400 is dynamic, on-demand, and orchestrated by the cloud-based system 100. A key feature is its security at the edge—there is no need to punch any holes in the existing on-premises firewall. The connector 400 inside the enterprise or the like (on-premises) "dials out" and connects to the cloud-based system 100 as if too were an endpoint. This on-demand dial-out capability and tunneling authenticated traffic back to the enterprise is a key differentiator for ZTNA. The app connector 400 is used for virtual private access. The paradigm of virtual private access systems and methods is to give users network access to get to an application and/or file share, not to the entire network. If a user is not authorized to get the application, the user should not be able even to see that it exists, much less access it. The virtual private access systems and methods provide an approach to deliver secure access by decoupling applications 402, 404 from the network, instead of providing access with a connector 400, in front of the applications 402, 404, an application on the user device 300, a central authority 152 to push policy, and the cloud-based system 100 to stitch the applications 402, 404 and the software connectors 400 together, on a per-user, per-application basis.

With the virtual private access, users can only see the specific applications 402, 404 allowed by the central authority 152. Everything else is "invisible" or "dark" to them. Because the virtual private access separates the application from the network, the physical location of the application 402, 404 becomes irrelevant—if applications 402, 404 are located in more than one place, the user is automatically directed to the instance that will give them the best performance. The virtual private access also dramatically reduces configuration complexity, such as policies/firewalls in the data centers. Enterprises can, for example, move applications to Amazon Web Services or Microsoft Azure, and take advantage of the elasticity of the cloud, making private, internal applications behave just like the marketing leading enterprise applications. Advantageously, there is no hardware to buy or deploy because the virtual private access is a service offered to end-users and enterprises.

§ 7.0 DECEPTION TECHNOLOGY

As attacks become more advanced, deception technology is becoming critical for early threat detection. Deception technology is a simple but effective approach to building security defenses that detect threats early with low false positives and minimal performance impact on the network. The technology works by creating decoys—realistic-but-fake assets (domains, databases, servers, applications, files, credentials, cookies, sessions, network traffic and more) that are deployed in an enterprise IT environment alongside legitimate assets. For an attacker who has breached the network, there is no way to differentiate the fake from the real. The moment they interact with a decoy, a silent alarm is raised while the systems collect information on the attacker's actions and intent. As described herein, the term "decoy" can be used interchangeably with breadcrumbs, honeypots, fake assets, lures, honeytokens, bait etc.

Modern-day deception technology-based cybersecurity defenses borrow heavily from proven military deception use of deceit, camouflage, and subterfuge. In the context of cybersecurity, defenders use decoys and lures to mislead attackers into believing that they have a foothold in the network and revealing themselves. The beauty of this approach lies in its simplicity.

Picture two adversaries with comparable capabilities but differing goals facing off against each other. The odds of either of them winning are usually at a coin toss. What if one of the two had the benefit of speed, flexibility, and targeted information? It is no contest. The speedier, nimbler of the adversaries will usually outcompete their opponent. Even so, the latter has greater strength and access to more information. Because the opponent with more information falls into 'analysis paralysis.' They have so much information that analyzing all of it becomes infeasible and some information must be prioritized over the rest. This is how adversaries lacking in strength usually win an adversarial contest.

Something very similar happens in cybersecurity. Consider for a minute how things have played out over the past couple of decades. Attacker: Let's play a game with some simple rules. I'll try to access your information or other resources. If I'm successful "once," I win. Defender: Sounds fair. Attacker: If you prevent me from being able to reach my target "at any time" including otherwise rough or busy days, after-hours, on weekends and holidays . . . you win. This is a rigged game. As a defender, you need to be right 100% of the time. The attacker just has to be right once. Thankfully, deception flips the table by placing the burden of success on the attackers instead. Once you populate your network with decoys, adversaries need to carry out a flawless attack without interacting with any deceptive assets, triggering any detection controls, or prompting other defensive actions, to succeed in their attack. In other words, the attacker now needs to be right 100% of the time, while a single mistake hands the defenders a win.

Deception technology is attack-vector-agnostic. It only ever looks at the intent of the adversary to detect attacks. No legitimate user has any business accessing a decoy system, file or application. Therefore, by design, any interaction with a decoy is suspicious at a minimum and malicious at worst. Since deception-based defenses do not depend on signatures or heuristics for detection, they are able to detect virtually any attack including APTs, zero-days, reconnaissance, lateral movement, malware-less attacks, social engineering, man-in-the-middle attacks, and ransomware in real-time. Decoys are essentially zero trust, they assume all interaction are by default malicious or suspicious.

Against the vast majority of adversaries, deception is extremely effective because it leverages the fact that they do not know everything about the network they are trying to move around. Since decoys are essentially just another asset in the network and their strength is functional and not technical, differentiating them from legitimate assets is virtually impossible. Further, by injecting fake records in a user's browser history, password manager, and other common points of internal reconnaissance, the attacker can be deceived about functional uses of decoys, making them appear like they are either regularly-used assets—indicating they are likely useful and can be used by the attacker to move laterally to what appears to be a valuable target—or an infrequently-used but valuable asset—indicating they can be used to access privileged and/or critical information.

It is assumed that deception is a capability deployed only by highly mature security organizations. Deception is becoming a mainstream capability across markets. The mid-market CISO is faced with a conundrum—Her security team and budget are small, but she still has a significant threat and risk perception (perhaps she's in an industry without compliance regulations driving investment). She's got some basic security hygiene in place but needs to do something to detect more serious threats. Her wish list from a solution is: i) Fast to get going—a quick win today v/s perfection tomorrow, ii) Easy to use and low maintenance given her small internal security team, iii) Not a point solution, as she can't invest in multiple technologies, and iv) Wide coverage for areas like cloud and IoT. Deception perfectly checks all the boxes above for her, letting her quickly start punching above her weight when it comes to more advanced, targeted threats.

§ 7.1 Advantages of Deception Technology

In anti-submarine warfare, the sighting of a periscope breaking the water is an unambiguous indicator of an imminent threat. We believe deception alerts are very similar, and term them 'periscope events'—a behavior that, when detected, clearly indicates that an attacker is in the network. If you place detection classes on a scale of accuracy, at one extreme you have:

i) Signature-based detection, which is highly accurate but very threat specific, (such as the propeller signature of a specific submarine).

ii) On the other extreme you have behaviors/heuristics which have broad threat coverage, but more prone to false positives (such as a radar contact that may be a submarine or a shoal of fish).

Deception's periscope events are the middle ground—highly accurate, but with broad threat coverage (we can broadly detect any type of submarine with extremely low false positives). FIG. 10 is a diagram illustrating signatures vs. behavior vs. deception.

Most security controls are not aware of current business risks (your antivirus does not know or care that you're going through an M&A). However, deception is intrinsically aligned with the current business threat perception. For example, if a company is launching a new product, it can create deception around that product launch, aligning security controls tightly to areas where the organization perceives risk.

Since deception is a detection class, it can be applied broadly horizontally across the enterprise, including environments that are often neglected blind spots. For example, deception can detect threats at the perimeter, the endpoint, the network, Active Directory, and application layers, as well as offer coverage to more neglected environments such as SCADA/ICS, IoT, and cloud. Unlike point solutions, deception also covers the entire kill-chain; from pre-attack reconnaissance to exploitation, privilege escalation, lateral movement, and data-theft/destruction.

False positives cripple security team productivity and drag both IT and security teams through convoluted triage workflows. Often, the process of trying to validate the alert is more time consuming than the actual remediation measure. Deception has an intrinsic low false-positive property—nobody should open a decoy file, log in to a decoy application, use a decoy credential, or scan a decoy server. However, the alerts are also far more contextual; giving insight into the attacker's intent ("they went for the R&D information, not the financial systems").

Most behavior-based systems try to establish a normal baseline and then classify any activity above the baseline as anomalous, this leads to a number of false positives. Deception establishes a zero-activity normal baseline, where any activity at all is worthy of investigation. It also gives detailed IOCs (indicators of compromise). Everything that happens on a decoy is considered evil; hence, analysts do not need to weed through the data to segregate legitimate user activity and forensically relevant artifacts. Not only can you detect more reliably, but you can 'know your enemy' far better.

You can also use deception to qualify medium or 'warm' alerts from other platforms. For example, a UEBA system may generate a medium risk score for a user's behavior, leaving the analyst in no man's land—"is this a threat, or a false positive?" Dynamic deployment of deception on and around that user's environment may result in a higher-order detection if the attack is real.

Ring-fencing potential problem areas in this manner is also exceptionally useful during incident response in environments where the available logging is limited, but a rapid increase in visibility is required. If the DMZ may be compromised, lay down deception and watch for privilege escalation or lateral movement detection while the root cause of the compromise is being investigated. This can help answer two of the most fundamental questions in incident response, "how far in did they get, and are they still in?".

Orchestrated/automated response is most useful only when the trigger event is 100% certain. While plenty of orchestration tooling is being built (like shovels during the gold rush), not many real-world transformational orchestration use cases exist because there are very few alerts that are 100% certain. The ones that are, typically don't require orchestration, because the products that generate them already contain remedial capabilities (for example, an anti-virus detection quarantining a file).

Deception alerts are highly certain, contextual, and real-time, affording opportunities for security teams to orchestrate more complex and invasive scenarios (for example, use of a decoy credential can result in automatic redirection of the compromised asset into a decoy environment, while disabling the logged-on user's account and access in the real environment).

In terms of containment/response use cases, deception alerts can integrate with:

Network Access Control—Quarantine a compromised asset

Web gateways—Disable the compromised asset's Internet access, block phishing sites identified by email decoys.

Endpoint protection—Kill a suspicious process or quarantine the endpoint

EDR—Identify and block IOCs on all other endpoints

Directory Services/Identity and Access Management—Disable the user's account, change a password, and enable/enforce two-factor authentication Firewalls—Dynamically deny access to network segments Zero trust systems as a potential containment mechanism Since deception alerts are contextual, the response can also target the appropriate application. For example, if an attacker targets a decoy SWIFT server in a banking environment, the user's account can be disabled for the real SWIFT server.

§ 7.2 Use Cases of Deception Technology

Deception can be used to detect threats across the kill-chain starting with reconnaissance going all the way up to data theft. Broadly, there can be three key use cases—1) perimeter deception defense, 2) network deception defense, 3) endpoint deception defense,) Identity systems (for e.g., Active Directory) and 5) IoT/OT deception.

§ 7.2.1 Perimeter Deception Defense

At a time when it's possible to scan all IPv4 IPs in under an hour, monitoring all inbound connections—even just the unusual ones—becomes like drinking from the proverbial fire hose. With VMs available in the cloud within minutes, the noise comes not just from suspicious visitors to a page or from adversaries targeting the organization, but from almost anyone that can create a cloud account and run a script or two. Security isn't a big data problem so much as a good data problem.

Setting up deceptive public-facing assets, if done right, can drastically simplify this problem and give you actionable telemetry on who's targeting you. This is different from simply setting up a traditional honeypot with a number of open ports on a public IP. Such a setup is going to generate noisy alerts as everything from Google and Shodan to scripts for college research projects trying to connect to these honeypots. Instead, deploying decoys that mimic beta/staging applications can create high-confidence alerts telling you that an attacker is attempting to reach specific public-facing (but unannounced) infrastructure. Irrespective of their reason and methodology for doing so—including scripts set up to search for such infrastructure belonging to specific organizations, the alerts produced become a high-confidence indicator of intent to locate sensitive infrastructure belonging to your organization.

These alerts become useful pivot points to check for other activity in the valuable but voluminous logs from the WAF (Web Application Firewall) and other sources. For example, other interactions by the source attempting to access public-facing decoys can be looked into and the source optionally blocked. If successful login attempts are discovered, resetting the user's credentials and enabling 2FA (Two Factor Authentication) for the account are common first steps for a containment.

§ 7.2.2 Network Deception Defense

Barring insider threats, once attackers gain a foothold in an organization, they're like a new employee on day one except for the onboarding—they have a very broad sense of the objective they need to achieve, but no information on the relative location of the things they need or how to get there. A strategically deployed set of decoy internal servers and workstations play well here, being available as targets to the attacker. However, simply deploying decoys leaves the odds of them being targeted at not much better than random chance. Effective network deception requires the decoys to be placed in the various locations an attacker might peruse to identify targets; better still if they can be made to look not just like valuable assets on the network, but systems that the appropriate legitimate users interact with to perform their tasks.

Regular users know the hostnames or network locations of the databases they need to administer, the document servers they need to pull files from, the hosts they must remote into. Even forgetful users that connect to a couple of incorrect hosts in the course of looking for the one they want are unlikely to continue once they can see that they have connected to a different host than the one they intended to connect to.

An attacker, on the other hand, often has something of value to glean from connecting to a different system than the one they seek to target. This results in different behavior from a regular user, making attacker interactions with decoys easy to differentiate from a user that mistyped an IP. As with other types of deception, such alerts then make for great points to begin investigations from.

§ 7.2.3 Endpoint Deception Defense

Consider your usage of the file system on your machine. More often than not, you probably know which file you want and where its located. For folks that deal with a large number of local files, you may search through the file system using some keywords you know to be associated with or present in the file you're looking for.

However, if a decoy file is placed on your system, it's unlikely to affect any tasks you need to perform, particularly if you know it's a decoy. To an attacker, though, a file that appears to have legitimate and valuable content, and looks like it is accessed by the user, is a candidate for exfiltration. Coupled with fake processes, and breadcrumbs pointing to decoy workstations/servers posing as legitimate systems accessed by the user, endpoint deception can be put to use to detect not just behavior that would be suspicious on the network, but also behavior that would be the norm on the network but has no legitimate place on a particular endpoint at a particular time.

Even a malicious insider who might be familiar with weaknesses in existing defenses doesn't have extensive knowledge of every valuable file on other endpoints. Additionally, since the goal of many attacks is data theft, theft of decoy files becomes a particularly high priority signal because it indicates an attacker may be close to accomplishing their goal—after all, an attacker stealing decoy files is likely to also be stealing real ones.

§ 7.3 Deception with Other Security Functions

Deception technology is a "force multiplier" for a number of existing capabilities that organizations may already have implemented. Here are some examples:

Deception+Endpoint Detection & Response (EDR)—Endpoint detection can be significantly improved with deception. An attacker using decoy credentials stored in memory, following a decoy SSH or RDP session, or trying to escalate privileges by exploiting a decoy running process provides extremely reliable indicators of malicious host-based activity. The EDR can 'fill in the blanks' into what happened before (which processes ran, what other network connections were created, etc.).

Deception+User Entity and Behavior Analytics—User Entity and Behavior Analytics (UEBA) systems are prone to false positives and data paralysis, especially in larger, geographically disparate networks where analysts may not have the context to validate an alert (Eric in the Paris security team doesn't know why Nakamura san is uploading a lot of data in Tokyo). However, the UEBA system can provide excellent enrichment to a deception alert, fleshing out the user backstory. For example, if a decoy file is copied and the user is suddenly logging in outside of office hours concurrently from two places, the detection is very likely to be real.

Deception+Sandboxes—Sandboxing was deception 1.0, focused on convincing malware to detonate and reveal its cards. Modern deception is sandboxing for the human attacker. By providing a wider virtual 'attack surface', and a believable environment for them to progress their attack, higher-order forensics can be developed.

Deception+Threat Intelligence—Many threat intelligence services offer dumps of malware hashes, domains or IPs that rapidly go stale or are devoid of context ("block these 5000 IPs because they're from China"). The commercial ramp-up to more specific threat intelligence is significant, and often only consumable by extremely mature security organizations. While deception is typically seen as a behind-the-firewall capability, it is possible to deploy Internet-facing decoys that only engage with targeted threats against a named organization. These 'private threat intelligence' decoys give predictive analytics of attacker activity early on in the reconnaissance phase of the kill chain.

For example, decoy Amazon S3 buckets incorporating the company's name can identify attempted reconnaissance, while decoy UAT, staging and testbed subdomains can identify attackers looking for a weak way in. Decoy login portals/webmail systems/VPNs can also reliably uncover spear-phished credentials (attackers need somewhere to use them). More business-specific use cases include decoy credit cards with a specific bank BIN or fake insurance policyholder information that may be targeted at renewal time.

The use of deception lets less mature companies create rather than consume threat intelligence that is specifically relevant to their vertical or geography. More advanced security teams can leverage advanced counterintelligence deception use cases, such as decoy social media accounts to attract spear-phishing.

Deception+Network Traffic Analysis—Network threat detection is a critical piece of the puzzle, especially since attackers cannot avoid using the network to move around. However, network threat analytics tools suffer from scalability challenges in deployment and are increasingly blind as more traffic is encrypted, even east-west in the network. Network deception is the 'original honeypot', and it still works exceptionally well at detecting everything from worm-like activity such as network-driven ransomware to targeted attackers in large networks.

Through improvements in virtualization and software-defined networking, we can place network decoys at scale in every subnet and VLAN, as well as in the dark IP space of the network to efficiently detect network-driven threats. Moreover, since the network decoy itself is instrumented, it is not blind to encrypted traffic and can provide full packet forensics about the threat.

Deception+Threat Hunting Platform—Deception and threat hunting are two pillars of 'active defense'—proactively attempting to take the fight to the adversary. We find that the champions for deception technology at many of our customers are the threat hunting teams, as they are able to think like the attacker and deploy deception in paths where they perceive they will have to traverse.

A deception alert is a perfect trigger to a hunt mission and can let an analyst ring-fence a potential incident with decoys while they pivot on available data to understand the root cause of the threat. The real-world analogy of a hunter laying traps is extremely applicable here.

Deception technology can help you cut down your:

Mean Time to Detect (MTTD): Dwell time usually spans months. When you strategically lay traps across your network, you leave attackers with very limited room to maneuver. This can cut down your MTTD to near-zero.

Mean Time to Know (MTTK): Since deception deployments generate fewer and higher-confidence alerts, the attacker's activity can be studied much more closely, their TTPs fingerprinted, and their intended target identified in minutes instead of days or hours, particularly with a threat hunting team at the console. In fact, we've even seen teams achieve this in single-digit minutes for some attacks.

Mean Time to Respond (MTTR): With the deception deployment in place for a few weeks or months, you can strategize around automated response for known attack types. This frees up man-hours that can then be directed towards defending against more capable adversaries, and other operational requirements.

Deception deployments do away with perhaps your most pressing pain point—the flood of alerts from all your security tools. Over the years, the industry as a whole seems to have come to the needle-in-the-haystack problem, saying "Here's some more hay". It's the reason teams miss alerts or tune them out like the OS error dialogues most folks don't bother reading before dismissing. With deception, you can instead begin with a high-confidence alert and trace it back to the proverbial needle using specific attributes in the SIEM, specific network source, time range, and optionally, a username.

Once the response for known attack types is automated, it does away with the tedium of analyzing alerts that any machine could. The boring stuff is automated, leaving you to focus on matters that actually warrant your attention.

§ 7.4 Deception System

FIG. 11 is a network diagram of a deception system 700 with endpoint agents such as the application 350 and with appliances 702 in an enterprise network 704. The deception system includes a central management console 710, an aggregator 712, a decoy farm 714, the appliance 702, the endpoint agent 350, and management system 716.

The central management console 710 is the main component responsible for everything from UI, managing appliances 702 and endpoint agents 350 to event processing and deployment of decoys and policies on the endpoints. The aggregator 712 is configured to terminate tunnels between the appliances 702 and the decoy farm 714. It is responsible for routing of traffic.

The decoy farm 714 can include containers which host the decoys and forward the events and evidence to the central management console 710. The appliance 702 can be a lightweight VM which resides in the client environment and is responsible for projecting the decoys onto their network.

The endpoint agent 350 can be a lightweight agent deployed on the endpoints that is responsible for deploying the endpoint deception and monitoring for the first order detections. It talks to the central management console 710 for the policies and also to send back the events.

§ 7.5 Cloud-Based Deception System

Figure 12:
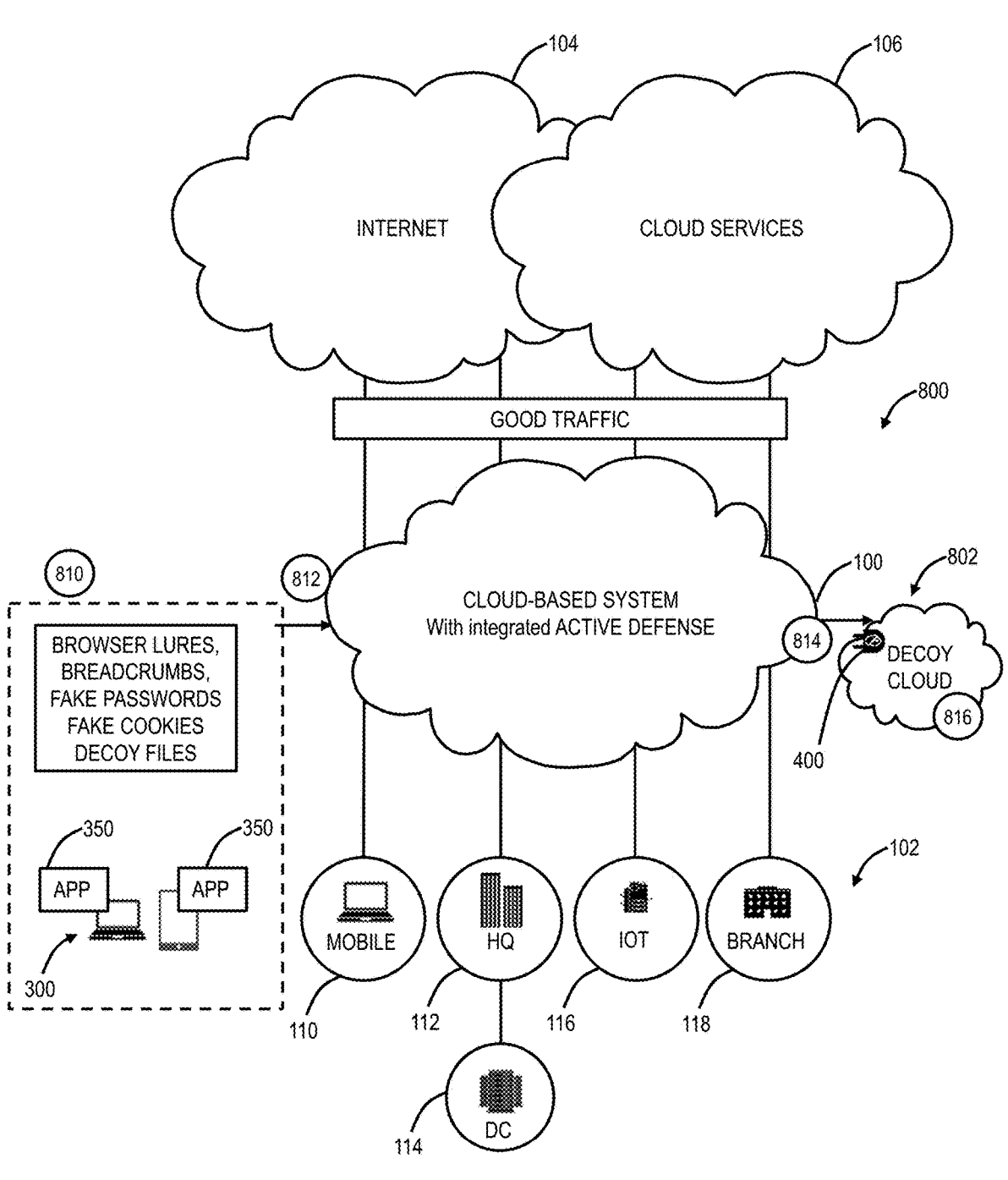
FIG. 12 is a network diagram of a deception system utilizing the cloud-based system in lieu of on-premises appliances.

FIG. 12 is a network diagram of a deception system 800 utilizing the cloud-based system 100 in lieu of on-premises physical or virtual appliances. Deployment of deception is dependent on routing attack network traffic to decoys. Traditional architectures as in the deception system 700 require the use of appliances/virtual machines in order to project decoys onto the network. Disadvantageously, this requires on-premises deployment within the enterprise network 704 which requires IT resources, does not scale with distributed users 102, etc.

The present disclosure includes integrating deception which can be referred to as active defense with the cloud-based system 100. By integrating with the cloud-based system 100 which provides ZTNA, attack traffic that should be destined for decoys can be routed through the cloud-based system 100 'switchboard.' Dynamic routing of traffic based on zero trust principles and modification of the network data path is possible to make on-the-fly decisions on which decoy to send an attacker to. Legitimate traffic can pass through the cloud-based system 100 to 'known good' destinations without any redirection, and intruder traffic can be routed to a decoy cloud 802.

By using the cloud-based system 100 as a zero trust policy director as a switchboard, it is possible to deploy deception into an environment without any physical/virtual appliances or engagement virtual machines. Removal of the appliance creates a completely software-defined deception mesh that can route attack traffic from any device in the network that is connected to the cloud-based system 100 to decoys in the decoy cloud 802.

The decoy compute feature no longer exists in the user environment and is instead hosted in the decoy cloud 802. Attackers are unaware that their engagement occurs in the decoy cloud 802, and the deception can be dynamically scaled based on the zero trust policy requirements of the user 102. The decoy cloud 802 looks like the enterprise network. Deception policies can be dynamically created based on the user's 102 real application access policy that is captured in the cloud-based system 100. This makes the deception far more believable as it is intrinsically based on the actual user 102 and application 350 trust policy. That is, the application 350 has rich user information based on existing services in the cloud-based system 100. Deception alerts gain additional context/intelligence from the cloud-based system 100 for more actionable alerts. Potentially suspicious traffic that would normally be dropped/allowed can be dynamically redirected to decoys in order to 'play out' the threat, gain better telemetry and validate whether the traffic is legitimate or malicious. Deception becomes a configurable policy action that can be taken by users 102 to define whether traffic is routed to decoys.

Referring to FIG. 12, the application 350 can be configured to support deception technology among other features, and the decoy cloud 802 can be a SaaS hosted environment for each customer (i.e., tenant, enterprise, etc.) which is isolated and segregated from the customer's real IT environment. The decoy cloud 802 includes a reverse-connect connection broker (e.g., the app connector 400) deployed in the decoy cloud environment that connects to the cloud-based system 100.

The cloud-based system 100 can include a policy director which includes policies for routing traffic to the decoy cloud 802 environment. The policies are automatically and dynamically created by the policy director within the cloud-based system. Additionally, users can create their own policies to granularly decide when to send traffic to decoys for example, based on traffic profile, time of day, user activity, etc. Traffic is evaluated by the cloud-based system 100 and dynamic decisions are made on whether to route it to legitimate applications or to decoys. The deception system 800 inter-links with the cloud-based system 100, correlating user/device/application identity mappings for high-context, low false positive alerting.

In an example operation, the endpoint agent 300 can plant browser lures, breadcrumbs, fake passwords, fake cookies, decoy files, etc. (collectively referred to as "fake assets") on the user device 300 (step 810), and corresponding decoys associated with the fake assets are deployed in the decoy cloud 802. For example, fake passwords can be for legitimate sites that can be decoyed in the decoy cloud 802. When an intruder accesses the fake assets (step 812), the cloud-based system 100 blocks the intruder traffic since it is not good traffic and diverts it to the decoys (step 814). The decoy cloud 802 monitors the activity of the intruder to gain valuable telemetry, private threat intelligence, indicators of compromise, threat hunting, etc. (step 816). Advantageously, this approach has low false positives (i.e., no legitimate use for the fake assets, so assume any access is illegitimate) and rapid containment of the intrusion.

Specifically, when an intruder accesses a fake access on an ingress connection, the egress connection is routed back to the decoy cloud 802 via the cloud-based system 100 instead of back out as good traffic. In this manner, the intruder is unaware and performs activity in the decoy cloud 802. Here, it is possible to gain intelligence about the threat without actually compromising actual resources.

Advantageously, this approach can be used to secure the endpoint device 300, secure applications thereon, secure the cloud, and the user's 102 identity.

§ 7.6 Cloud-Based Deception Process

FIG. 13 is a flowchart of a cloud-based deception process 850. The cloud-based deception process 850 contemplates operation via the cloud-based system 100 and the decoy cloud 802. In an embodiment, the decoy cloud 802 can be part of the cloud-based system 100, it is show separately to illustrate the functionality. The cloud-based deception process 850 can be a computer-implemented method having steps, implemented via one or more servers having processors configured to implement the steps, and as instructions embodied in a non-transitory computer-readable medium for causing one or processors to implement the steps.

The cloud-based deception process 850 includes hosting a decoy cloud environment for a customer that contains a plurality of decoys and that is hosted and separated from a real environment of the customer (step 852); receiving traffic from a user associated with the customer (step 854); detecting the traffic is related to accessing a fake asset on a user device associated with the user (step 856); rerouting the traffic to the decoy cloud environment (step 858); and monitoring activity associated with the fake asset in the decoy cloud environment (step 860).

The steps can further include detecting the traffic is unrelated to any fake asset on the user device (300) and processing the unrelated traffic. That is, the cloud-based system 100 can perform any functions on the unrelated traffic, in addition to supporting the deception system 800. The processing can include any of allowing the unrelated traffic, blocking the unrelated traffic, cleaning the unrelated traffic, threat detecting the unrelated traffic, sandboxing the unrelated traffic, and the like.

The fake assets can include any deceptive assets, files, breadcrumbs, lures, bait, network traffic, passwords, keys, session information, and cookies. The key aspect of the fake assets is they are illegitimate and should never be accessed except for malicious purposes. The fake assets are meant to look real and entice any intruder. The fake assets can be based on a role of the user, such as determined based on historical monitoring of the user. Specifically, the cloud-based system 100 has rich user information for specifically tailoring the fake assets.

The steps can further include determining an indication of compromise for the user and/or the user device and providing a notification based thereon. Also, there can be various remediation approaches.

The rerouting can be based on a set of policies that include traffic profile, time of day, and user activity. The decoy cloud 802 can include the connector 400 configured to dial out only and reject inbound connections.

§ 8.0 BREACH DETECTION

The deception system 800 through the cloud-based system 100 is a high-fidelity, low false positive system to efficiently detect targeted, sophisticated threats both internally and on the perimeter using heuristic filtering and dynamic risk scoring of threats that engage with decoy IT assets including deceptive infrastructure, credentials, files, users, identity management systems and network traffic. The deception system 800 is difficult to evade as it is hidden from the attacker.

Advantageously, the deception system 800 provides breach detection technology to 1) Identify perimeter application threats while filtering out Internet 'noise' in order to identify only targeted threats against the perimeter.
2) Identify threats on endpoint devices without the overhead of collecting, transmitting and storing all endpoint activity.
3) Prioritize threats based on a dynamic risk scoring algorithm that tracks attacker activity in real-time and modifies the threat score based on attack patterns. The risk score is used for zero-trust conditional access policies.
4) Provide a hard to evade breach detection technology leveraging deception and countermeasures.

Most traditional security systems categorize alerts into 'high/medium/low' buckets (or some other discrete categorization) as they are prone to false positives. With deception-based breach detection technology, false positives are minimal, so we granularly score every attacker action in order to build a risk-based alerting and prioritization model.

The risk scoring algorithm operates by monitoring all activity by unique attackers against deceptive/decoy assets that include fake systems, passwords, files, and network traffic. Every additional step taken by the attacker increases the score. For example, starting a network connection, upgrading it to a full connection, sending data, sending data that has a malicious payload.

The risk score can be used with thresholds to make automatic policy decisions in a zero-trust system. For example, if the score crosses 100, an automated containment response is initiated. Of note, all hits on the fake assets are malicious by definition—this risk scoring covers a unique way to convey the actual threat.

Using this novel scoring approach, this breach detection system can detect threats against the perimeter using decoy systems on the Internet. Traditional systems would generate too much 'noise' for such an approach to be viable, however, by dynamically tracking attacker behavior, the system can generate extremely low false positives and differentiate between targeted attacks v/s non targeted general attacks on the Internet.

On the internal network, this system 800 utilizes deceptive assets, files, breadcrumbs, lures, bait, network traffic, passwords, keys and cookies in order to detect attacks without logging all system activity and transmitting it to an analysis system like traditional approaches do. This system can perform all threat detection locally on the endpoint device without the overhead of transmitting, analyzing, and storing data centrally. This distributed detection quality allows it to offer substantially greater scalability to millions of endpoint devices through reduced resource utilization.

Similar to 'trap pins' designed to make physical locks hard to pick, the system has countermeasures to make it extremely hard to evade. By hiding on the system, creating deceptive versions of itself and other security software and detecting active attempts to probe or discover the threat detection system, an attacker's attempts to subvert the threat detection not only are thwarted, but raise a high-risk score alert of an evasion attempt.

An advantage of the deception system 800 with the cloud-based system 100 is there is no need to log all activity on the user device 300, this is already managed off-device in the cloud-based system 100. The user device 300, with respect to deception, only has to log activity related to the fake assets. This minimizes the resource consumption at the user device 300.

§ 9.0 AUTO-DECOY AND BREADCRUMB CREATION

The present disclosure can include analyzing a user's activity in order to dynamically create deceptive assets such as files, passwords, breadcrumbs, lures, cookies, sessions etc. that are contextually relevant to the user's job profile, daily tasks, and designation. The system can auto-configure itself to differentiate between, for example, a vice president of Marketing v/s an IT system administrator. Specifically, the cloud-based system 100 and the application 350 have rich historical user information that can be used to further leverage the fake assets. The system 800 also creates network traps that are logically relevant pointers to the breadcrumbs. For example, a finance user will have breadcrumbs that automatically point to a finance related file server without user configuration. The system 800 can also automatically generate 'blend in' and 'stand out' decoys that mimic attributes such as the organization's network naming conventions and types of hardware used.

Advantageously, the present disclosure can

1) Automate the process of creating deceptive campaigns without requiring any manual user input in order to decide the deception strategy and provision the deceptive assets.

2) Substantially improve the realism of the deception to ensure greater probability of engagement by attackers who may know the 'lay of the land' either as insiders, or through earlier reconnaissance of the target.

3) Ensure that every deception campaign is unique for every organization, making the deception extremely difficult to fingerprint.

4) Allow users to immediately and dynamically modify the deception automatically or with the push of a button ("one-click"), where all deceptive assets can change their personalities unaided.

An aspect of the breadcrumb creation is the cloud-based system 100 has knowledge of user type. Also, it is possible to multiply fake assets to make each look unique and look like a customer environment, so the attackers are unaware.

§ 10.0 SECURITY RISK SCORE CALCULATIONS

Companies, organizations, enterprises, etc. often include networks for allowing end users to connect with servers to receive certain types of network services. As mentioned in the present disclosure, security within such a network can be implemented in a number of different ways. In many cases, network security operators, network security administrators, security stakeholders, etc. can benefit from a high-level view of their entire network. This may allow the network personnel to have a situational awareness to understand any exposures that their networks may have before the network can be exploited. However, many organizations with a large and complex policy structure may often lack the high-level visibility and insights required to holistically evaluate and compare their organization's posture against emerging cyber threats, especially as the configurations of their networks continue to evolve over time to meet the growing needs of the business. One problem, for example, is that licensed security features and capabilities might not be utilized or may be under-utilized. Also, their networks might not be configured optimally to yield the maximum value and protection, such as in the case where their networks are based on user entitlements or privileges to access certain network resources. Even security functionality that is newly released might not be fully leveraged as part of an organization's deployment and ongoing initiatives to reduce risk.

Therefore, in order to address this issue, the systems and methods of the present disclosure are configured to calculate certain network risks based on the current status of the network. The network status, for example, may be based on configurable security policies. That is, a plurality of security policies may be configured according to the particular needs of a network. However, if certain policies are configured incorrectly or are not updated as a network scales, certain vulnerabilities may arise. Thus, the systems and methods of the present disclosure are configured to calculate the risk of the occurrence of a breach, attack, etc. by evaluating the organization's policy configurations. In addition to policy configurations, the present disclosure may also analyze security licenses that have already been procured as well as analyze traffic patterns within the network and compare these factors with best practices.

Thus, the licenses (e.g., SKUs), policy configurations, traffic patterns, etc. may be analyzed to calculate a risk score.

Ideally, a network with a risk score of 0 is an indication that the security policies and licenses are fully utilized in an optimal manner such that there is no risk of an attack or breach to the network. Of course, it may be difficult, if not impossible, to configure a network with absolutely no risk. Nevertheless, it would be beneficial to allow the network administrator to take certain actions to increase the network security and thereby reduce the risk score.

The systems and methods are not only configured to calculate such a risk score, but also are configured to display the risk score in a manner that communicates this valuable information to the network administrator. In some embodiments, the risk score can be provided to security operations teams, such as on a display, user interface, dashboard, etc. Also, the embodiments of the present disclosure can also display a prioritized and contextualized list of recommended policy changes to the network deployments in order to allow the teams to improve their overall security posture and further mitigate their risk against encrypted-based threats, web-based threats, network-based threats, and file-based threats, which may include the threats that security applications are designed to protect against. In some embodiments, the systems and methods may also provide a historical view of a company's risk score changing over time, which can be based on the results of leveraging optimized security capabilities and can be compared with industry standards or peers.

Figure 14:
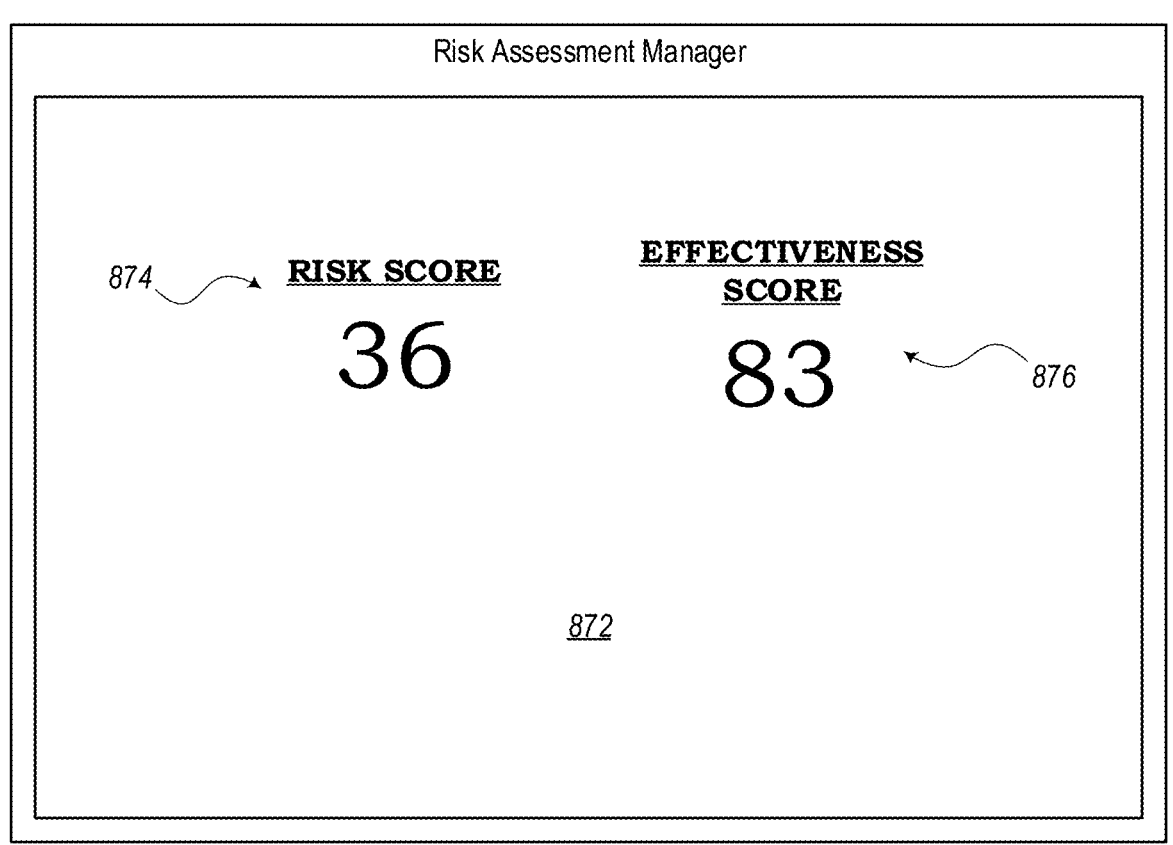
FIG. 14 is a diagram illustrating a user interface that may be associated with a user device operated by a network administrator, network technician, security stockholder, network security administrator, or other user who may be responsible for configuring network policies on a network, such as a network associated with a company, enterprise, business, etc.

FIG. 14 is a diagram illustrating a user interface 870 (e.g., Graphical User Interface (GUI), I/O interface 304, or the like) that may be associated with a user device operated by a network administrator, network technician, security stockholder, network security administrator, or other user who may be responsible for configuring network policies on a network, such as a network associated with a company, enterprise, business, etc. As illustrated, the user interface 870 may include one or more screens 872, dashboards, displays, and/or other visual elements for allowing the user to view results of the risk analysis or risk assessment systems and methods disclosure herein. The user interface 870 is shown in a simplified manner to emphasize that any display procedures, graphs, tables, etc. can be included for communicating network assessment results in any suitable manner. For example, as shown, the user interface 870 shows a risk score 874 (or security risk score) and an effectiveness score 876 on the screen 872. The risk score may be an indication of the detected security risk based on the current status of the network. The effectiveness score may be an indication of the detected capabilities or effectiveness of various security products for mitigating risk in the network. It may be noted that the risk score 874 and effectiveness score 876 may essentially be inversely related, whereas a lower risk score may be the result of effective security products being utilized in an effective manner.

FIG. 15 is a diagram illustrating a system 880 for calculating a risk score (e.g., risk score 874). The system 880 may include any suitable combination of hardware, software, firmware, etc. and may include physical and/or virtual components or units. As shown in FIG. 15, the system 880 includes a capabilities unit 882, a policy configurations unit 884, a dynamic rules unit 886, and a traffic unit 888. The capabilities unit 882, policy configurations unit 884, dynamic rules unit 886, and traffic unit 88 are configured to obtain, receive, measure, or calculate certain settings, controls, values, etc. from the network under test and provide these settings, controls, values, etc. to a risk calculator 890. The risk calculator 890 is configured to calculate the risk score based on the received input. As mentioned above, the risk score 874 may be displayed on a UI.

FIG. 16 is a flow diagram illustrating a method 892 for calculating a risk score that is an indication of a level of risk associated with a network or domain. In particular, the method 892 for calculating risk, according to some embodiments, may include the step of analyzing a network to assess a "license status" of the network, as indicated in block 893. The license status, for instance, may be related to one or more security licenses procured for providing security protection to the network. The method 892 may also include the step of analyzing the network to assess a "configuration status" of the network, as indicated in block 894. The configuration status, for instance, may be related to configurations settings of one or more security policies currently operating with respect to the network. Then, based on the assessed license status and configuration status, the method 892 may be configured to calculate a "security risk score" indicating a current level of risk that the network faces against threats, intrusions, cyber-attacks, breaches, and/or data loss, as indicated in block 895.

Furthermore, the systems of methods of the present disclosure (e.g., method 892), with regard to calculating the risk score, may include additional features and perform additional functions. For example, the systems and methods may be further configured to display the security risk score on a user interface of a network device associated with a network security administrator. Also, the embodiments may include determining a prioritized list of one or more recommendations for changing the configuration settings of the security policies in order to mitigate the risk and improve the security risk score. In this case, the embodiments may also display the prioritized list on the user interface. Based on the security risk score, the systems and methods may include calculating a "risk level" (or risk class) from among a plurality of risk levels each defining a range of security risk scores. Again, this calculated risk level may too be displayed on the user interface.

Furthermore, the one or more security licenses may be related to security protection with respect to one or more of a) threat protection, b) data loss prevention, c) cloud access security, d) network security, e) cloud sandbox security, and f) cloud firewall protection. The one or more security policies may be related to policies with respect to one or more of a) advanced threat protection, b) Uniform Resource Locator (URL) filtering, c) firewall protection, d) intrusion prevention control, e) File Transfer Protocol (FTP) control, f) malware detection, g) cloud sandbox protection, h) mobile malware prevention, i) browser control, j) file type control, k) Dynamic Link Library (DLL) protection, and 1) Secure Sockets Layer (SSL) inspection. The step of analyzing the network to assess the configuration status further includes the step of inspecting one or more of a) Transport Layer Security (TLS) or Secure Sockets Layer (SSL) traffic, b) authenticated traffic, c) traffic utilizing firewall controls, and d) traffic protected by intrusion prevention controls.

In some embodiments, the security risk score may essentially be a measure of the security posture of the network. The threats, intrusions, cyber-attacks, breaches, malware exposure, and data loss described above may be related to encrypted-based threats, web-based threats, network-based threats, and file-based threats. For example, the security risk score may include an encrypted-based risk score, a web-based risk score, a network-based risk score, and a file-based risk score. In some embodiments, the systems and methods may also include the step of repeating an assessment of the license status and configuration status to recalculate the security risk score on a periodic basis.

§ 10.1 Risk Score Based on Security Licenses

From the system 880 of FIG. 15 and method 892 of FIG. 16, it may be understood that the systems and methods of the present disclosure may base the risk score calculation at least on the security licenses that have been procured for use in a network. The capabilities unit 882 is configured to assess the licenses (e.g., block 893) that are already in place to see the capabilities of the network to enact certain security measures. This may be based on what security licenses a network may have. For example, the capabilities (based on security licenses, SKUs, etc.) may include security software or services offered by one or more vendors.

§ 10.2 Risk Score Based on Configuration of Security Policies

Also shown in FIG. 15 is the policy configurations unit 884, which is configured to output configuration data to the risk calculator 890 for calculating the risk score. In addition, block 894 of the method 892 of FIG. 16 includes assessing policy configurations. The policy configurations unit 884 may assess the policies and/or configurations (e.g., block 894) to determine what policies or configurations that a network or system is currently using. The policy configurations unit 884 may analyze the network under test to determine variable configurable policies of the security software and/or services. These configurable policies may include information related to a) Advanced Threat Protection policies, b) Malware Protection policies, c) Advanced Settings policies, d) Mobile Threat policies, e) URL filtering policies, f) cloud app control policies, g) browser control policies, h) FTP control policies, among others. In some embodiments, the configurable policies may also include one or more other policies related to intrusion prevention, data loss prevention, malware detection, in-band or out-of-band Cloud Access Security Broker (CASB) protection, advanced cloud sandbox protection, mobile malware protection, advanced cloud firewall protection, Network Security Services (NSSs), file type control, etc.

§ 10.3 Risk Score Based on Dynamic Rules

The dynamic rules unit 886 is configured to supply rules information and additional metrics to the risk calculator 890. The dynamic rules unit 886 is configured to determine what metrics have been obtained from the network. As shown, the dynamic rules unit 886 is configured to obtain and use a) Inline Sandboxing rules, b) URL filtering rules, c) File Type Control rules, d) Firewall Control rules, e) non-Web IPS control rules, etc. Additional metrics may include inspected SSL traffic, authenticated traffic, traffic utilizing firewall controls, traffic protected by an Intrusion Prevention System (IPS), etc. In some embodiments, these metrics may be obtained over a certain amount of time (e.g., over the last seven days).

§ 10.4 Risk Score Based on Traffic

The traffic unit 888 is configured to obtain, detect, or sense traffic through the network, which may include SSL inspection, traffic through a firewall, and/or non-web IPS traffic. The traffic unit 888 is configured to determine what types of traffic are being monitored. In some embodiments, additional types of traffic can be analyzed and provided to the risk calculator 890 for the calculation of the risk score.

§ 10.5 Risk Levels

The risk calculator 890 may be configured to calculate the risk score (e.g., block 895) on a scale from 0 to 100, where 0 is no risk and 100 is the highest risk. The risk calculator 890 thus determines how well the current security measures are protecting the network. The risk score may be considered to be the inverse of a "security score" that indicates a level of security currently operating on the network. Thus, a higher security is indicative of lower risk, while lower security is indicative of higher risk. Furthermore, the risk calculator 890 may be configured to determine a "risk level" that can be provided to the network security operator to indicate, in words, the level of network risk that currently exists. In one example, a risk score from 0 to 29 may be defined as "low risk," a risk score from 30 to 59 may be defined as "medium risk," a risk score from 60 to 79 may be defined as "high risk," and a risk score from 80 to 100 may be defined as "critical risk." It should be noted that fewer or more risk levels may be used, and the corresponding levels may be modified to include any suitable ranges.

§ 10.6 Example of Enterprise License Agreement (ELA) for an Organization/Company FIGS. 17A and 17B show an example of a report 898 (divided between FIGS. 17A and 17B and labelled 898a and 898b) having information that may be reported to an Enterprise License Agreement (ELA) customer. The report may include the organization's name (e.g., "Customer X"), a risk score (e.g., 39/100), and a risk level or risk zone (e.g., "Medium"). The report 898 may also include an organization ID, a number of policies configured, and a number of management settings. In a "Policies and Configuration Details" section, the report 898 may include one or more Advanced Settings policies and an associated risk level, one or more Advanced Threat Protection policies and an associated risk level, one or more URL Filtering policies and an associated risk level, one or more FTP Control policies and an associated risk level, one or more Malware Protection policies and an associated risk level, one or more Mobile Malware Protection policies and an associated risk level, one or more Browser Control policies and an associated risk level, one or more Cloud Sandbox policies and an associated risk level, one or more SSL Inspection policies and an associated risk level, and one or more Inline DLP Protection policies and an associated risk level. In a "Management Settings Details" section, the report 898 may include one or more Unauthenticated Traffic settings and an associated risk level, one or more SSL Inspected Traffic settings and an associated risk level, one or more Traffic Not Protected by Firewall settings and an associated risk level, and one or more Traffic not protected by IPS and an associated risk level.

In this example, each associated risk level may be selected from "low," "medium," "high," and "critical." These levels may be based on the ranges mentioned above where a risk score of 0-29 is indicative of a low risk (e.g., green), a risk score of 30-59 is indicative of a medium risk (e.g., yellow), a risk score of 60-79 is indicative of a high risk (e.g., orange), and a risk score of 80-100 is indicative of a critical risk (e.g., red).

In addition to the policies shown in FIG. 17, the "Advanced Settings" section of the report 898 may also include an Enable Policy for Unauthenticated Traffic setting. The "Advanced Threat Protection" section may also include a TLDs Assessed item and URL Categories Blocked items. The "FTP Control Policy" section may also include a non-web traffic visibility item and a non-web traffic controls and management item. The "Malware Protection Policy" section may also include an Inspect FTP item and an Inspect FTPOverHTTP. The "Browser Control Policy" section may also include a Chrome Browser item, an Internet Explorer Browser item, a Safari Browser item, etc. The "Cloud Sandbox" section may also include additional items. The "SSL Inspection Policy" section may also include Untrusted SSL Issuer item, an SSL traffic from iOS item, an SSL traffic from Android, etc. The policies section may also include a "Data Protection" section.

The "Management Settings" section may be referred to as "Additional Metrics," "Dynamic Rules" (e.g., dynamic rules unit 886), and/or traffic data (e.g., traffic unit 888). The traffic data may also include "authenticated traffic conditions," which may include a user ID, location ID (e.g., derived using cstats that excludes the location ID), department (e.g., unauthenticated transactions), and a need to derive the % of total traffic that is authenticated. The traffic data may also include "SSL traffic conditions," which may include data from weblogs (e.g., encrypted (protocol IN (SSL, HTTPS, HTTP_PROXY, Tunnel-SSL, DoH), etc.)), inspected (protocol IN (HTTPS, DoH, etc.)), acknowledged risk, unknown risk, etc.), a need to derive the % of inspected traffic, etc. The traffic data may also include "traffic managed by firewall," which may include Derive Location IDs where Firewall control is disabled, Retrieve the total traffic (bytes) for those location IDs, Compute the % of the total traffic that does not have FW controls applied, etc. The traffic data may also include "traffic secured by IPS," which may include Derive Location IDs where IPS control is disabled, Retrieve the total traffic (bytes) for those location IDs, Compute the % of the total traffic that does not have IPS controls applied, etc.

§ 10.7 Additional Embodiments Related to Risk Score Calculation

Based on known breaches and vulnerabilities in networks, threat intelligence may be incorporated as part of a risk score calculation in order to provide industry specific recommendations for deploying risk mitigation measures based on the changing trends in a threat landscape. Also, the risk score calculation may be part of a comprehensive risk evaluation that can be offered with other security software, systems, services, etc. that can include Data, Application, and Workload protection. Additional or optional features may be added to products in a number of ways. For example, in a Minimum Viable Product (MVP), certain features may be added to software products with the capabilities of firmware improvements based on user feedback or additional research and development.

For example, the SSL policies section may be optional. In some embodiments, the systems and methods may look at just the pre-defined rules. Some SSL rules may be parsed. Also, for a Security Policy Audit Report, percentages of encrypted traffic being inspected may be used to determine grades, where, for example, greater than 90% may be given Grade A (e.g., "protected"), between 40% and 90% may be given Grade B (e.g., "moderately protected"), and less than 40% may be given Grade C (e.g., "minimally or not protected"). In another embodiment, 90-100% may be defined as "well protected," 60-90% may be defined as "protected," 40-60% may be defined as "moderately protected," 20-40% may be defined as "mildly protected," 1-20% may be defined as "minimally protected," and 0% may be defined as "not protected." It should be noted that these or other suitable ranges, values, grades, etc. may be used and are anticipated by the inventors.

In addition, a Granular Policy Scoring Logic may include 1) SSL Rules, such as dynamic scoring for default rules enabled, 2) IPS FW Rules (dynamic), where "Default Cloud IPS Rule" can be enabled and set to block/drop, 3) CFW Rules, where "Default Firewall Filtering Rule" can be enabled and set to block drop, 4) Remove and redistribute scoring, such as Authenticated Traffic+DLP Rules, etc. The time range of risk scores may be calculated daily, or trends may be calculated over a 30-day period, weekly, monthly, quarterly, or any suitable timeframe. The data may be shown on a graph, where missing data may be hidden or discarded.

Furthermore, additional changes to the above embodiments may include changes in polling, such as a case where risk score can be calculated at the end of every day or on demand every time the report is intended to be run. The last poll of the day may be persisted into a longer time range score. The systems and methods may allow automatic scheduling of the report 898, so as not to expect the network administrator to remember to schedule or to know what cadence to have the report (e.g., report 898) displayed on the UI for viewing.

The additional embodiments may further include edge-case handling, which may include determining how the distribution of risk score is shown for a subsection if a "max risk score" is surpassed. The systems and methods may also include other logic, such as showing the network administrator where, what, and by how much their network is getting dinged on and/or why the network may experience a risk score decrease. This may include the use of Global Policies, Rule Based Policies, Traffic Based Policies, Missing SKUs (up-sell messaging), and/or other practices.

The present disclosure may further include embodiments with respect to the displaying of a Deprecated Security Policy Audit Report. For example, the systems and methods may include logic used to calculate total % of SSL traffic, which may be implemented in the Configuration Risk Report. Existing recommendations may consider reuse in a new report.

Figure 18:
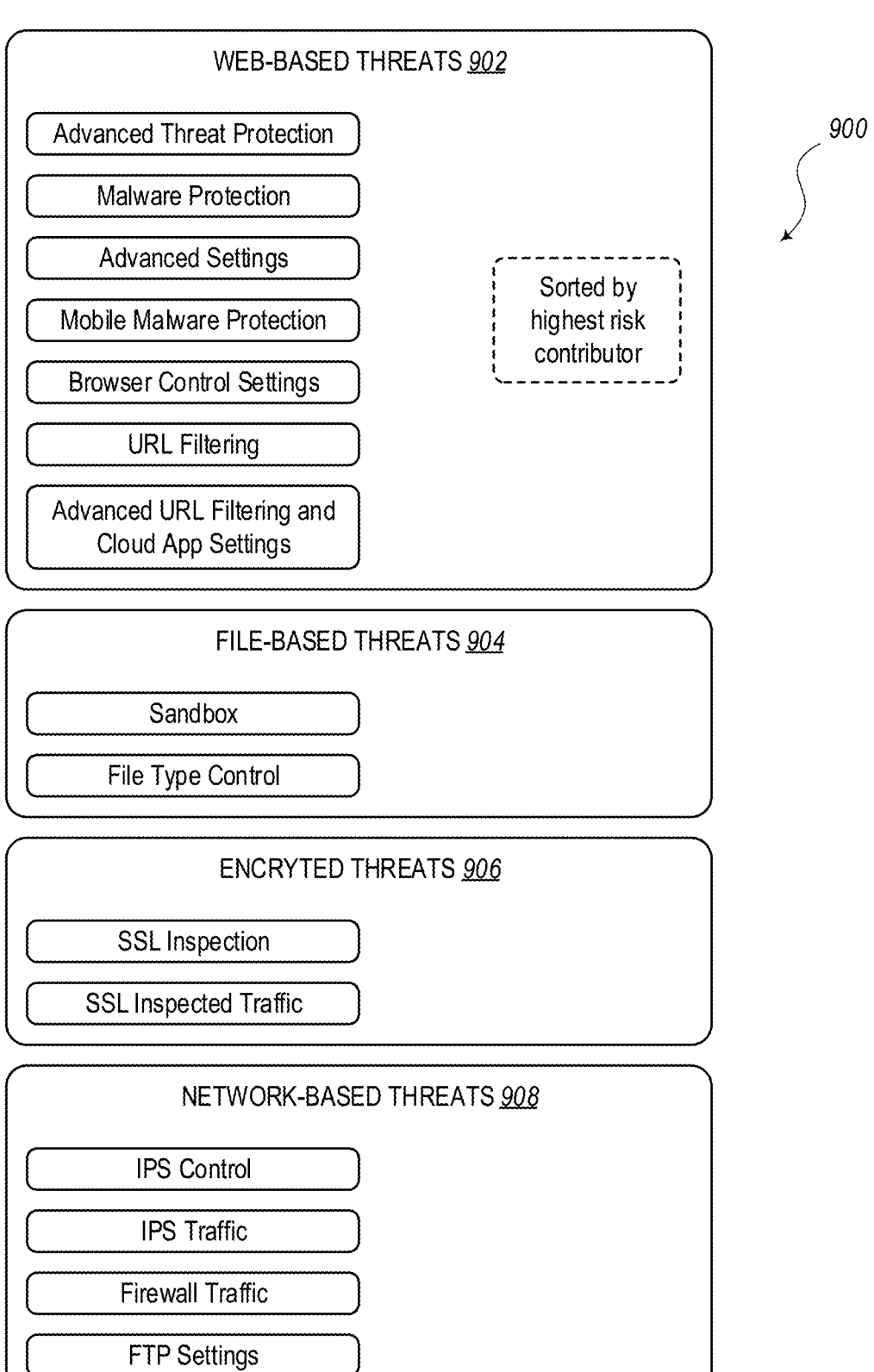
FIG. 18 is a diagram illustrating a system where threats are recorded in four separate buckets.

FIG. 18 is a diagram illustrating a system 900 where threats are recorded in four separate buckets. The system 900 includes web-based threats 902, file-based threats 904, encrypted threats 906, and network-based threats 908. The web-based threats 902 may include Advanced Threat Protection, Malware Protection, Advanced Settings, Mobile Malware Protection, Browser Control Settings, URL Filtering, and Advanced URL Filtering and Cloud App Settings, which may be sorted by the highest risk contributor. The file-based threats 904 may include Sandbox and File Type Control. The encrypted threats 906 may include SSL Inspection and SSL Inspected Traffic. The network-based threats 908 may include IPS Control, IPS Traffic, Firewall Traffic, and FTP Settings.

In some embodiments, a traffic impact score may be calculated, which may include SSL traffic or total (organization-wide) traffic, authenticated traffic, IPS traffic, Firewall traffic, etc. DNS control may include a) DNS Tunnels & Network Apps (attribute risk for Commonly Blocked and Unknown DNS Tunnels) (e.g., High risk if commonly blocked is not blocked, Med risk if unknown is not blocked), b) Requested Domain/Resolved IP Categories: attribute risk based on selection (e.g., Malicious or high risk is blocked, Newly registered med risk, etc.), c) Actions (ranked by riskiest) (e.g., Allow (ding), Redirect Request (no ding), Redirect Response (no ding), Resolve by ZPA (no ding), Block (no ding), etc.), and d) Default Rules (e.g., Unknown DNS Traffic (Default Rule 2) may be enabled and set to block (otherwise not following Zero Trust)).

The report 898 of the Risk Score may be a new report that will be calculated daily based on an organization's settings. The settings may include 1) policy configurations, 2) traffic patterns, 3) SKUs, etc. The web-based threats 902 may include, for example, 66% of the score, the file-based threats 904 may include, for example, 9% of the score, the encrypted threats 906 may include, for example, 10% of the score, and the network-based threats 908 may include, for example, 15% of the score.

FIG. 19 is a table 912 showing policy impact scores and maximum scores for multiple global settings and rule-based policies. FIG. 20 is a table 916 showing the traffic impact and maximum scores for multiple types of traffic.

Regarding Advanced Threat Protection apps (e.g., identified by one or more SKUs), the systems and methods of the present disclosure may be configured to enable protection policies against advanced threats to protect different types of traffic for Botnet, Malicious Active Content, Fraud, Unauthorized Communication, Cross-Site Scripting (XSS), Suspicious Destinations, P2P File Sharing, etc.

Regarding Sandbox Rules and/or Advanced Cloud Sandbox apps (e.g., identified by one or more SKUs), the systems and methods of the present disclosure may be configured to provide an additional layer of security against zero-day threats and Advanced Persistent Threats (APTs) through Sandbox analysis (e.g., an integrated file behavioral analysis). If an organization has Advanced Cloud Sandbox, for example, the network administrator may be able to: 1) add rules to the Sandbox Policy, 2) specify which file types that the service is configured to analyze along with additional file types supported, 3) enable Artificial Intelligence (AI) pres-canning for unknown files in quarantine, etc.

Furthermore, regarding Firewall Intrusion Prevention System (IPS) Rules, Firewall Filtering Rules, and Advanced Cloud-Gen Firewall apps (e.g., identified by one or more SKUs), the systems and methods of the present disclosure may be configured to provide cloud-based next generation firewall capabilities that allow granular control over an organization's outbound TCP, UDP and ICMP traffic. If an organization has Advanced Cloud-Gen Firewall, the network administrator may be able to:

1) enable the "Default Firewall Filtering Rule" and set to Block/Drop. This means the Cloud-Gen Firewall may block all traffic except that which is specifically allowed;

2) as may be important with a default block policy enabled, create a rule to allow applications a business explicitly permits; this includes web traffic for the Secure Web Gateway, DNS traffic, productivity services like Microsoft 365, and any other applications in use; this can be done with a combination of pre-defined rules, one-click rules, and using various other methods like network application, network services, FQDNs, and source and destination addresses;

3) enable IPS detections by enabling all IPS categories with an action to block; and 4) enable the pre-defined "Unknown DNS Traffic" rule and set it to block; this can create a DNS rule to block malicious IP addresses and domains, known and unknown DNS tunnels, and any other category of DNS that is not helpful to the business.

Regarding the Firewall IPS Rules app, the systems and methods may be configured to enable IPS control to provide signature-based detection to control and protect traffic from intrusion over all ports and protocols. This service may use custom signatures built and updated by a vendor's security research team, as well as signatures from industry-leading vendors. Using these signatures, the service may be able to monitor traffic in real time. As soon as the IPS has examined the contents of your traffic and found a pattern match, it can enforce a company's policies inline.

§ 11.0 EVALUATING EFFECTIVENESS OF A COMBINATION OF SECURITY TOOLS

At present, there is a challenge in the process of measuring, quantifying, and remediating risk in networks. According to research, it has been found that customers manage risk through inferior third-party tools and/or manual input spreadsheets. Thus, due to the need for additional industry standards regarding network security risks and the need for better quality risk quantification tools, the systems and methods of the present disclosure provide embodiments that have the aim to address the current issues and improve the network security landscape, especially by offering one or more products that can accurately quantify or assess the effectiveness of a combination of security tools in use in a network. Currently, there are some efforts being made in this area, but an acceptable level of maturity has not yet been attained.

In particular, the embodiments of the present disclosure are configured to focus on specific areas of security for reducing risk in a network. For example, some different security areas to which improvements can be directed include the fields of 1) Prevent Compromise (i.e., to prevent network compromise), 2) Lateral Movement Prevention (i.e., to prevent lateral movement attacks), 3) Data Loss Prevention, and 4) Asset Exposure Prevention (i.e., to reduce the attack surface of network resources or assets). The systems and methods of the present disclosure are configured to address at least these four areas by configuring combinations of various security tools in order to reduce risk. In particular, the systems and methods may be configured to perform this combined optimization by a single solution (e.g., a single hardware/software product). In some respects, this may provide network security operators or security stakeholders with a high-level view about their organization. Also, the solution described herein can give them the capability to look into various factors which can tremendously impact their risk and provide them with the necessary knowledge regarding possible areas of improvement.

The embodiments of the solutions described herein may be configured to solve the above-stated problems, for example, by calculating the risk of a breach or attack by evaluating an organization's a) static and dynamic policy configurations, b) traffic patterns, and c) risk reduction capabilities. The systems and methods of the present disclosure may also provide network security administrators and stakeholders with a prioritized and contextualized list of recommended changes to their deployment in order to improve their overall security posture and further mitigate their risk against all four areas of Prevent Compromise (PC), Data Loss (DL), Lateral Movement (LM), and Asset Exposure (AE) (or attack surface). Also, as a result of leveraging capabilities, the systems and methods may provide historical data allowing the user to view a company's risk score as it changes over time, which can also be compared with industry peers. In some embodiments, the Risk Score may be calculated using the following formula:

$$\text{Risk Score} = (100 * (\text{PC/total\_possible\_PC}) + 100 * (\text{DL/total\_possible\_DL}) + 100 * (\text{LM/total\_possible\_LM}) + 100 * (\text{AE/total\_possible\_AE}))/4$$

That is, the Risk Score may be the average of the percentages of each of the four categories with respect to their highest possible values. Thus, the Risk Score may range from 0 to 100.

Figure 21:
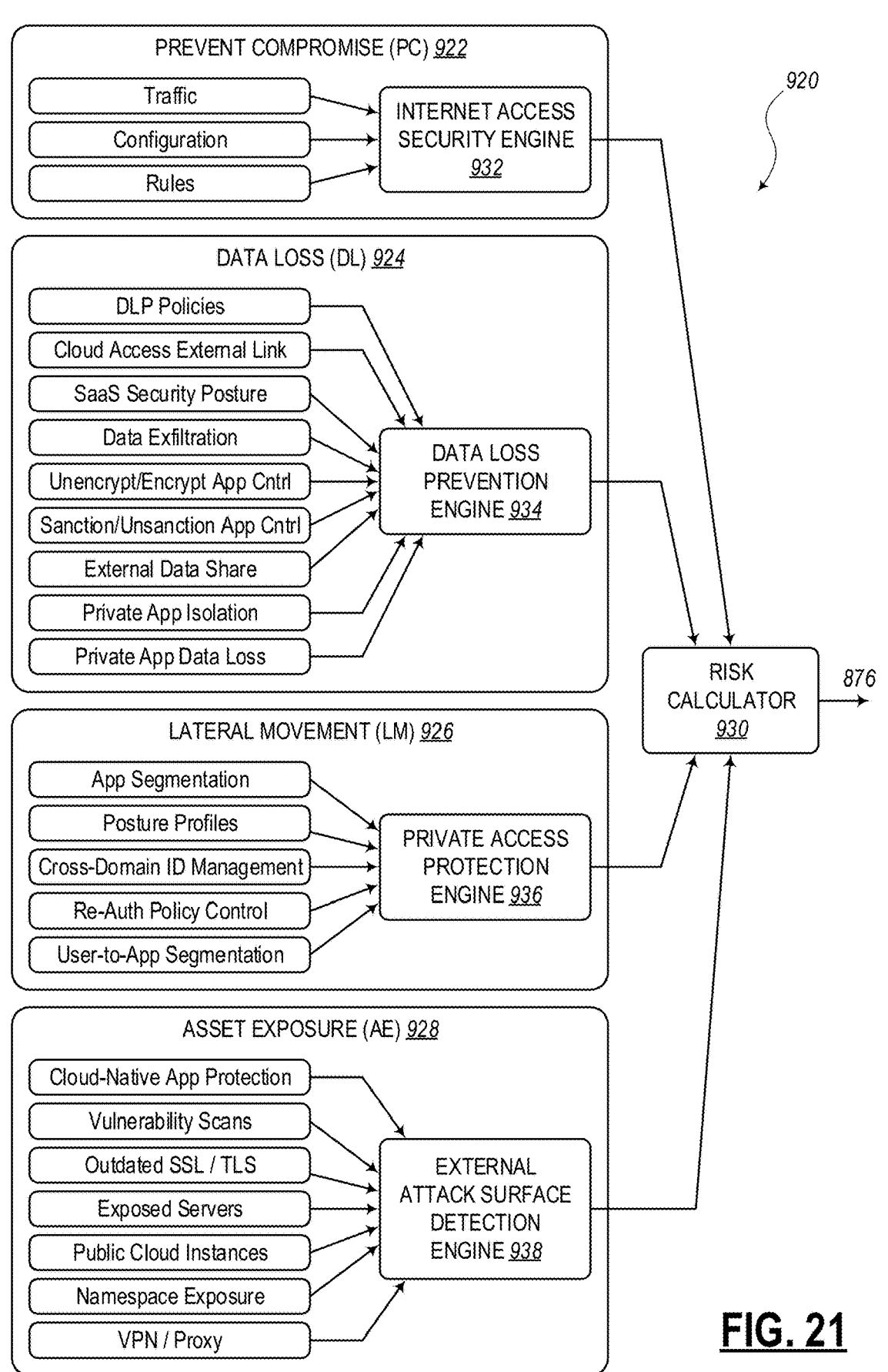
FIG. 21 is a diagram illustrating an embodiment of a system for analyzing or assessing the status of a network with respect to the four categories of Prevent Compromise (PC), Data Loss (DL), Lateral Movement (LM), and Asset Exposure (AE) and determining a risk score therefrom.

FIG. 21 is a diagram illustrating an embodiment of a system 920 for analyzing or assessing the status of a network with respect to the four categories of PC, DL, LM, and AE and determining a risk score therefrom. The system 920 may include any suitable combination of hardware (or physical) components and/or software/firmware (or virtual) components for performing the various functions in order to obtain a risk score calculation. As shown in this embodiment, the system 920 includes a Prevent Compromise (PC) unit 922, a Data Loss (DL) unit 924, a Lateral Movement (LM) unit 926, and an Asset Exposure (AE) unit 928. The units 922, 924, 926, 928 are configured to provide respective outputs to a risk calculator 930, which is configured to consider each of the calculations with respect to PC, DL, LM, and AE and calculate a risk score.

As illustrated, the PC unit 922 is configured to monitor, measure, assess, and/or obtain (in any suitable manner) elements with respect to Traffic, Configuration, and Rules and is configured to supply these elements to an Internet Access Security Engine 932. The Traffic element may include traffic related to any of Unauthenticated, Unscanned SSL, Firewall, IPS, and the like. The Configuration element may include configurations related to any of Advance Threat Protection, Malware Protection, Advanced Settings, Mobile Threats, URL Filter and Cloud App Control, Browser Control, FTP Control, and the like. The Rules element may include rules related to any of Inline Sandboxing, URL Filters, File Type Control, Firewall Control, Non-Web IPS Control, and the like.

The DL unit 924 is configured to monitor, measure, assess, and/or obtain (in any suitable manner) elements with respect to Data Loss Prevention (DLP) Policies, Cloud Access Security External Links, Software as a Service (SaaS) Security Posture, Data Exfiltration, Unencrypted/Encrypted Application Control, Sanctioned/Unsanctioned Application Control, External Data Share, Private App Isolation, Private App Data Loss, and the like. These elements are configured to be supplied to a Data Loss Prevention Engine 934. The DLP Policies element may include policies related to any of Configuration, Content/Contextual Control, Violations, and the like.

The LM unit 926 is configured to monitor, measure, assess, and/or obtain (in any suitable manner) elements with respect to App Segmentation, Posture Profiles, Cross-Domain Identity Management, Re-Authorization Policy Control, User-to-App Segmentation, and the like. These elements are configured to be supplied to a Private Access Protection Engine 936. The App Segmentation element may include segmentation features related to Wide Open Port Config and the like. The Cross-Domain Identity Management element may include management features related to any of managing groups in access policies, enabling/disabling control, and the like.

The AE unit 928 is configured to monitor, measure, assess, and/or obtain (in any suitable manner) elements with respect to a Cloud-Native Application Protection Platform (CNAPP), Vulnerability Scans, Outdated SSL or TLS, Exposed Servers, Public Cloud Instances, Namespace Exposure, VPN/Proxy, and the like. These elements are configured to be supplied to an External Attack Surface Detection Engine 938.

The Internet Access Security Engine 932 is configured to output a PC security risk component to the risk calculator 930. The Data Loss Prevention Engine 934 is configured to output a DL security risk component to the risk calculator 930. The Private Access Protection Engine 936 is configured to output an LM security risk component to the risk calculator 930. Also, the External Attack Surface Detection Engine 938 is configured to output an AE security risk component to the risk calculator 930. The risk calculator 930 receives the PC security risk component, DL security risk component, LM security risk component, and the AE security risk component and is configured to calculate a risk score (e.g., risk score 874) and/or an effectiveness score (e.g., effectiveness score 876). The risk calculator 930 may store the highest possible score for each of the PC, DL, LM, and AE scores and use these as a reference to determine how well the network is able to perform with respect to each specific category.

The PC (and the associated protection from network compromise), LM (and the associated protection from lateral movement), DL (and the associated protection from data loss), and AE (and the associated protection from asset exposure or reduction of attack space) are cumulatively considered to be the focus of efforts for analyzing or assessing network status with respect to various types of attacks, breaches, etc. and then for reducing or eliminating these attacks, breaches, etc. Some security software products may have various capabilities, such as Identity and Access Management functionality, Network Services functionality, Platform Security functionality, IT Asset Management functionality, Application Security functionality, and the like.

FIG. 22 is a flow diagram illustrating an embodiment of a method 940 for determining the effectiveness of combination of security components for mitigating risk in a network. As shown in FIG. 22, the method 940 includes the steps of analyzing a network to measure security parameters associated with the use of one or more network security tools that are configured for mitigating risk with respect to network compromise (or PC), lateral movement (LM), data loss (DL), and asset exposure (AE), as indicated in block 942. Based on the measured security parameters, the method 940 is further configured to execute the step of quantifying the one or more network security tools to determine an effectiveness score defining an ability of the one or more network security tools, in combination, to counteract the network compromise, lateral movement, data loss, and asset exposure, as indicated in block 944.

According to some embodiments, the method 940 may further include the steps of 1) determining one or more recommendations for changing configuration settings of the one or more network security tools in order to mitigate the risk and increase the effectiveness score and 2) displaying the effectiveness score and the one or more recommendations on a dashboard of a user interface of a computing device associated with a network security administrator. The method 940 may further includes the steps of evaluating a) static and dynamic configurations of security policies offered by the one or more network security tools, b) traffic patterns associated with the network, and c) the ability of the one or more network security tools, in combination, to counteract the network compromise, lateral movement, data loss, and asset exposure. Then, in response to the evaluating step, the method 940 may calculate a security risk score indicating a current level of risk that the network faces against one or more types of attacks.

In some embodiments, the method 940 may include the step of recording a plurality of effectiveness scores over time to obtain a historical view of the network. Also, the method 940 may include the step of adjusting an insurance actuary model based on the effectiveness score. The one or more network security tools, for example, may include multiple applications and/or services supplied by multiple vendors. The effectiveness score, for example, may include a Prevent Compromise (PC) score indicative of an ability to prevent network compromise, a Lateral Movement (LM) score indicative of an ability to prevent lateral movement, a Data Loss (DL) score indicative of an ability to prevent data loss, and an Asset Exposure (AE) score indicative of an ability to reduce an attack space. The effectiveness score may be calculated based on the following formula:

$$\text{Effectiveness Score} = (100*(PC/\text{highest-possible-PC}) + 100*(LM/\text{highest-possible-LM}) + 100*(DL/\text{highest-possible-DL}) + 100*(AE/\text{highest-possible-AE}))/4.$$

The network compromise, which is examined in order to quantify the one or more network security tools, may be a factor of one or more of a) traffic analysis, b) configuration analysis, and c) rules analysis. The traffic analysis may include analysis with respect to one or more of 1) unauthenticated traffic, 2) unscanned Secure Sockets Layer (SSL) traffic, 3) firewall-based traffic, and 4) traffic based on intrusion prevention. Configuration analysis may include analysis with respect to one or more of 1) advantaged treat protection, 2) malware protection, 3) advanced settings, 4) mobile threats, 5) URL filters, 6) cloud app control, 7) browser control, and 8) FTP control. Rules analysis may include analysis with respect to one or more of 1) inline sandboxing, 2) URL filtering, 3) file type control, 4) firewall control, and 5) non-web intrusion prevention control.

The lateral movement, which is examined in order to quantify the one or more network security tools, may be a factor of one or more of a) app segmentation, b) posture profiles, c) cross-domain identity management, d) re-authentication policy control, and e) user-to-app segmentation. The data loss, which is examined in order to quantify the one or more network security tools, may be a factor of one or more of a) data loss prevention policies, b) cloud access security, c) Software as a Service (SaaS) security, d) data exfiltration, e) unscanned/encrypted data, f) sanctioned/unsanctioned app control, g) external data sharing, h) private app isolation, and i) private app data loss. The asset exposure, which is examined in order to quantify the one or more network security tools, may be a factor of one or more of a) cloud-native application protection, b) vulnerability, c) outdated Secure Sockets Layer (SSL) or Transport Layer Security (TLS), d) exposed servers, e) public cloud instances, f) namespace exposure, and g) Virtual Private Network (VPN) proxy.

Security service customers (e.g., companies, enterprises, etc.) are challenged in measuring, quantifying, and remediating risk. Customers often attempt to manage risk through a variety of third-party tools (e.g., vulnerability management software, attack surface reports, Global Risk and Compliance systems, simple spreadsheets etc.). At times, customers may rely on vague, manually input data in spreadsheets. There is no conventional tool or standard for risk quantification that consumes security data from a customer's environment and provides a real view of risk, although some attempts have been made. There is a need in the field of network security to utilize data around a customer's environment, including high risk activities from various entities, configuration and external attack surface data, etc. There is also a need to provide security service customers with a holistic, comprehensive, and actionable risk framework. Furthermore, by focusing on driving actionable recommendations through intuitive workflows, the systems and methods of the present disclosure are configured to help customers reduce their risk exposure. The present embodiments are configured to provide powerful concepts such as the User/Company Risk Score and Config Risk Score. In some embodiments, the underlying logic for these features can be subsumed into a new product or risk assessment model along with assessment scores of other attributes.

At the highest level, the Security Exchange Commission (SEC) and New York State Department of Financial Services, will require Board level accountability for Cybersecurity Risk Management, Strategy, Governance, and Incident Disclosure. According to embodiments described herein, the systems and methods of the present disclosure are configured to provide users (e.g., Chief Information Security Officers (CISOs) and their teams) with real-time insights into their current risk score and where they stand compared to their peers. The systems and methods also provide them with important notifications on actionable events or deviations from their baseline (e.g., in case of a policy deviation or newly discovered vulnerability). This may include providing a dashboard reporting view (as shown in FIG. 14), provide information through real-time alerting, and/or provide reports via API exports and ingestion (e.g., from third-party data sources). The systems and methods may start with a focus on leveraging existing datasets (e.g., external attack surface reports, Internet access reports, private network access reports, etc.). The embodiments may also gradually explore enriching these data sets over time, as well as leveraging third-party data (e.g., from Microsoft Secure Score).

Figure 23:
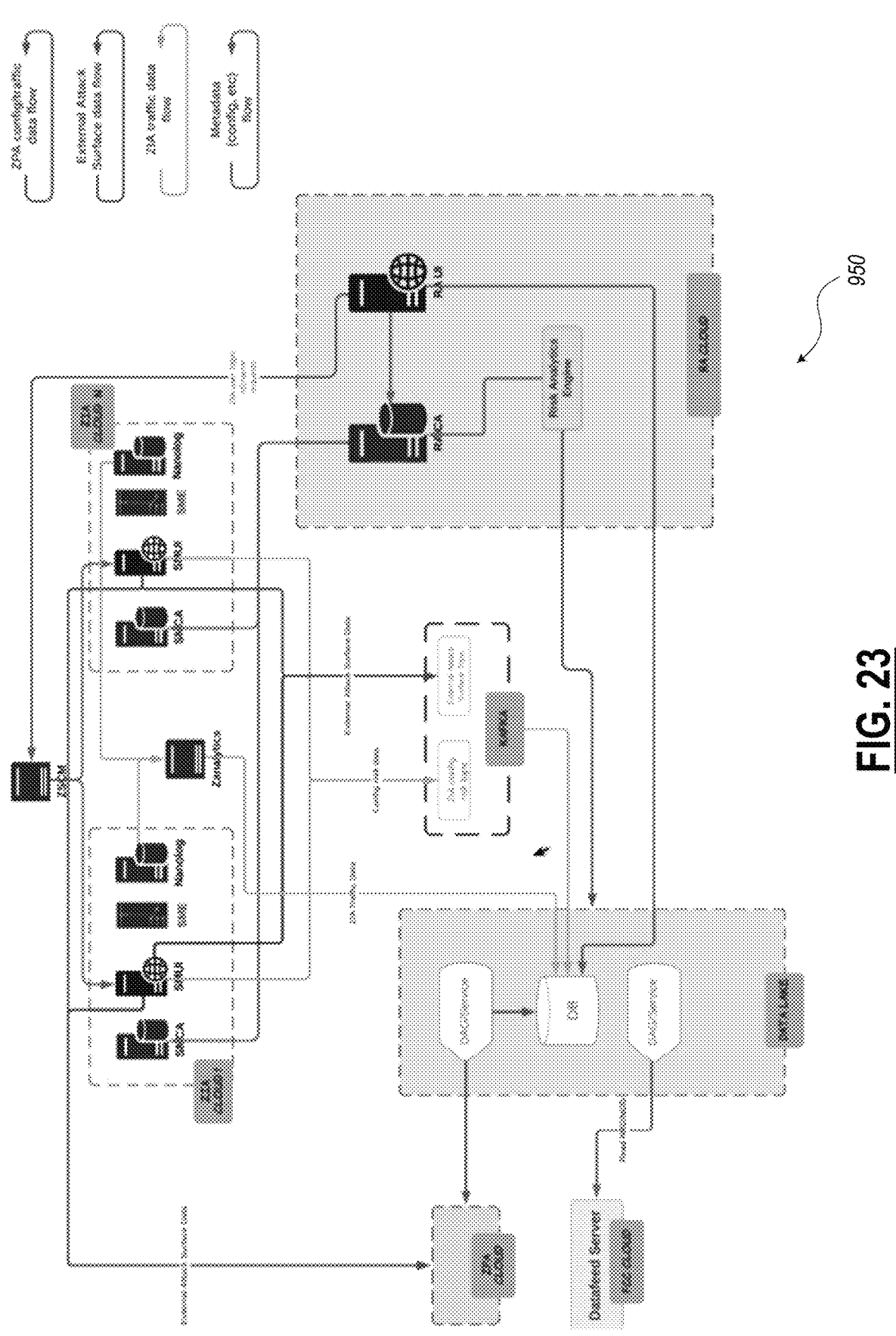
FIG. 23 is a block diagram illustrating a security assessment system.

FIG. 23 is a block diagram illustrating a security assessment system 950. The security assessment system 950 may include a library of security products in place in a network. The security assessment system 950 also includes a risk analytics engine in an RA cloud, config risk and attack surface analysis in a KAFKA, a datalake, a security service (Zscaler) cloud, and an FCC cloud. The security assessment system 950 may be powered by a new "decision support database," which is configured to compute and store real-time counters for various new products under development (e.g., Business Intelligence). For example, in some embodiments, this may be incorporated in the datalake architecture or elsewhere where there is an extension of it. In one embodiment, the security assessment system 950 may be configured to tie into the broader a One Identity and Context Engine framework.

Figure 24:
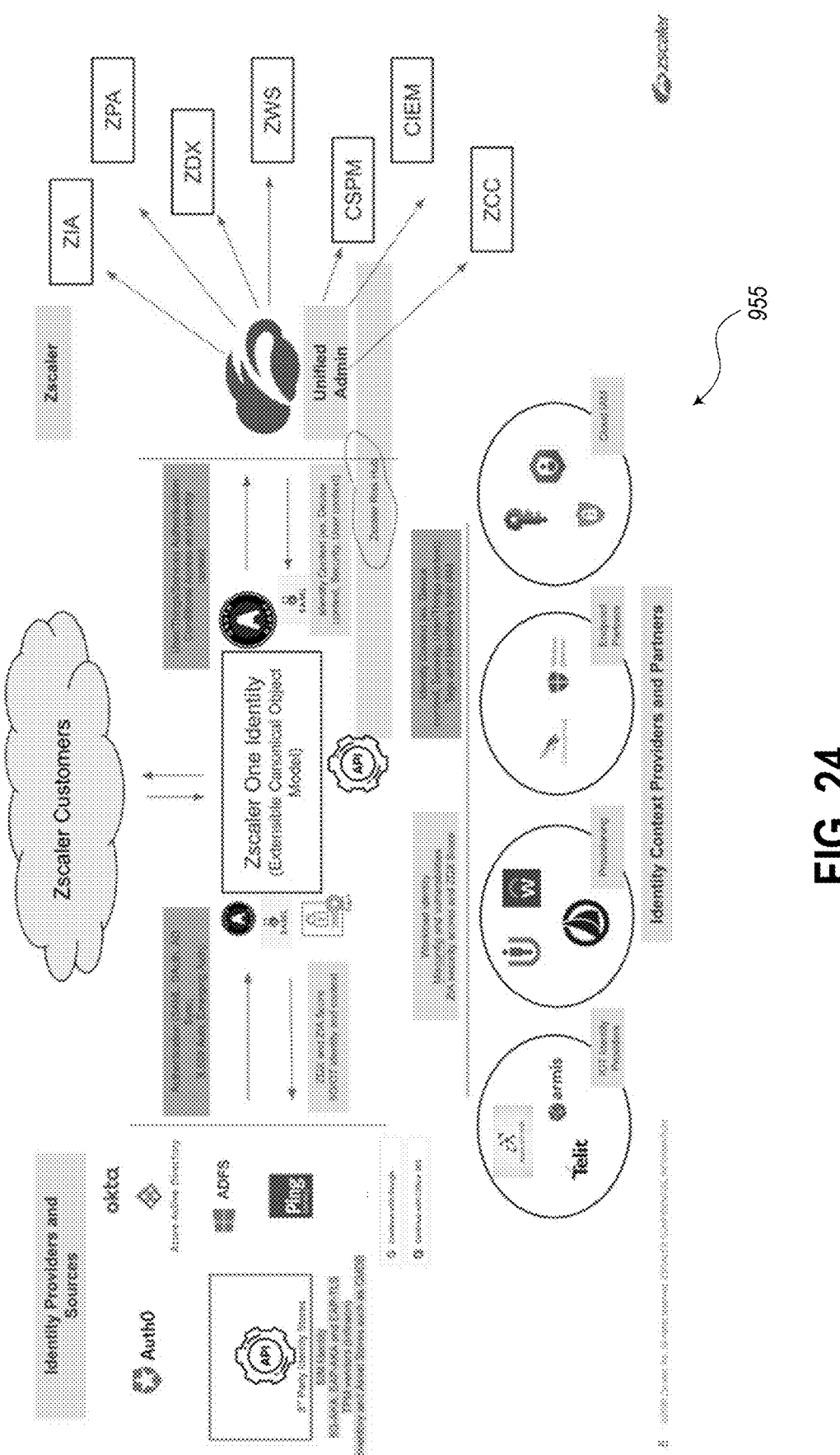
FIG. 24 is a diagram illustrating an embodiment of a One Identity system, which may be configured to interact with, consume, and affect the outcome of various risk nuggets.
Figure 25:
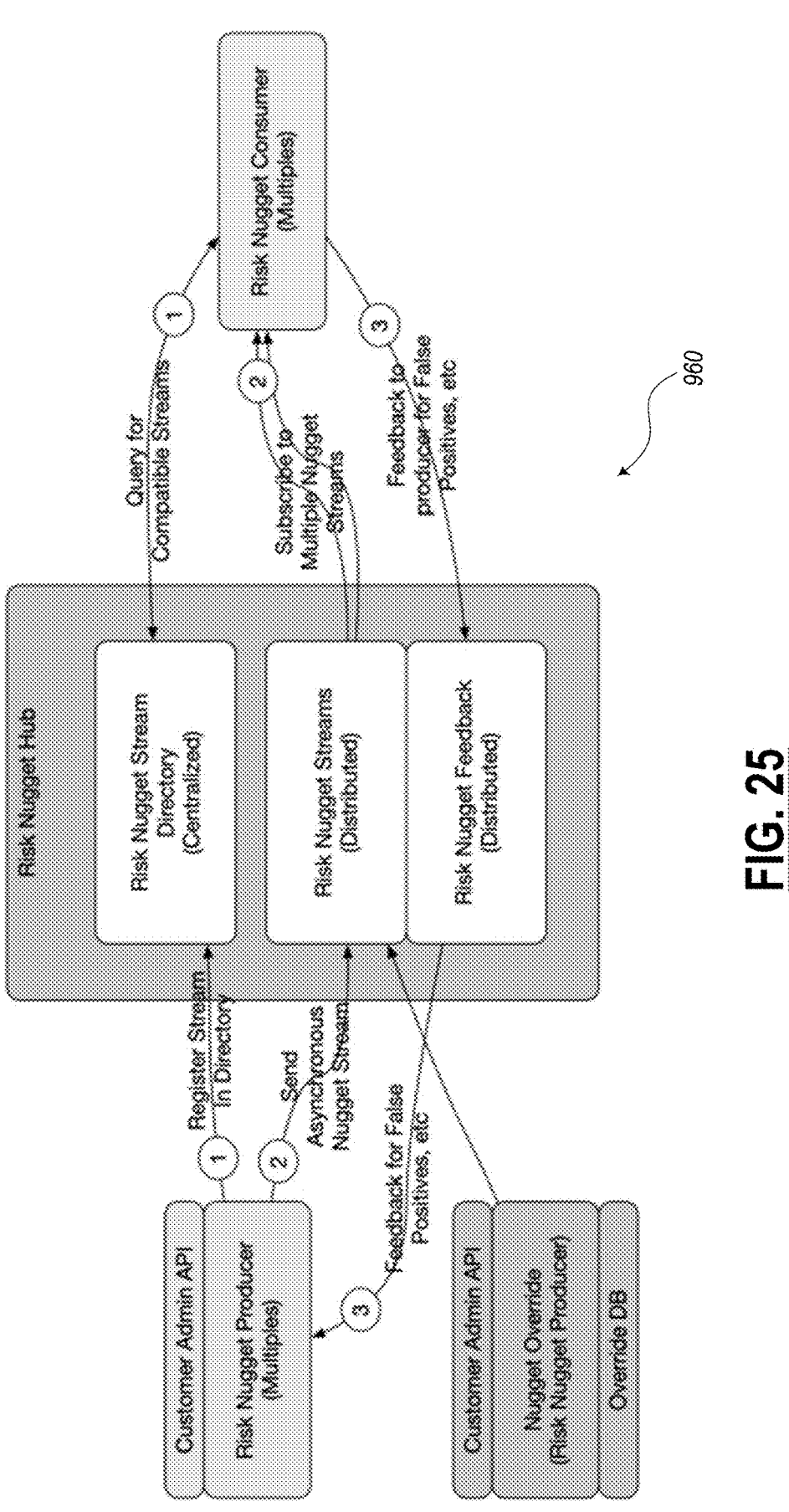
FIG. 25 is a diagram illustrating an embodiment of a risk nugget hub.

FIG. 24 is a diagram illustrating an embodiment of a One Identity system 955, which may be configured to interact with, consume, and affect the outcome of various risk nuggets. FIG. 25 is a diagram illustrating an embodiment of a risk nugget hub 960. For example, a UI (e.g., user interface 870) may be configured to display risk by taking into account any number of contributing factors and provide one or more actionable recommendations for each contributing factor. The UI can display financial data, historic data, peer data, etc. The users may be allowed to perform certain UI actions to override certain features. It may be understood that the UI may include any suitable system and may be built to be able to take in more contributing factors and cards as they are created. Thus, using firmware downloads, these new features can be added to continue to improve the functionality of the present systems and methods.

In some embodiments, the UIs may be configured to include entity mappings and data requirements. A main entities page (e.g., for users, third-parties, applications, cloud assets, etc.) may show risky users (e.g., in a list), user risk scores, risky third parties, high-level stats, distribution of risk scores, risky locations or departments, etc. Risky third parties may access browser-based application segments, which may be an unmanaged device accessing a PRA console or a user accessing an SaaS application via identity proxy. A risky user list may pull data from a private access service and may include username, location, risk score, etc.

The private access services and/or client connect services may include the ability to tag app segments as for third parties or B2B. Risky applications may include risky SaaS applications, which can pull data on high-risk index apps (e.g., unsanctioned, risky apps) from an IT report. It can also pull data on third party applications from an IT report. The pulled data may include default columns, applications, application categories, total bytes, users, risk indices, etc. A drawer may show the user more information from the SaaS security report. The risky private applications can include specific application segments, which may include only the top app segments (e.g., top 10 segments) that have the most policy blocks. This may also show a drawer on a diagnostics page from the private access app segment.

For unsanctioned segments, this may include shadow IT. Sanctioned segments may include 1) third party risk (or oversharing), 2) plug-ins, and/or 3) SSPM risk (e.g., incorrect settings). For example, data may be pulled on third party plug-ins from Internet access shadow IT reports. Risky assets (e.g., risky devices, workloads, Operational Technology (OT) assets, servers, cloud assets, etc.) may further be configured to be showcased as a list of risky Internet of Things (IoT) assets seen in the Internet access service. In some embodiments, this may simply be shown as a list of risky users, which may essentially be the same list as the risky users, but, instead of username, it may include device information.

If a customer's app does not have Posture Control functionality (e.g., Cloud-Native Application Protection Platform (CNAPP) or the like), then the UI may show a list of exposed servers in a public cloud namespace. The UI may list "public cloud instances" from External Attack Surface reports. In some embodiments, if a customer's app does have Posture Control functionality, then the UI may be configured to show top categories that can map to a workload, top 10 risky assets (e.g., by asset type), etc. In some embodiments, the cloud asset list may include default columns with asset name, asset type, risk level, alerts, etc. For example, assets may factor into container registries and workloads in certain ways. The systems and methods may also store additional datasets, such as by parsing subdomains of attack surface reports to fine and report specific VPN vulnerabilities, by adding additional attributes to external attack surface contributing factors based on gap analysis on what is available, what can already be leveraged, and/or what other vendors may show. Also, the additional datasets may enrich various factors (e.g., infected clients, data loss events, exposed servers, etc.) with geological IP data, which can be stored and displayed on a map included in the UI. In addition, the datasets may be obtained from various data sources, such as Posture Control apps, Deception apps, etc.

§ 12.0 EXAMPLE USER INTERFACES

FIG. 26 is a screenshot of a user interface for displaying a risk score. The UI provides Powerful Risk Quantification, Intuitive Visualization & Reporting, and Actionable Remediation. The risk score gives a holistic risk measurement and visualization framework for remediating risk by using real data from the cloud-based system 100. Thus, the risk score processes data from various sources to provide unique, data-driven insights—several data sources (e.g., internet access configurations and traffic profiles, private access segmentation maturity, etc.) as well as external sources are used. For example, FIG. 26 can be from the Evaluating Effectiveness of a Combination of Security Tools in Section 11.0.

The risk is visualized across four stages of breach—

External Attack Surface—Looks across a broad range of publicly discovery variables such as exposed servers and exposed Autonomous System Numbers (ASNs) to determine sensitive cloud assets.

Prevent Compromise—Looks at a range of broad range of events, security configurations, and traffic flow attributes to compute the likelihood of compromise.

Lateral Propagation—Looks at a range of private access settings and metrics and computes lateral propagation risk.

Data Loss—Looks at a range of sensitive data attributes to see if data might be leaking out.

FIGS. 27-33 are a series of screenshots of another user interface for displaying a risk score. This risk score can be the risk score in Section 10.0-10.7.

Figure 27:
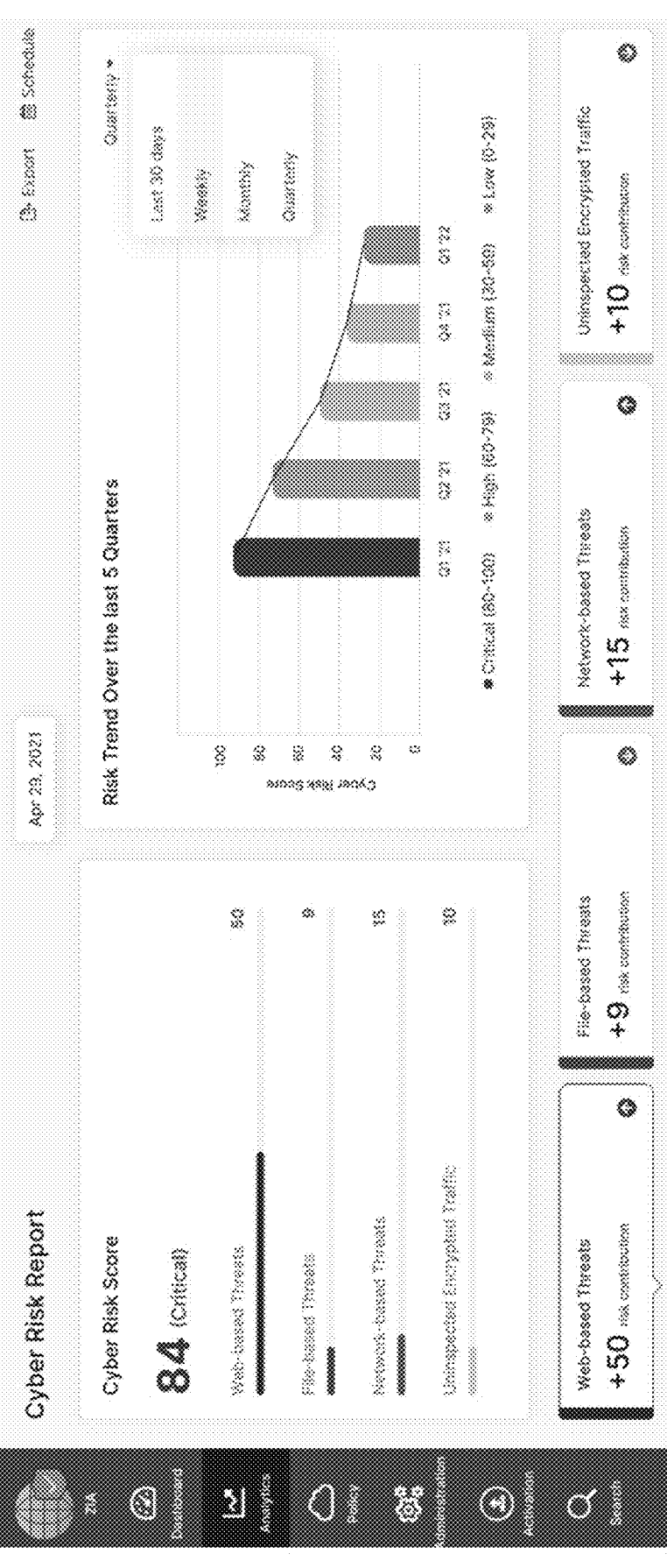
Figures 32, 33:
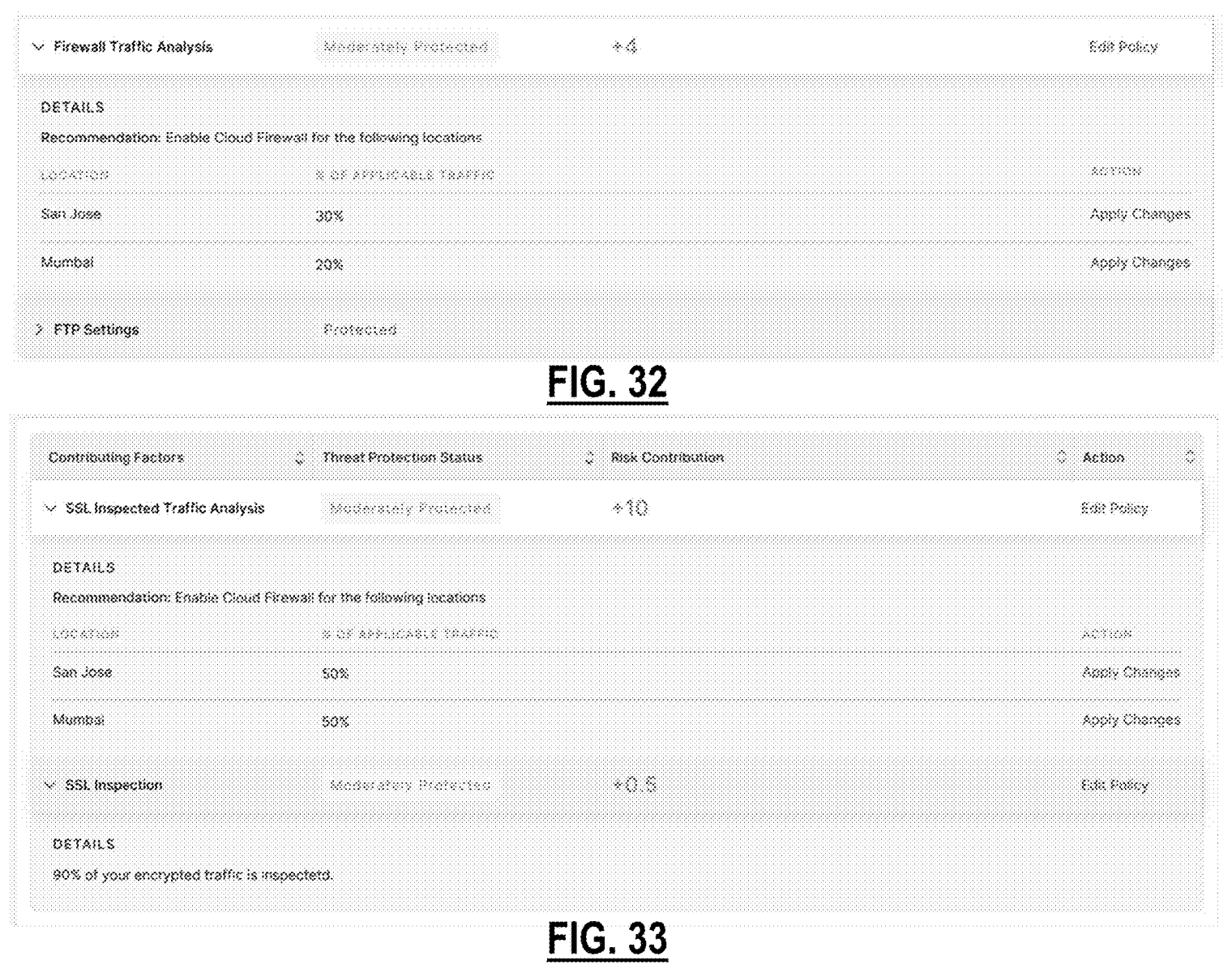

FIG. 27 is a visualization of a calculated risk score as well as a graph illustrating the trends. There are also panels for the various components in the risk score, namely Web-based Threats, File-based Threats, Network-based Threats, and Uninspected Encrypted Traffic Threats. A user may select any of the panels for additional details. FIGS. 28-29 are an example of the Web-based Threats. FIG. 30 is an example of the File-based Threats. FIGS. 31-32 are an example of the Network-based Threats. FIG. 33 is an example of the Uninspected Encrypted Traffic Threats.

§ 13.0 RISK ANALYSIS AND MODELING OF RISK DATA ON A GUI

At present, there is a challenge in measuring, quantifying, and remediating risks associated with Information Technology (IT) resources. Research shows that network operators manage risk through inferior third-party tools and/or manual input spreadsheets. Due to the lack industry standards with respect to risk quantification tools, there is a need for greater definition and standardization of quantification tools in the field of cybersecurity. Also, due to having different security areas (e.g., Prevent Compromise, Lateral Movement, Data Loss, Attack Surface, etc.), it would be beneficial to develop a single solution that could provide security stakeholders with a higher-level view about their organization with the capability to look deeper into factors which can impact their risk and provide them necessary knowledge for areas of improvement.

In some embodiments, the programs 216 of the server 200 (as shown in FIG. 3) may include, among other programs, a risk analysis program for detecting various risk factors as described in the present disclosure. The data store 208 may be configured to store solutions that can be recommended based on the detected risk factors. The programs 216 may also include an organizational program for organizing display information based on the detected risk factors, correlations with recommended actions, etc. The organizing of risk information is evident from an understanding of the screenshots of GUIs described below with respect to FIGS. 34-53. The programs 216 are also configured to enable the processor 202 to transmit the calculated risk information (e.g., for a particular organization or enterprise) to an associated user device 300 operated by a user (person) who has certain responsibilities with the organization. The user device 300 (as shown in FIG. 4) may include various GUIs or other interactive display screens or user interfaces, as described herein, which may correspond with the I/O interfaces 304. Thus, GUIs of the user device 300 may respond to risk information provided by the server 200 in the cloud-based system 100.

Therefore, the systems and methods of the present disclosure are further directed to embodiments for performing risk analysis as well as risk information collecting and organizing, display data transmission, etc., where the display data is provided to the user device associated with the organization under test. The display data can then be exhibited on one or more GUIs to allow the user to see a high-level and then drill down to lower-level views to see the risk data in greater detail.

A process of the present disclosure may include detecting one or more cybersecurity risk factors associated with the organization to determine a risk posture of the organization. The process may include attaining one or more remediation recommendations for enabling a person associated with the organization to select one or more actions for mitigating the one or more cybersecurity risk factors and improving the risk posture of the organization. The action of attaining the remediation recommendations may include retrieving known solutions from the data store 208 or determining recommended actions based on algorithms, techniques, Machine Learning (ML) models, etc. The process may include communicating display information to a user device associated with the organization, where the display information may include data regarding at least the one or more cybersecurity risk factors and the one or more remediation recommendations to be exhibited on a GUI of the user device.

It can be a cumbersome task for customers to analyze the organization's risk posture and find correlations between existing datasets and risk computations in various network security tools. At present, there is no way to leverage security data, such as high-risk activity from various entities, configurations, and external attack surface data to provide enterprise customers with a holistic, comprehensive, and actionable risk management framework. However, the embodiments of the present disclosure are configured to overcome these shortcomings and provide risk data in a manner that is easy to understand, while also allows a user to drill down to get more detailed information as needed.

The embodiments of the present disclosure are configured to help customers reduce their risk exposure by focusing on driving actionable recommendations through intuitive "detection-to-remediation" workflows. In other words, not only do the embodiments of the present disclosure provide risk information, but the embodiments provide GUIs that can be viewed at multiple levels and offer solutions to reduce risk. The embodiments can also provide explanations of how the risk reduction can be achieved by offering one or more recommendations and an anticipated effect were the recommendations to be acted upon. The GUIs provide a unified view of risk and are designed to cater to the needs of multiple people (e.g., technicians, network operators, Chief Information Security Officers (CISOs), security operators, administrators, executives, etc.).

The dashboard layouts described in the present disclosure can provide CISOs and their teams with an overview of risk posture of the organization in a quick real-time snapshot. This highest-level view (e.g., 40,000 ft view) may include a Risk Score visualization (e.g., at the top or other prominent place) for showing the overall score as well as the breakdown into the scores of underlying four stages of breach (e.g., External Attack Surface, Compromise, Lateral Propagation, and Data Loss). Also, the GUIs may show a Risk Score Trend chart or graph, which may represent the risk score over time to allow the user to see the dynamic security of the organization over a specific period of time. The trend chart can also show how the organization compares with its peers. The GUIs can also show a Risk Event map to help CISOs see a bird's eye view, at a quick glance, on the risk activities across the globe. The GUIs can further show the most significant factors that contribute to the risk levels, where the significant factors may be listed as The Top 10 Contributing Factors or other suitable lists. This list can thereby focus on critical severity items, such as misconfigurations that need to be addressed first to mitigate risk. In some embodiments, the GUIs may further include recommendations, such as a High Impact Recommendations section near the bottom of the page, which can provide a prioritized action plan to reduce overall risk. These aspects and other types or forms of risk information can be displayed on the GUIs as described in FIGS. 34-53.

According to some embodiments, the systems and methods may include a display model that offers actionable tasks to reduce a risk score and improve the risk posture of the organization. The GUIs may include an intuitive, three-step remediation workflow to improve their Risk Score. This process is simplified for the user by organizing all risk findings into bite-sized, actionable insight "cards" that contain a quick summary of the problem and the recommended solutions which CISOs and their teams can use to prioritize high impact, high severity issues first. Each insight card acts as a thumbnail and entry-point to rich contextual details. An Explore button may be provided which allows the users to drill down and view information relevant to a specific risk finding on a subsequent page. This lower-level view (e.g., 20,000 ft 'Explore' view) can be configured dynamically and is rendered based on the insight card that the user has selected for viewing more detailed risk information.

Similarly, every widget with contextual data on the Explore page can be configured to open up the door for further investigation depending on the selection. An Investigate page may be included, which can display the details surrounding the widget selected on Explore view and can allow administrators and security operators to identify the anomalous behavior and take further action in the Admin GUI.

Again, the present disclosure relates to systems and methods for risk analysis and modeling through a cloud-based system. This is a new paradigm for managing risk. Some uses cases include:

1. Scoring based on the signals collected inside out and outside in
2. Financial model—Ability to show the $ amount per factor and overall loss amount
3. Application of the risk tools for insurance underwriting, such as how actuary models can change based on the financial model in real-time (e.g., at one-day granularity)
4. User Experience (UX) Workflow (e.g., GUIs)—Designs based on UX models, workflows intended for different people having different roles in the organization, and the ability to choose remediation actions Risk data used for the risk analysis and modeling can be consumed from various sources, such as external attack surface (Shodan.io and others), ZIA, ZPA, ZPC, Deception, other Zscaler products (e.g., Business Insights), etc. A "Decision Support Database" may be incorporated in the system to power the architecture for the risk analysis tools and products (e.g., Risk 360, Business Insights, Mobile App 2.0, Real-Time QBRs, and others).

Visually rich, intuitive, actionable insight dashboards, as described in the present disclosure, are configured to display risk information, such as the following:

1. Current risk score (on scale of 0-100, with 100 being critical), comparison to industry peer, trending over time
2. Risk visualized across four indices—External Attack Surface (EAS), Prevent Compromise (PC), Lateral Propagation (LP), Data Loss (DL), each 0-100
3. Risk visualized across four entities—users, third parties, applications, and assets
4. Ability to drill down to see contributing factors for each
   i. Weights—risk score against predetermined weights
   ii. Ability to override or improve score
   iii. Zero Trust journey score or a percentage of completion toward an ideal risk posture
5. Exploration of chatbot (e.g., ChatGPT) interface to allow for Natural Language Processing (NLP) risk interrogation, e.g., "why did my risk score change in the APJ region?"

In some embodiments, an actionable workflow that a user can use to investigate and remediate most critical issues may include:

1. Prioritized list of issues (ability to sort by weight, area, geo, entity, etc.)
2. Actionable recommendations, with tie-back to policy action
3. Investigate workflow (e.g., the "cards," as described herein) to drill down and investigate specific issues (e.g., who are the specific users uploading sensitive data)

In some embodiments, the GUIs may be directed to specific users (e.g., board-level executives, CISOs, Chief Information Officers (CIOs), engineers, technicians, etc.) for reporting and guidance, such as:

1. Cybersecurity Risk Management (accepted, mitigated, transferred)
2. Cybersecurity Strategy, Governance, and Compliance
3. Cyber Insurance coverage (limitations, liabilities, potential financial loss)
4. Financial loss quantification and other visualizations (Monte Carlo technique applied to show Loss Exceedance Curve)
5. "Board Slides" feature—export as PDF, 2-3 high level slides summarizing risk, recent remediations, estimated savings In some embodiments, the risk analysis may include detection of risk factors that can be used by the Cyber Insurance Industry. The systems and methods of the present disclosure may be configured to provide data syndication for improved underwriting (demographic analysis) and client accreditation (lower limits/premiums), etc.

Also, the risk analysis procedures may be tied into overarching Zscaler OneIdentity and Risk Hub frameworks. The embodiments can be a front-end for visualizing risk, where a back-end may be a powerful risk and identity store that allows for contextual decisions across platforms.

In some cases, storage (e.g., in data store 208) may include storing much (if not all) relevant risk data for least a particular time period (e.g., one year). In other cases, the data can be stored in perpetuity. According to one use case, the systems and methods may include the use of a separate data lake, which may be used for historical signal collection for back-dating of risk algorithms (e.g., for cyber insurance analysis). Also, the embodiments described herein may be integrated with other tools/products (e.g., third party tool) for correlating risk signals and corrective actions (e.g., via APIs).

§ 13.1 Other Use Cases Regarding Risk Analysis

The systems and methods of the present disclosure may be configured to create various workflows, which can describe how a customer can migrate to and use the product of the present disclosure.

For example, Cyber Insurance services and partnerships may include a new route to revenue information, such as:

1. Sell-to—Cyber Insurance carriers, reinsurers, brokers and insurtech become "customer zero" and adopt this tool for validation and to lower their own premiums/risk. The risk data can be monetized and augment a Cyber Insurance providers underwriting process, delivering higher client policy efficacy
2. Sell-through—Cyber Insurance carriers can leverage larger equity pools to grow revenue and service new segments (e.g., F5k+, Small mid-sized Enterprise, non-profit, APJ, EMEA); requiring improved risk engineering, questionnaire automation and validation, thereby resulting in carrier profitability and lower potential claims/losses
3. Sell with—customers may receive discounts from Cyber Insurance providers, based upon deployment of the present product and risk quantified risk mitigation.

Joint product offerings such as a "safe driver program" that leverage the product inside out analysis for just in time signaling to the carrier.

4. Data aggregators have developed custom risk management and underwriting platforms, where vast amounts of threat intel is correlated and used to model portfolio risk and potential loss. Synthesized data aggregated and sold across the Cyber Insurance/Risk industry—"inside out" data may be highly desirable for historical back data and to avoid systemic or catastrophic loss.

The systems and methods of the present disclosure are also configured to address how broadly customers think about risk, such as architectural resiliency, supply chain risk, operational risk, etc. There are apparently Governance, Risk (management), and Compliance (GRC) platforms that focus on providing operational metrics across the board. Although the focus of the present disclosure is initially on cybersecurity risk, it should be noted that modifications can be made based on customer feedback regarding real-world experiences. The present systems may also include various overlapping with Business Insights and ZDX (e.g., "your infrastructure risk has shifted based on several incidents in your environment, this have caused you $200k in losses and your productivity score for these locations has fallen—your operational risk therefore has jumped by X %").

The following table shows various use cases:

| Use Case # | Name | Priority | Use case details |
|---|---|---|---|
| 1 | Onboarding | High | An existing customer should be able to onboard onto the product quickly to get actionable insights and recommendations. "I'm an existing customer on ZIA and/or ZPA, and I want to log in and try the product." |
| 2 | Risk analysis | High | "I'm a CISO, CISO-1, member of the SOC or GRC team. Show me my risk, show me my financial exposure, show me how I'm doing compared to my peers, show me what I can do to improve." |
| 3 | Risk analysis - slicing, manipulation, and contributing factors | High | Ability to slice and dice views by type of risk (e.g. PC vs. LP), entity (users, third parties, applications, assets), geo, as well as being able to rank and manipulate my scores. "Show me a user list with ability to sort by risk, as well as a list of applications (both SaaS and private, combined), 3rd parties and assets, all with individual, discrete risk ratings." "For each of the contributing factors, show me some logic for why I was scored in a certain way, what the total weight is, what my score is against that weight, and why, with ability to override." "Within the recommendations, I will include some detail on why the customer was scored the way they were." For each of the contributing factors, show a title column with a Y/N marking, so that customers can see what they are licensed for. A customer should be able to filter and only see what they are licensed for, if they wish. |
| 4 | Export risk reporting | Medium | Ability to export a high-level PDF, CSV, as well as 2-3 board slides, to summarize risk, recent actions taken, recommended actions, and financial exposure. |
| 5 | Tie into OneIdentity and Risk Hub | Medium | Tie into OneIdentity so that Risk 360 is available as a tile in OneIdentity. |
| 6 | Data export, ingestion | Low | Ingest scores from sources such as Crowdstrike ZTA score (already available in ZIA), Microsoft Secure Score, MetricStream |
| 7 | Policy change via API | Medium | Ability to take corrective actions via API leading to policy config changes, across both ZIA and ZPA |
| 8 | CI Data syndication | Medium | "As a ZS client, I'd like to have an accreditation report shared with my Cyber insurance provide (API or automated push/pull)." |
| 9 | CI Automation | Medium | "As a ZS client, automate and validate as much of the Cyber insurance questionnaire process as possible - delivering an auditable report for carrier." |
| 10 | Board level reporting | High | To meet SEC/FSI regulations, address proper controls adoption, risk identified, mitigated, transferred and accepted. Quantify risk / controls / potential financial loss, |

-continued

| Use Case # | Name | Priority | Use case details |
|---|---|---|---|
| | | | enabling Boards to confirm investment priorities (e.g., Partnership) |
| 11 | Alerts | Medium | Alert on changes in risk score (email, webhooks). Alert on changes in contributing factors (e.g. if ZS adds a critical new factor). |

The following table shows acceptable criteria:

| No. | Person | Description/Goal | Priority |
|---|---|---|---|
| 1 | CISO, CISO-1, Security Operations Engineer, GRC, Identity & Access Management | Basic login and visibility. "I'm able to get into the system the same way I can get into ZIA or ZPA, or ideally via OneIdentity. The UI looks coherent (no spelling mistakes). I can see my current risk, my risk trending over time, what my exposure is compared to my peers." | High |
| 2 | CISO, CISO-1, Security Operations Engineer, GRC, Identity & Access Management | Recommendations. "I can see actionable recommendations. If I take an action, I can see how my risk and my financial exposure falls. I can see an audit trail of my actions and how it helped me." | High |
| 3 | CISO, CISO-1, Security Operations Engineer, GRC, Identity & Access Management | Investigation. "I can go in and investigate, take policy action." | High |
| 4 | CISO, CISO-1, Security Operations Engineer, GRC, Identity & Access Management | Configurability of system. "I can go in and override scores. Your model still tells me what it thinks is the right weight and score, but I control my overall risk score so that I can align with my compensating controls." | High |
| 5 | CISO, CISO-1, Security Operations Engineer, GRC, Identity & Access Management | Export. "I can export data out of the system. Give me a nice PDF, some slides, maybe an API feed if I'm lucky." | High |
| 6 | CISO, CISO-1, Security Operations Engineer, GRC, Identity & Access Management | Ingestion. "I can integrate other data sources I care about, e.g. Crowdstrike or Microsoft." | Medium |
| 7 | CISO, CISO-1, Security Operations Engineer, GRC, Identity & Access Management | RBAC based on various personas. TBD. | Low |

§ 13.2 Architectural Notes

In some embodiments, the systems and methods may leverage data from Hadoop as well as pulling information manually for design partners from Nanolog (e.g., transaction data, all log data flow throughs, etc.), and Service Manager (SM) Certificate Authority (CA). This may include config data. A config risk score can be built by the GUI and can be configured to ask the source to publish the data to the present system. The weights for the current product, for instance, can be the same as or different from config sore.

Referring again to FIG. 23, the system can be powered by a new "decision support database," which may be configured to compute and store real-time counters for various new products under development (e.g., Business Intelligence). In some embodiments, this may be the same as or include some similarities with the data lake architecture described above, or in some cases can be an extension of it. Referring again to FIG. 24, The Zscaler OneIdentity product may be configured with a single identity and context platform. The product can integrate with any identity source and provide seamless contextual identity to customers of the present disclosure and an extended ecosystem. Referring again to FIG. 25, the system can interact with, consume, and affect the outcome of various risk nuggets.

§ 13.3 Features

Some features (e.g., limitations, requirements, etc.) of the present disclosure may include the following:

| Req # | Name | Use case # | Description |
|---|---|---|---|
| 1 | Data Ingestion & | 1 | Data structure - (1) ingestion of all key contributing factors (both underlying config and synthetic scores, customer overrides), |

-continued

| Req # | Name | Use case # | Description |
|---|---|---|---|
| | Storage | | historic storage. Includes other data attributes such as industry/ peer data from ZSCM. Build contributing factors schema in a way where its extensible so I can add things |
| 2 | Data visualization | 2 | Risk scores, 4 indices, 4 entities, 50+ CFs (including weights, formulas, and showing a customer their detailed scorecard, including logic for why we scored them a certain way where available) |
| 3 | Investigative workflows | 3 | Various investigate cards. Ability to drill in and get specific insights. |
| 4 | Financial analysis | 4 | Incorporate estimated loss and LEC (loss exceedance curve). See financial spreadsheet with industry losses mapped to Risk Score |

§ 13.4 Entity Mappings and Data Requirements

According to some embodiments, such as on a main entities page, the GUIs may show, for each of the following entities (e.g., users, third party people, applications, cloud assets), the following data structures:

> Entity page—User is allowed to drill down to view an additional visual section (e.g., window, drawer, pop-up, frame, widget, container, icon, text field, menu, drop-down, page, etc.)
>> Risky Users (Title "Workforce")
>> Entity page—this may include two sections—one section is high-level stats, another section is list of risky users, which may be presented side by side Risky User List Add User Risk Score—

> a. Default columns—actual number as a part of "user risk score" column in addition to the trend line, location, geo-location, user group
> b. More columns (the three dots)—this may be open for customer feedback to see what people want to see on the master list Risky 3rd parties are a subset of Risky user list (maybe we have a column—first party, third party)

High level stats

Distribution of risk scores

Distribution of risk scores for your industry

Top risky locations

Top risky departments

Drawer—essentially what is on the user risk score report for an individual user

Figure 34:
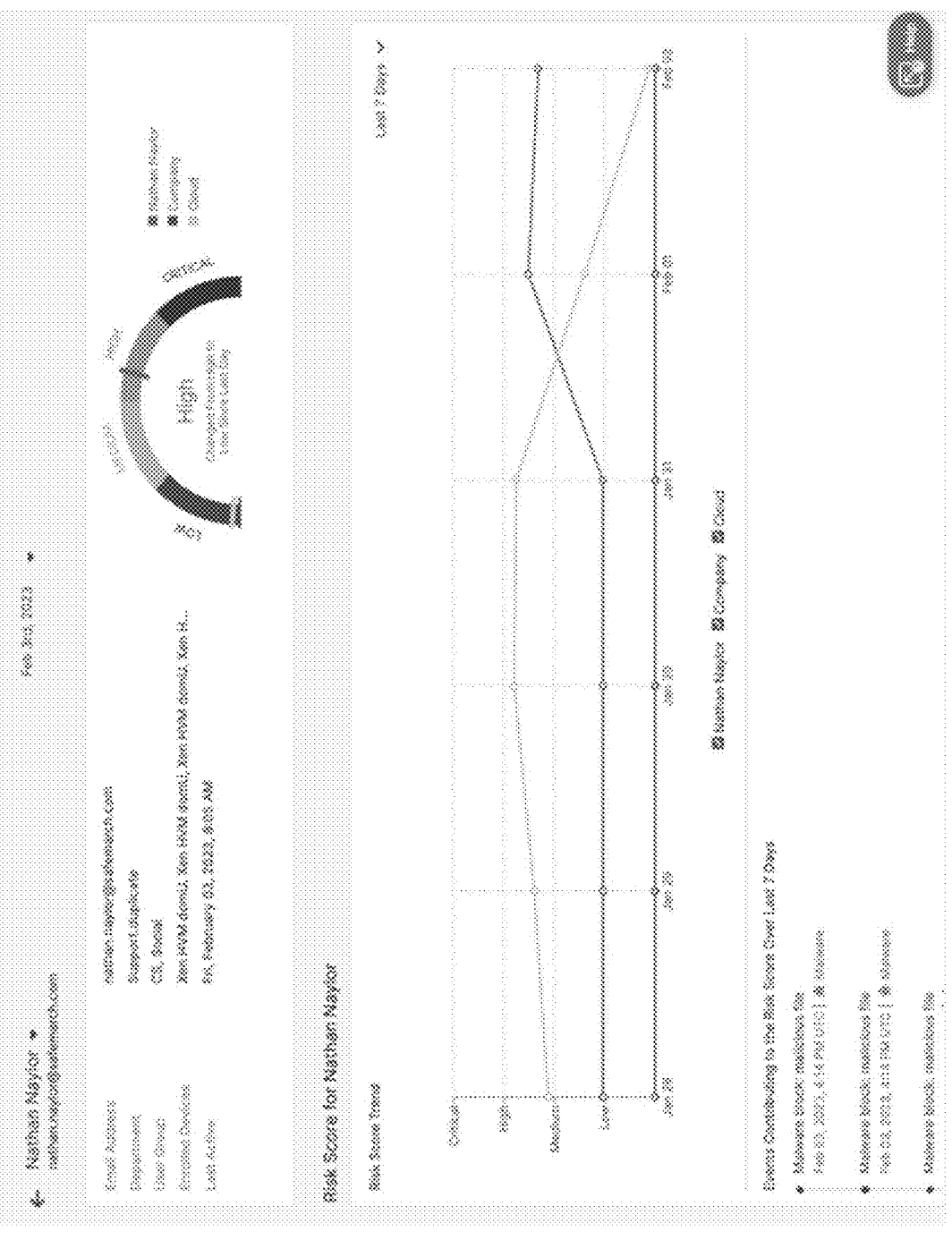

Consider adding additional factors—e.g. data that I consume from ZPA, or data that I consume from third parties User risk score may be enriched and/or deviate from ZIA User Risk score over time if we supplement this with risk nuggets § 13.5 GUIs FIG. 34 is a screenshot showing a GUI for an example user (of a workforce in the organization being tested). The GUI includes details of the user, a risk level (e.g., "high"), and a risk score trend. Also, the GUI includes a list of detected events that contribute to the risk score over a certain period of time (e.g., over the last 7 days).

The GUI may further include Risky Third Parties (e.g., contractors, B2B users, etc.). In the example of FIG. 34, the third party user may be a Contractor accessing a ZPA browser-based application segment, an unmanaged device accessing a PRA console, or a ZIA user accessing a SaaS application via identity proxy. Risky user list may pull data from ZPA (only users accessing BBA or PRA, or in the future, a ZIA user accessing a SaaS app via isolation proxy). This may include a) username, b) location, c) risk score for third parties. The GUI or UX may show in a superimposed visual section (e.g., drawer) features that may infer the contractor by looking at department, job title, etc. in SAML/ SCIM attributes. Sharpen the user list shown above and include ZCC clients who are believed to be contractors. After ZPA adds ability to tag app segments as for 3rd party or B2B, the current product may add new entities (e.g., "B2B") and filter to show only the users accessing the applications. This may include ZCC clients as well.

According to some embodiments, the systems may further consider data at rest scanning (e.g., Out-of-Bound Cloud Access Security Broker (OOB CASB) scanning of assets sitting in IT Service Management (ITSM), Customer Relationship Management (CRM), Collaboration applications (SaaS Security Report>Assets page), etc.). This may include Risky Applications, such as "Risky SaaS Applications." It can pull data on high risk index apps (e.g., unsanctioned, risk of 4 or 5) from Shadow IT report (Deepen: include sanctioned apps that maybe have had an increase in risk score due to breach). It can pull data on 3rd Party Applications from ZIA Shadow IT report. It may include Default columns, such as Application, Application Category, Total Bytes, Users, Risk Index. A Drawer may be opened for showing more info from the SaaS security report.

Figure 35:
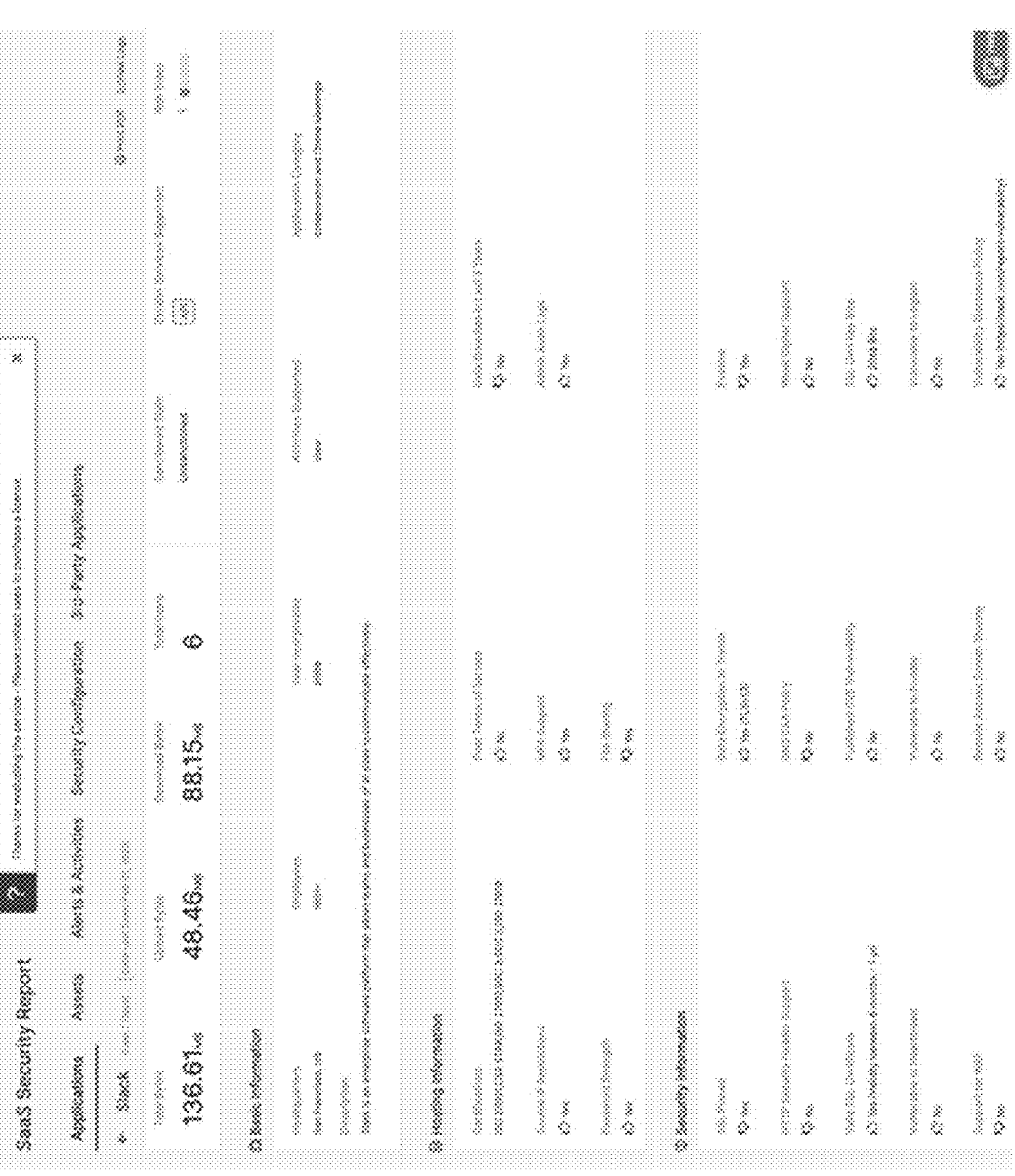
Figure 36:
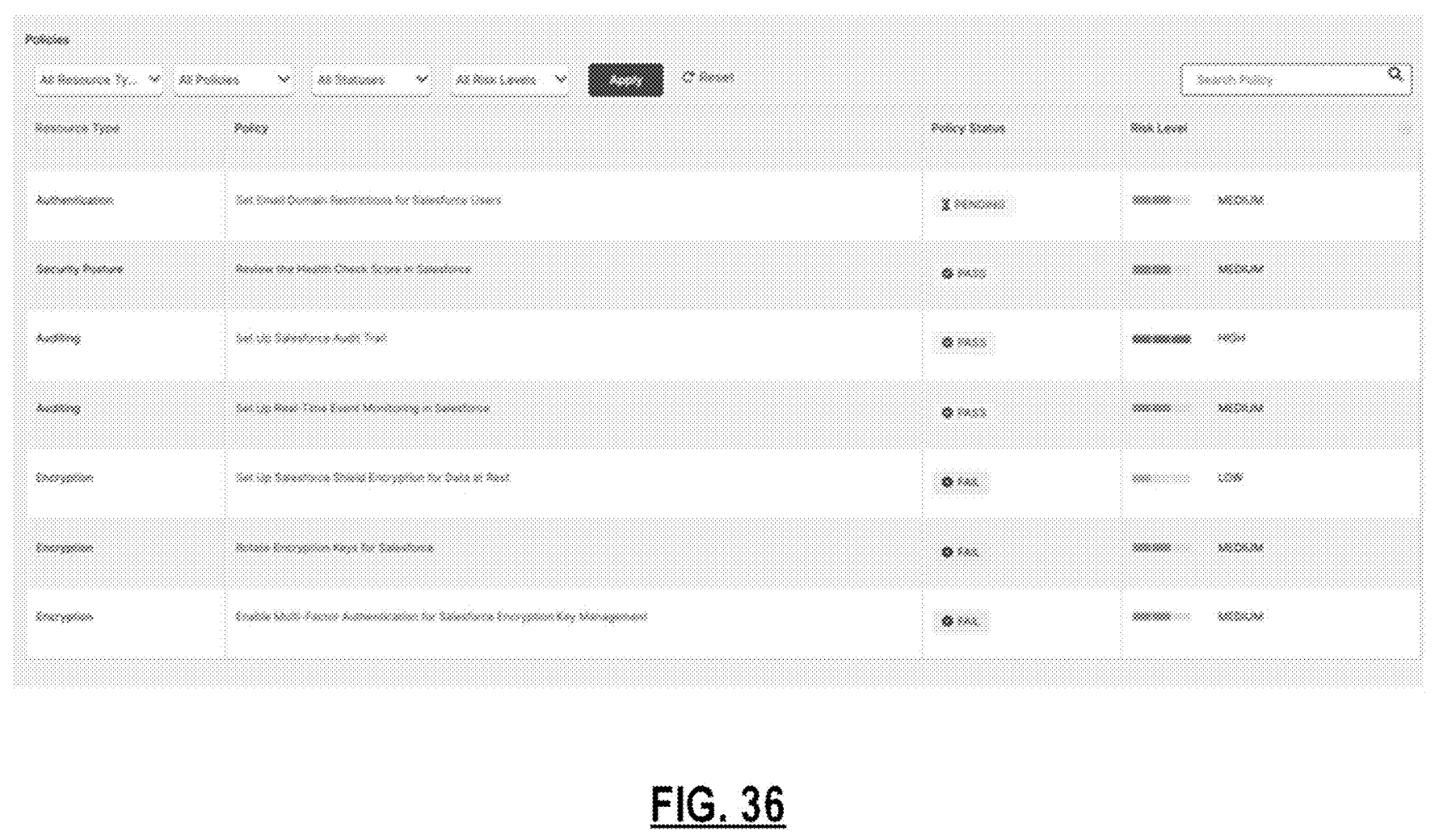
Figure 37:
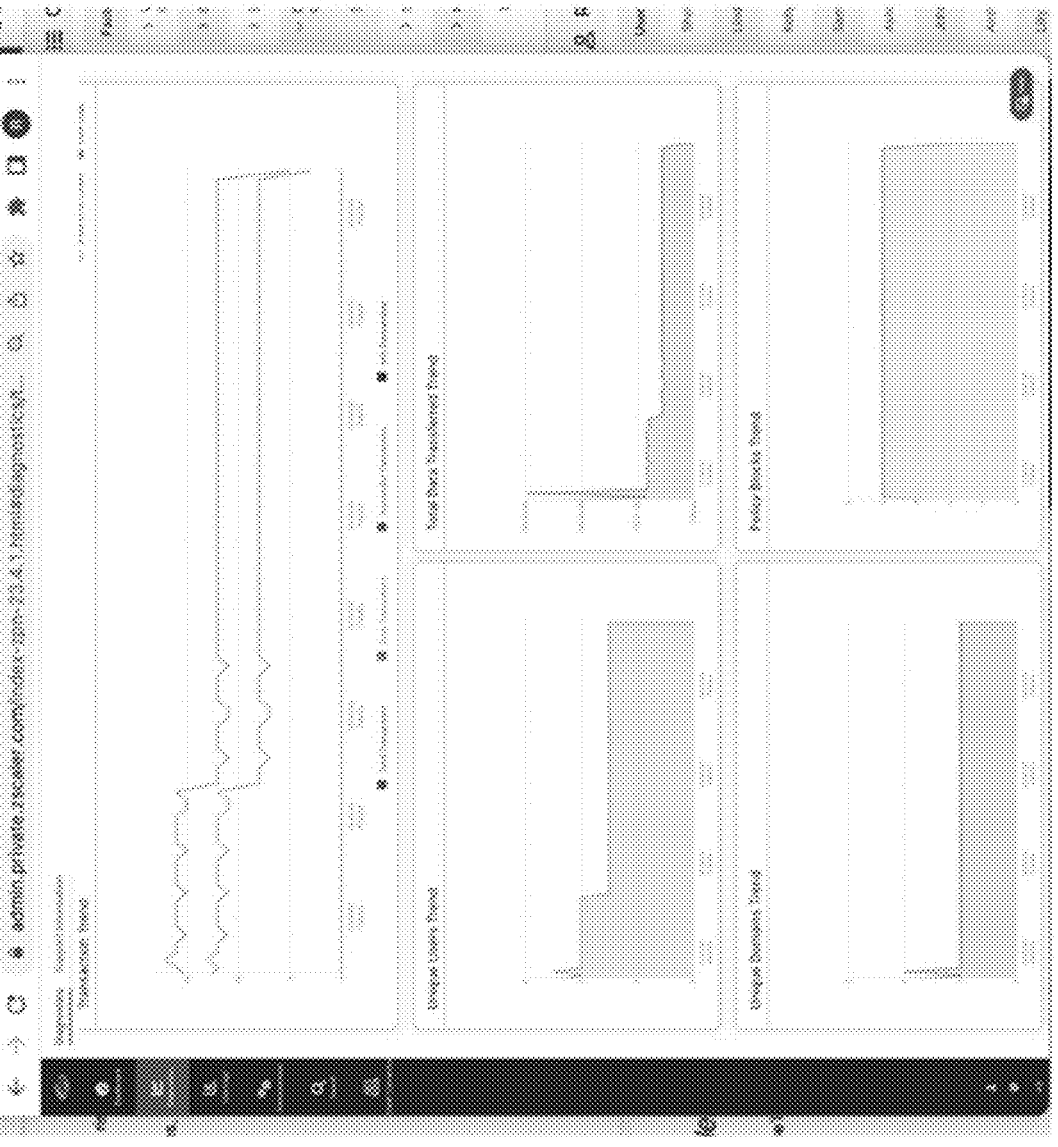

FIG. 35 is a screenshot of a GUI showing an SaaS Security Report, which may include basic information, hosting information, security information, etc. FIG. 36 is a screenshot of a GUI showing an SaaS Security Posture Management (SSPM) report, which may include resource types, policies, policy status, and risk levels. Furthermore, the GUIs may include "Risky Private Applications"—Specific ZPA application segments, which may show the Top 10 app segments that have the most policy blocks. This may potentially show a drawer, which may be a diagnostics page from ZPA application segment, as shown in FIG. 37. The GUIs may also include unsanctioned and sanctioned aspects. For Unsanctioned its shadow IT. For Sanctioned, there may be three risks: a) 3rd party risk (oversharing—maybe this could be brought into risk users as well), b) plug-ins (e.g., 3rd party extensions—maybe this could be brought into the 3rd party section as well), and c) SSPM risk (e.g., incorrect settings).

Figure 38:
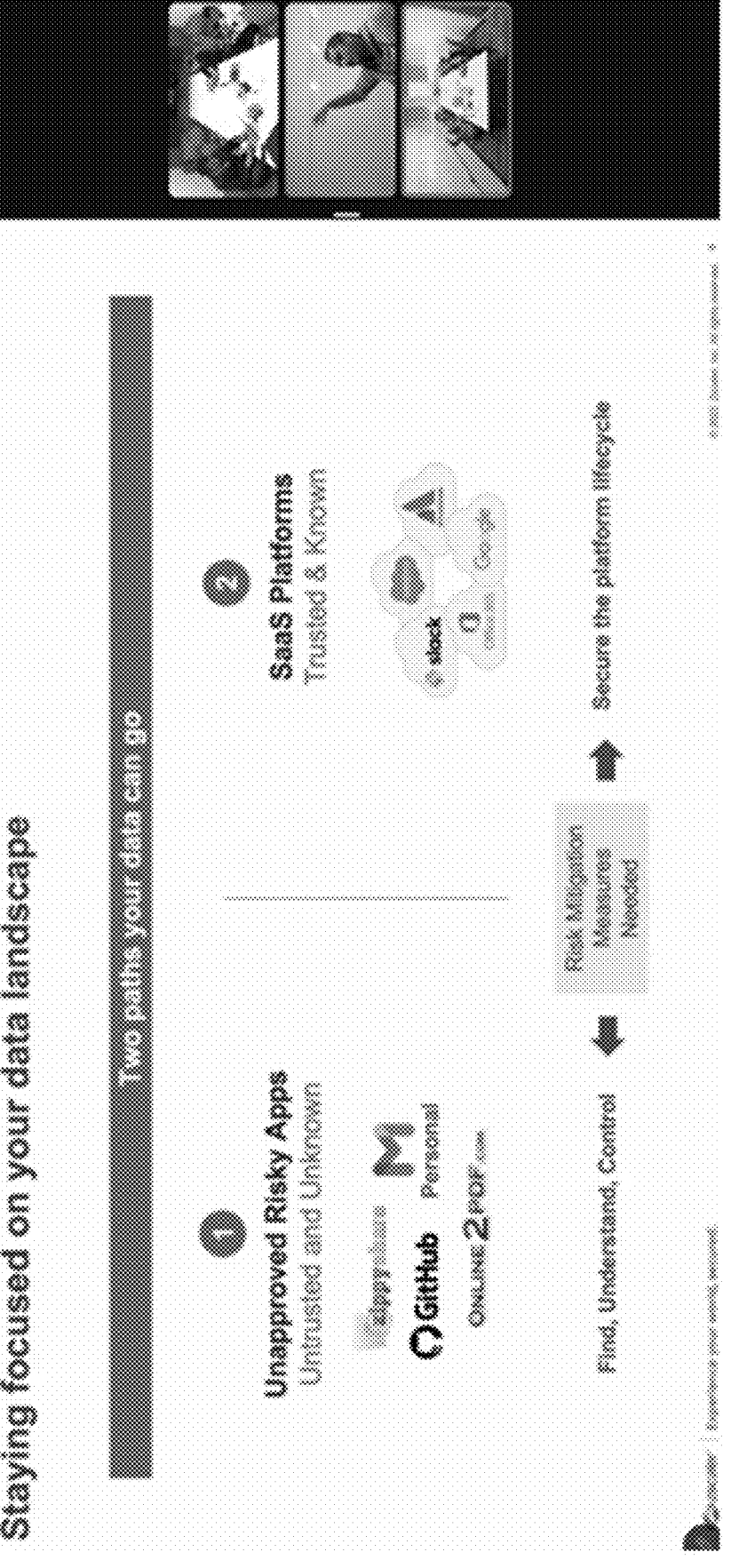

FIG. 38 is a screenshot of a GUI showing two paths regarding risk mitigation.

FIG. 39 is a screenshot of a GUI showing applications, which may include OOB CASB sensitive data at rest, which may pull data on 3rd Party Plugins from ZIA Shadow IT report. For example, the GUI may include 3rd party plugins>3rd-Party Applications→.

Figure 40:
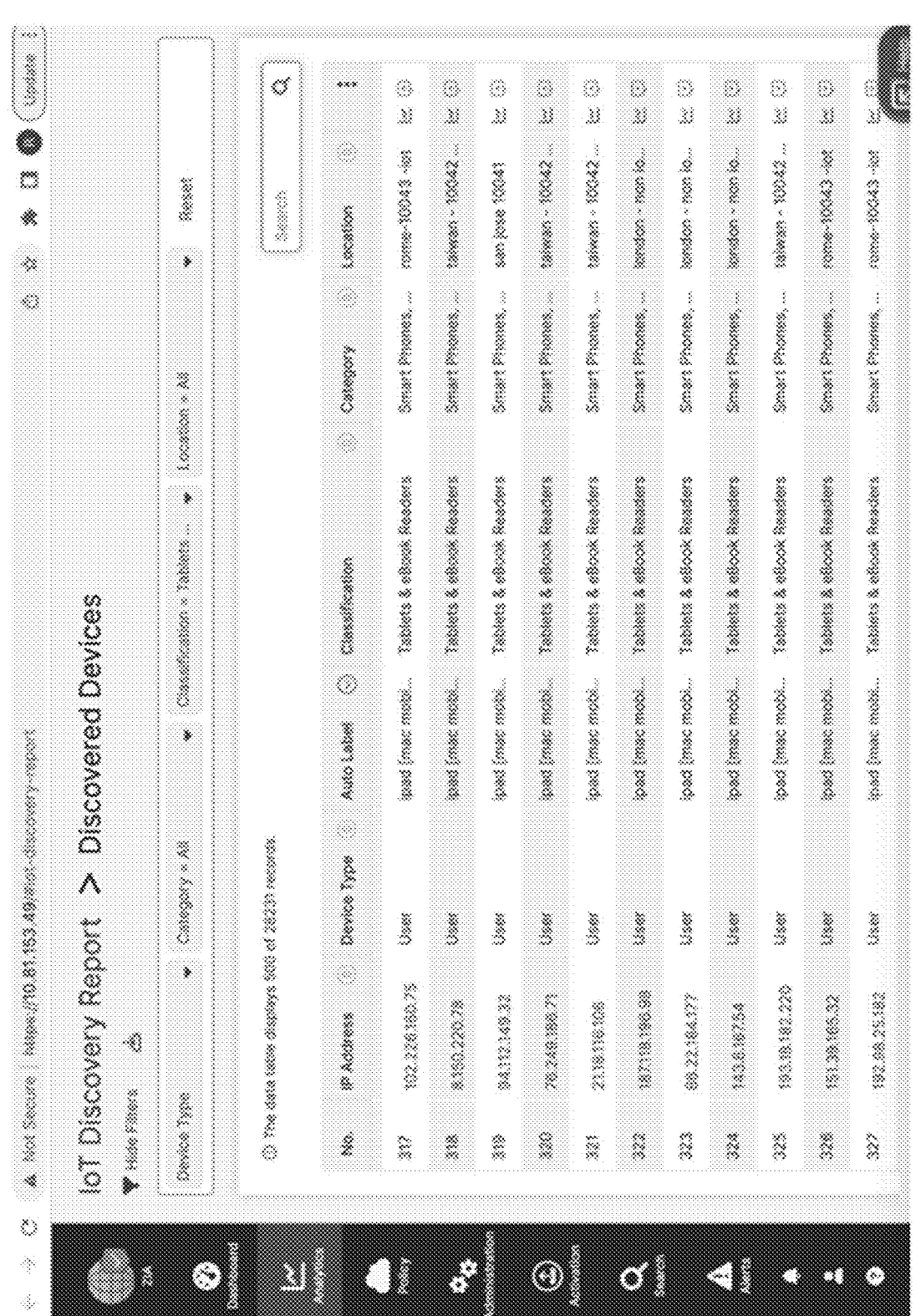

FIG. 40 is a screenshot of a GUI showing IoT Discovery Report, which may include Risky Assets (e.g., Devices, Workloads, OT assets, servers, cloud assets, etc.). The GUI may showcase a list of "risky" IoT assets seen by ZIA. It can show a list of risky users, which can essentially be the same list as risky users, but instead of username, it can lead with device information.

Figure 41:
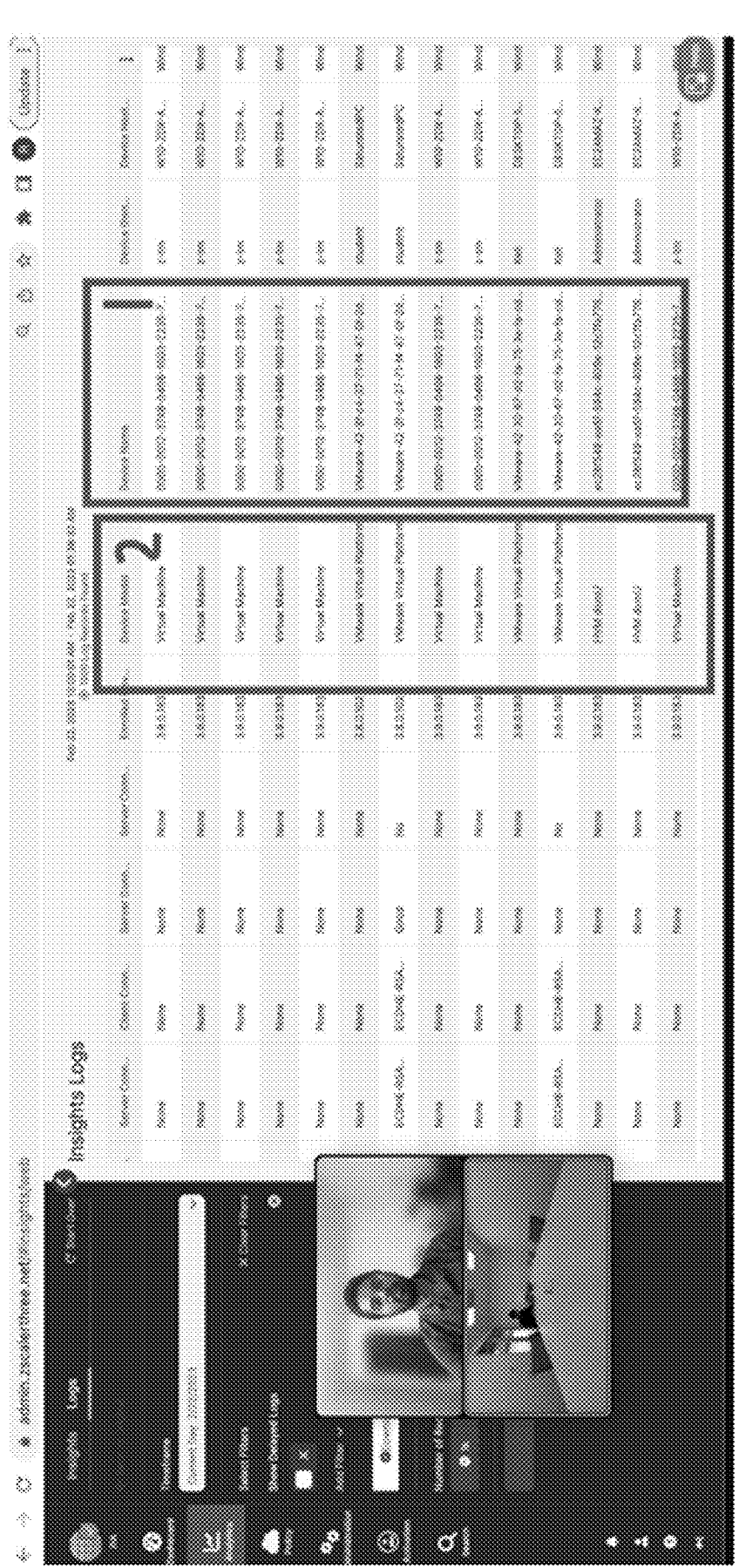

FIG. 41 is a screenshot of a GUI showing Insight Logs and may include device information, username, client IP, etc. If a customer does not have Posture Control (e.g., Cloud Native Application Protection Platform (CNAPP)), then the GUI may be configured to show a list of exposed servers in public cloud namespace. The "Public Cloud Instances" list may be obtained from an External Attack Surface Report.

Figure 42:
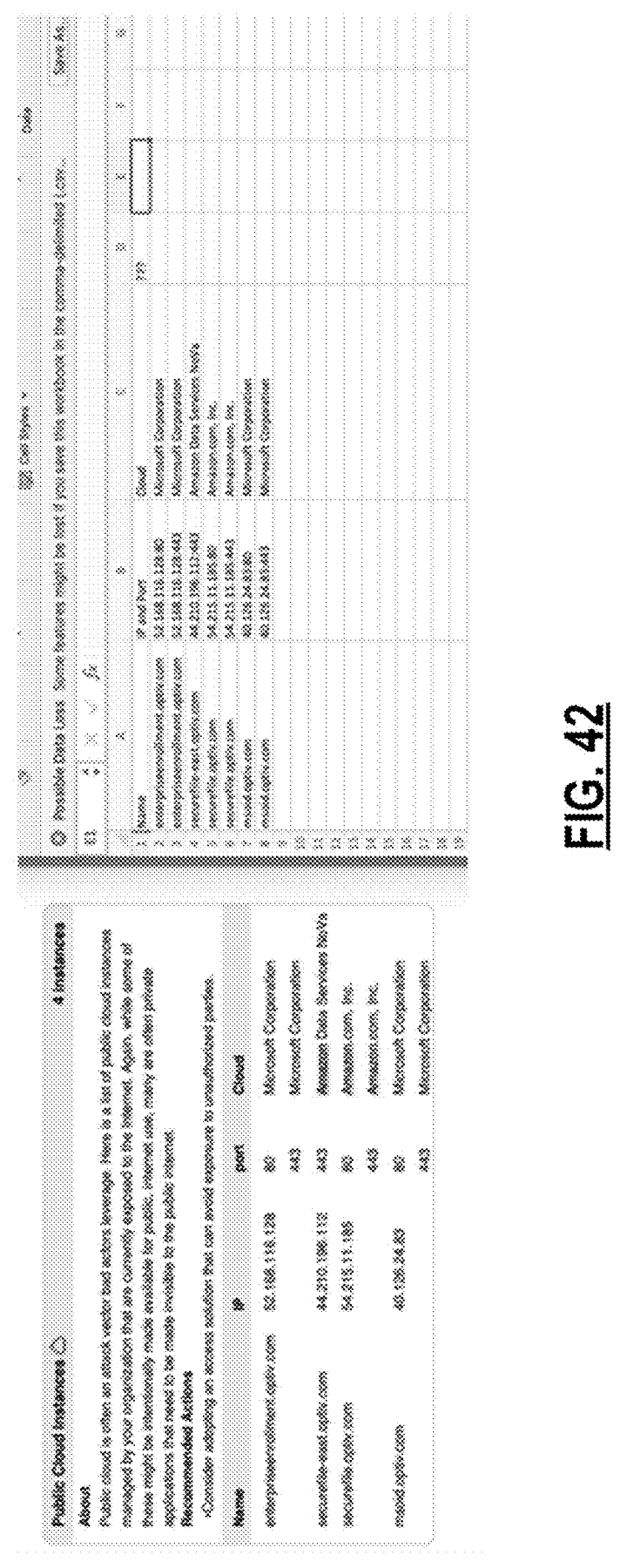

FIG. 42 is a screenshot of a GUI showing public cloud instances list.

Figure 43:
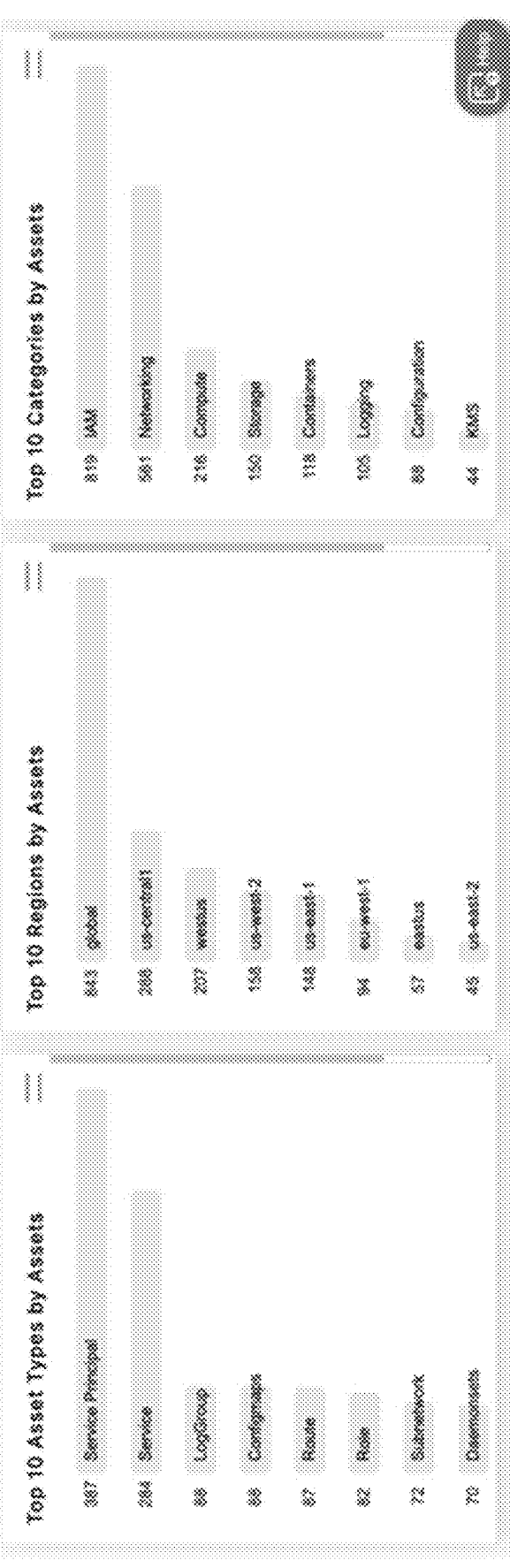

FIG. 43 is a screenshot of a GUI showing another phase, whereby, if a customer has Posture Control, then the GUI may show Top categories or other interesting lists. This may map to the workload list described below. In this embodiment, the Top 10 lists by Asset Type, by Region, and by Category are shown.

Figure 44:
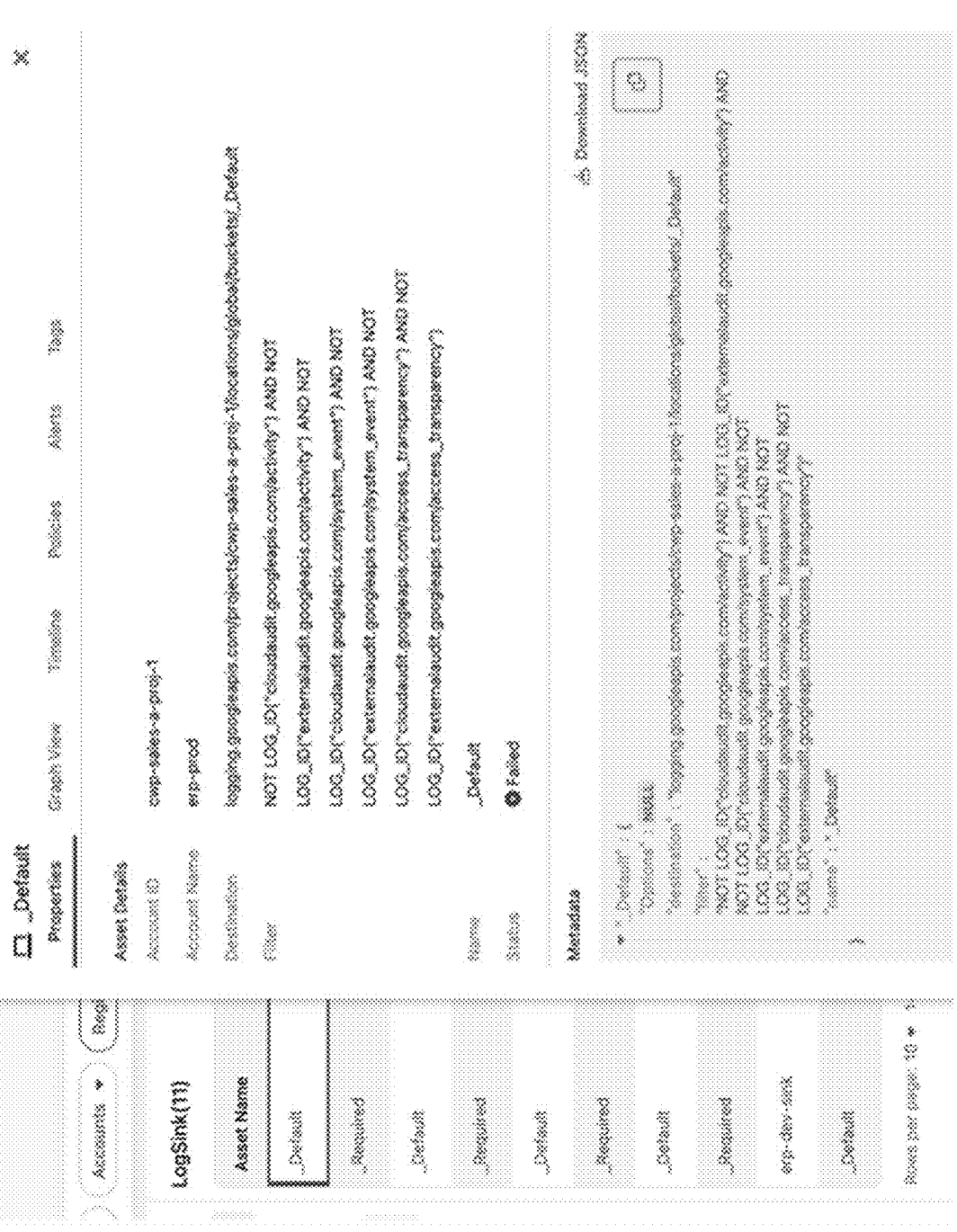

FIG. 44 is a screenshot of a GUI showing another phase, where cloud asset list (e.g., how the workloads factor in) may be shown. This may include default columns, such as Asset name, Asset type, Risk Level, Alerts, etc. The asset factors may be stored in container registries and workloads. The GUI can show a "card" when the user clicks on a cloud asset, for example. The GUI may be enriched with the contributing factors and store additional data sets. For example, the systems may 1) parse subdomains of attack surface report to find and report on specific VPN vulnerabilities, 2) add additional attributes to external attack surface contributing factors, what we already leverage, and what our competitors show 3) enrich various factors (e.g., infected clients, dataloss events, exposed servers) with geo-IP data so this can be stored and displayed on map 4) explore additional angles for data sources (e.g. Posture Control, Deception, other sources)

FIG. 45 is a screenshot of a GUI showing Financial Risk. The GUI, like other GUIs described in the present disclosure, may include multiple visual sections. In this embodiment, the GUI includes a first section that shows a Financial Summary, a second section that shows a Loss Curve, and a third section that shows the Top 10 Financial Contributing Factors. Thus, it may be noted here as well as in other GUIs described throughout the present disclosure that the multiple sections may include any suitable type of risk information exhibited in any suitable format. The risk information may include risk score information, trends, comparisons with peers, etc. The data may be shown in a list, displayed on a graph, chart, etc., and/or presented in any other suitable fashion. Each section may also include links to additional information, whereby a user can click on the links to access additional information.

It should also be noted that many of the GUIs shown in the present disclosure may include a menu (e.g., ribbon) having multiple options, which can also be used for drilling down to a lower-level view. In the example of FIG. 45, a ribbon menu is displayed on the left side of the page and may include multiple icons that the user may select. The GUI in this case includes a menu with selections for various views accessed by various buttons, such as a Dashboard (or Home) button, a Factors button, an Insights button, a Financial Risks button, a Resilience Risk button, a Reports button, an Administration button, and an Alerts button. In the GUI shown in FIG. 45, the Financial Risks button has been selected to show the Financial Risk information.

Figure 46:
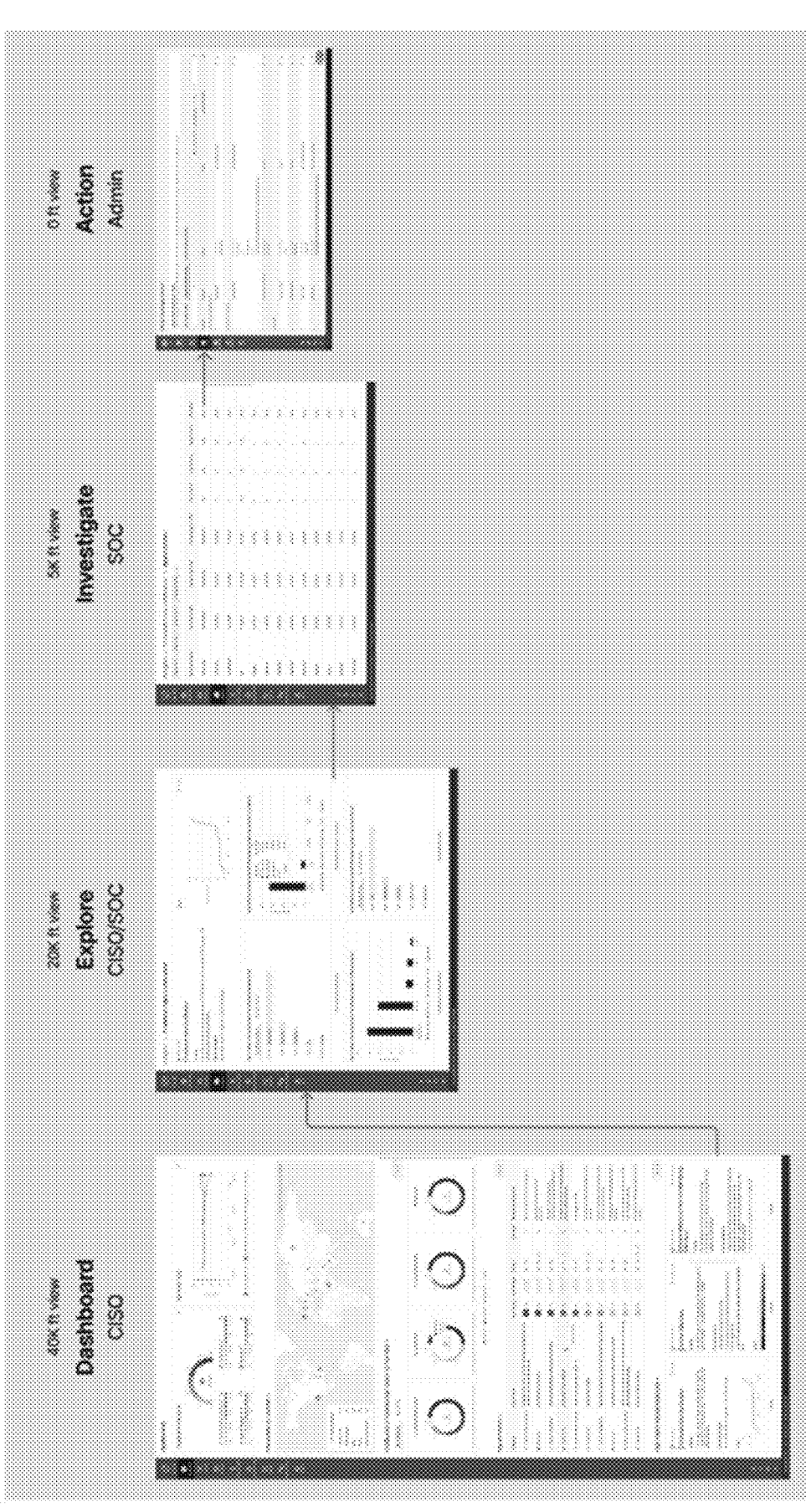

FIG. 46 is a diagram showing an example of a set of GUIs corresponding to different view levels and a strategy for allowing a user to move from a high level view to a lower level view. Going from left to right (as shown on the page), the systems may be configured to first present a first GUI having a highest-level view of the risk information. This may be referred to as a "40k ft view" or "Dashboard" view. The user may then make a selection that will bring up a next lower view, referred to here as a "20k ft view" or "Explore" view. Next, the user may further drill down to the next lower level, which may be referred to as a "5k ft view" or "Investigate" view. Moreover, the user can drill down even further to what is referred to as a "0 ft view" or "Action" view.

Figure 47:

FIG. 47 is a screenshot of a GUI showing 40k ft view shown in FIG. 46. This may also be shown when the user clicks on or otherwise selects the Dashboard in the ribbon menu on the left side of the GUI. In this view, the GUI includes an Organization Risk Score section, a Risk Score Trend section, a Risk Events by Location section, a Distribution of Contributing Factors to Your Risk section, a Top 10 Factors section, and a High Impact Recommendations section. It should be understood that other arrangements, number of sections, types of sections, etc. may include alternative features that may be conceived having an understanding of the present disclosure. Some sections in this example show graphs, charts, maps, etc., while others include lists, statistics, etc.

Also, according to various embodiments of the present disclosure, the High Impact Recommendations section includes a number of "cards." Each card in this example includes a type of risk (e.g., "data loss," "compromise," etc.), an age (e.g., "Today") of the detected risk issue, a title (e.g., "Potential Data Exfiltration," "Active Infections," etc.), a problem, and a recommendation. Some cards may further include graphs or charts. Also, the cards may further include an "Explore" selection allowing the user to gain additional information about the particular risk described in the respective card.

Figure 48:

FIG. 48 is a screenshot of a GUI showing Insights, which may be presented when the Insights button is selected from the ribbon menu. The Insights may be related to known vulnerabilities in the organization. Again, the GUI shows multiple sections, which may include cards, maps, graphs, charts, etc.

Figure 49:

FIG. 49 is a screenshot of a GUI showing a view when the user selected the "Factors" button from the ribbon menu or via another suitable path. The GUI in this example shown the Contributing Factors to Organizational Risk Score. The user may select from one of the four risk indices (i.e., External Attack Surface, Compromise, Lateral Propagation, and Data Loss). This GUI shows the names of various factors, their category, a score associated with the factor, a trend over a certain time period (e.g., over the last 30 days), entities involved, whether or not there is a license, recommended actions to mitigate the risk, and an override switch. At the top right corner, the GUI includes a switch that can toggle between a list view (as shown in FIG. 49) and a tree view (as shown in FIG. 51).

Figure 50:
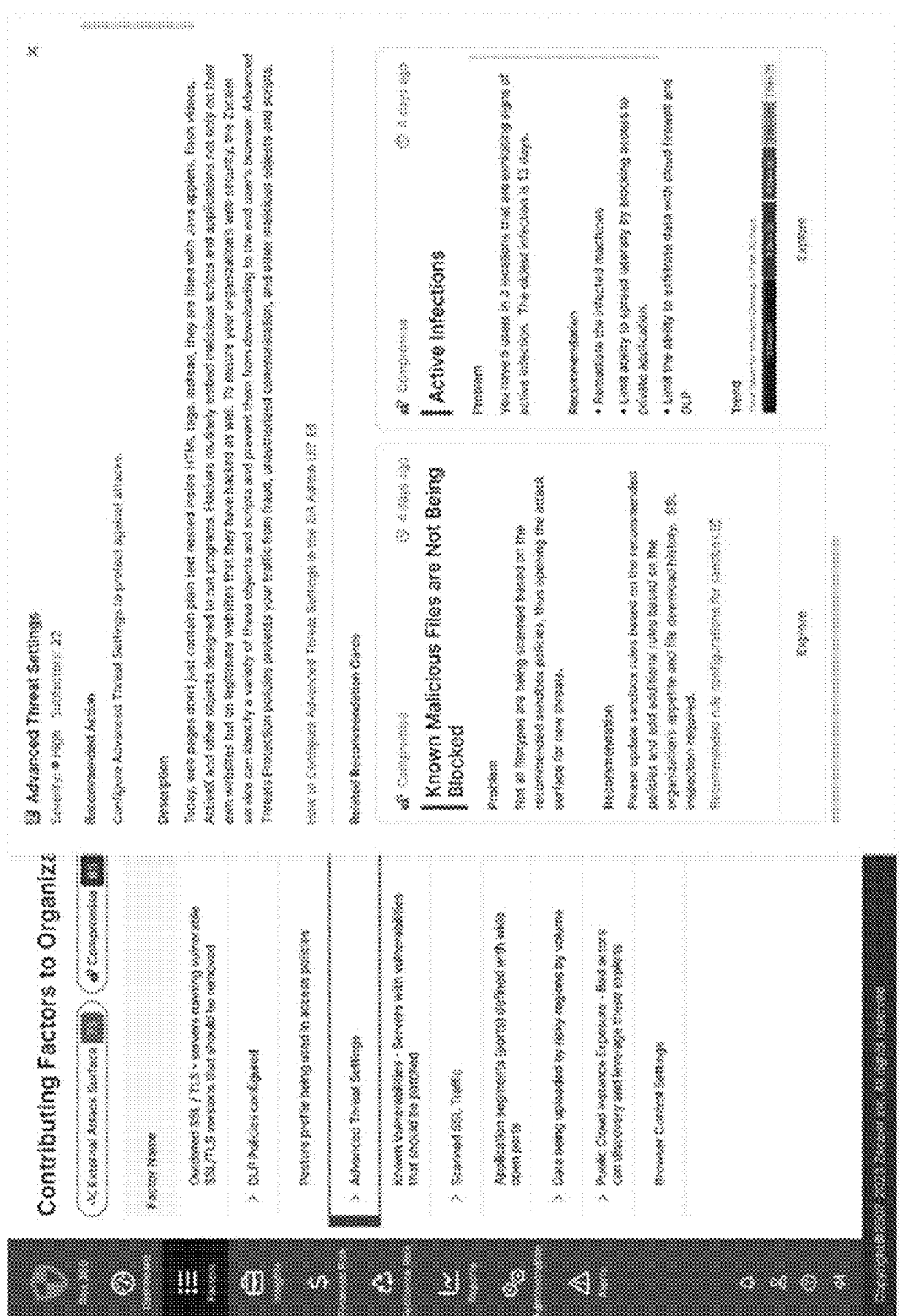

FIG. 50 is a screenshot of a GUI showing the GUI of FIG. 49 whereby the user has selected an Advanced Threat Settings icon from the factor name column. In this respect, the GUI may be configured to display a "drawer" or another suitable box or window that may be superimposed over the prior GUI. If the Advanced Threat Settings icon is selected, the drawer in this embodiment shows a frame having a first section that includes a Recommended Action and Description. Also, the frame includes Related Recommendation Cards. The cards in this section may include the same information as described with respect to other cards, where they may be defined with a type of risk (e.g., "Compromise"), age (e.g., "4 days ago"), title, problem, recommendation, and an additional information button (e.g., "Explore").

Figure 51:
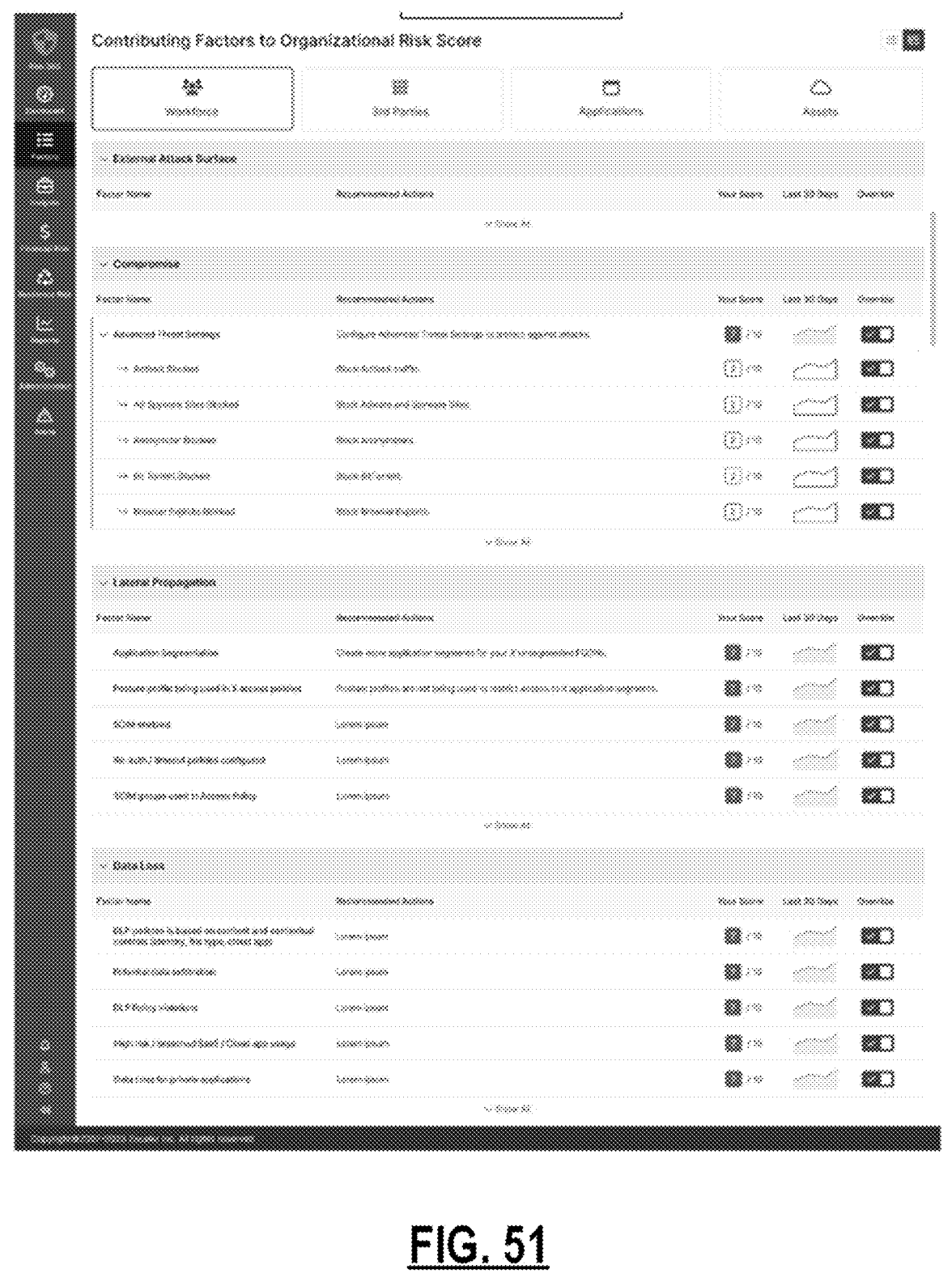

FIG. 51 is a screenshot of a GUI showing the Contributing Factors to Organizational Risk Score (similar to the page shown in FIG. 49), whereby the tree view is selected in the toggle switch in the upper righthand corner. In the tree view, the four entities (e.g., Workforce (or users), $3^{rd}$ Parties, Applications, and Assets) are selectable at the top of the GUI. In this example, the Workforce is selected. The GUI shows four sections related to the four indices (e.g., External Attack Surface, Compromise, Lateral Propagation, and Data Loss). Each section can be expanded as needed. Items under each heading may include factor names, and corresponding recommended actions, along with other information, such as score, trend, and override button.

Figure 52:
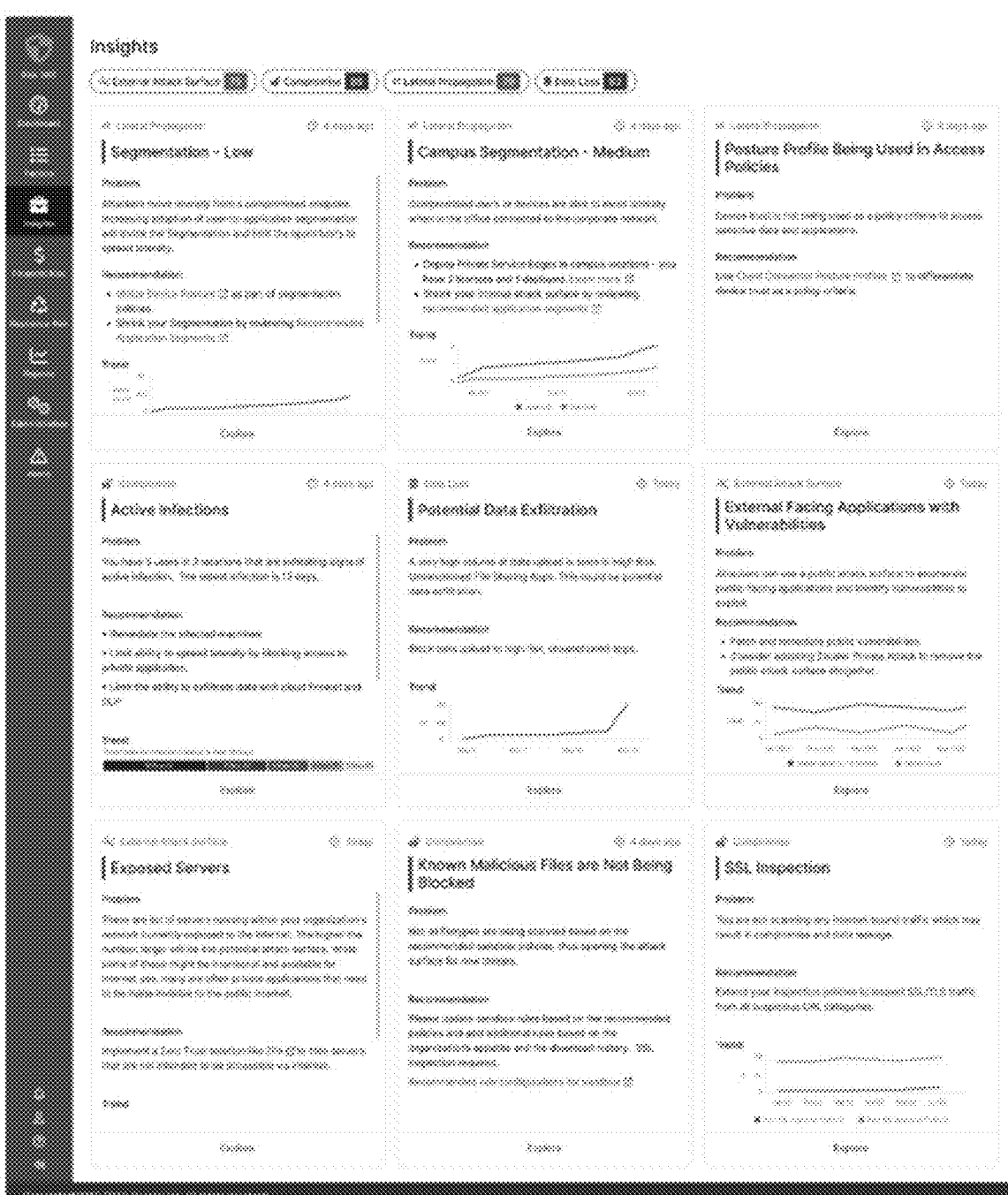

FIG. 52 is a screenshot of a GUI showing another example of the Insights button being selected to open the Insights screen. In this example, the Insights GUI may include a plurality of cards, where nine cards are shown in this case. The cards can be ordered according to any suitable priority technique, such as listing the more significant risk issue near the top and/or farther to the left. Again, the cards may each include a risk index, when the risk was detected, a title, a problem (or issue), recommended action, and a "see more" option (e.g., "Explore").

Figure 53:
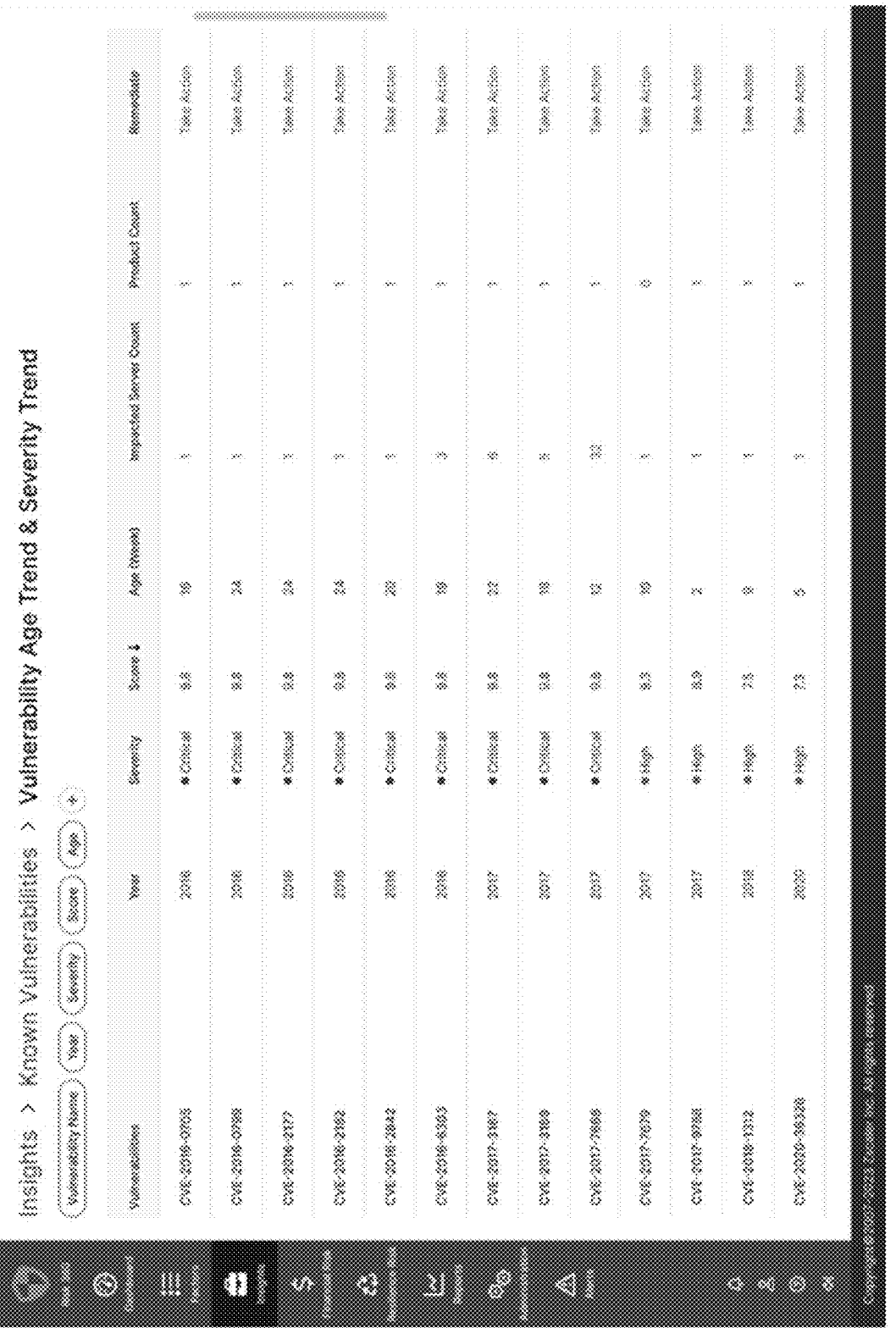

FIG. 53 is a screenshot of a GUI showing Insights>Known Vulnerabilities>Vulnerability Age Trend & Severity Trend. This may allow the user to investigate known significant (e.g., "critical") vulnerabilities of the organization over a past time period and the opportunity to take action and remediate the issues.

§ 13.6 Risk Analysis Method

FIG. 54 is a flow diagram illustrating an embodiment of a method 970 for analyzing or assessing risk and using the risk data obtained during this test to exhibit rich, informative features of risk to a user device to enable the selection of remediation efforts to reduce risk. As shown in FIG. 54, the method 970 includes the step of detecting one or more cybersecurity risk factors associated with an organization to determine a risk posture of the organization, as illustrated in block 972. The method 970 also includes the step of attaining one or more remediation recommendations for enabling a person associated with the organization to select one or more actions for mitigating the one or more cybersecurity risk factors and improving the risk posture of the organization, as indicated in block 974. Also, the method 970 includes the step of communicating display information to a user device associated with the organization, as indicated in block 976. For example, the display information includes at least the one or more cybersecurity risk factors and the one or more remediation recommendations to be exhibited on a Graphical User Interface (GUI) of the user device.

In some embodiments, the method 970 may further include the step of prioritizing the display information to cause the GUI to exhibit a prioritized list of a plurality of remediation recommendations. The step of communicating the display information (block 976) may include the step of causing the GUI of the user device to exhibit a high-level view of the display information on a general dashboard and enabling the person to drill down to view one or more lower-level views exhibiting the display information in greater detail. Also, the step of communicating the display information (block 976) may include the step of customizing the display information based on responsibilities that are assigned to the person associated with the organization. The person associated with the organization, for instance, may be a technician, an Information Technology (IT) professional, a Chief Information Officer (CIO), a Chief Information Security Officer (CISO), an administrator, or a security operator.

The method 970, according to some implementations, may further include the steps of a) computing a risk score from the one or more cybersecurity risk factors, and b) causing the GUI of the user device to display the risk score. In some cases, the method 970 may include the steps of a) computing a first risk component related to an External Attack Surface risk of the organization, a second risk component related to a Security Compromise risk of the organization, a third risk component related to a Lateral Propagation risk of the organization, and a fourth risk component related to a Data Loss risk of the organization, and b) causing the GUI of the user device to display the first risk component, the second risk component, the third risk component, and the fourth risk component.

The GUI described herein may be configured to exhibit one or more of a risk score trend, a map showing locations of risk events, and/or information regarding one or more comparisons with peers of the organization. The GUI may be configured to enable the person to select a view showing one or more cards, wherein each card may include a) risk index information, b) detection time information, c) a title of a risk event, d) a problem associated with the risk event, and/or e) recommendation action information for resolving the problem.

The step of communicating the display information (block 976) may also include the step of enabling the person to select an entity category among a plurality of entity categories related to the organization, the entity categories including a user workforce, third party actors, applications, and assets. The GUI, for example, may include a first section configured to exhibit information related to the one or more cybersecurity risk factors, a second section configured to exhibit information related to the one or more remediation recommendations, and one or more additional sections configured to exhibit other information related to risks, risk levels, risky users, trends, graphs, maps, most significant asset types, most significant regions, most significant categories, most significant contributing factors to financial risk, cyber insurance information, high impact risk mitigation recommendations, and/or insights regarding known vulnerabilities.

§ 14.0 CONCLUSION

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer-readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a Read-Only Memory (ROM), a Programmable Read-Only Memory (PROM), an Erasable Programmable Read-Only Memory (EPROM), an Electrically Erasable Programmable Read-Only Memory (EEPROM), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

The foregoing sections include headers for various embodiments and those skilled in the art will appreciate these various embodiments may be used in combination with one another as well as individually. Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. The foregoing sections may include headers for various embodiments and those skilled in the art will appreciate these various embodiments may be used in combination with one another as well as individually. Further, it is noted that the various elements, operations, steps, methods, processes, algorithms, functions, techniques, etc. described herein can be used in any and all combinations with one another.

What is claimed is:

1. A method comprising the steps of:
detecting one or more cybersecurity risk factors associated with an organization to determine a risk posture of the organization, wherein the detecting includes inline monitoring of encrypted and unencrypted traffic through a cloud-based security system comprising a plurality of distributed enforcement nodes coordinated by a central authority, and wherein the detecting further includes analyzing policy configurations, license status, and traffic attributes of the organization t derive multiple risk components;
attaining one or more remediation recommendations for enabling a person associated with the organization to select one or more actions for mitigating the one or more cybersecurity risk factors and improving the risk posture of the organization, wherein the attaining includes computing a dynamic risk score from the multiple risk components, the multiple risk components comprising at least an external attack surface component, a compromise likelihood component, a lateral propagation component, and a data loss component; and
communicating display information to a user device associated with the organization, the display information including at least the one or more cybersecurity risk factors and the one or more remediation recommendations to be exhibited on a Graphical User Interface (GUI) of the user device, wherein the communicating causes the GUI to exhibit a multi-level risk visualization including a high-level dashboard view showing an overall dynamic risk score and risk score trend, and enabling drill-down exploration into contributing factors, entity-specific risk, and prioritized remediation recommendations.

2. The method of claim 1, further comprising the step of prioritizing the display information, based at least in part on the dynamic risk score or one or more of the risk components, to cause the GUI to exhibit a prioritized list of a plurality of remediation recommendations.

3. The method of claim 1, wherein the step of communicating the display information includes the step of causing the GUI of the user device to exhibit the multi-level visualization including a high-level dashboard view of the dynamic risk score, an intermediate "explore" view of contributing factors and a lower-level "investigate" view showing detailed events and remediation actions.

4. The method of claim 1, wherein the step of communicating the display information includes the step of customizing the display information based on responsibilities that are assigned to the person associated with the organization.

5. The method of claim 4, wherein the person associated with the organization is a technician, an Information Technology (IT) professional, a Chief Information Officer (CIO), a Chief Information Security Officer (CISO), an administrator, or a security operator.

6. The method of claim 1, wherein the dynamic risk score is recalculated periodically based on inline traffic logs collected at the enforcement nodes and updated in the GUI in substantially real time to reflect changes in the organization's network activity.

7. The method of claim 1, wherein the GUI displays the dynamic risk score and associated risk components in respective graphical panels comprising at least one of a line graph showing temporal trends, a heat map illustrating severity distribution, or a geographic map showing locations of associated risk events.

8. The method of claim 1, wherein the GUI is configured to exhibit one or more of a risk score trend, a map showing locations of risk events, and information regarding one or more comparisons with peers of the organization.

9. The method of claim 1, wherein the GUI is configured to enable the person to select a view showing one or more cards, wherein each card includes one or more of risk index information, detection time information, a title of a risk event, a problem associated with the risk event, and recommendation action information for resolving the problem.

10. The method of claim 1, wherein the step of communicating the display information includes the step of enabling the person to select an entity category among a plurality of entity categories related to the organization, the plurality of entity categories including a user workforce, third party actors, applications, and assets.

11. The method of claim 1, wherein the GUI includes a first section configured to exhibit information related to the one or more cybersecurity risk factors, a second section configured to exhibit information related to the one or more remediation recommendations, and one or more additional sections configured to exhibit other information related to one or more of risks, risk levels, risky users, trends, graphs, maps, most significant asset types, most significant regions, most significant categories, most significant contributing factors to financial risk, cyber insurance information, high impact risk mitigation recommendations, and insights regarding known vulnerabilities.

12. A cloud-based system comprising a processing device, a memory device, and a network interface configured for communication with a user device associated with an enterprise, the memory device storing a risk assessment tool having instructions that, when executed, enable the processing device to:

detect one or more cybersecurity risk factors associated with the enterprise to determine a risk posture of the enterprise, wherein the one or more cybersecurity risk factors are detected via inline monitoring of encrypted and unencrypted traffic through a cloud-based security system comprising a plurality of distributed enforcement nodes coordinated by a central authority, and wherein the detecting further includes analyzing policy configurations, license status and traffic attributes of the organization to derive multiple risk components;

attain one or more remediation recommendations for enabling a person associated with the enterprise to select one or more actions for mitigating the one or more cybersecurity risk factors and improving the risk posture of the enterprise, wherein the one or more remediation recommendations are attached by computing a dynamic risk score from the multiple risk components, the multiple risk components comprising at least an external attack surface component, a compromise likelihood component, a lateral propagation component, and a data loss component; and communicate display information via the network interface to the user device, the display information including at least the one or more cybersecurity risk factors and the one or more remediation recommendations to be exhibited on a Graphical User Interface (GUI) of the user device, wherein the display information is communicated causing the GUI to exhibit a multi-level risk visualization including a high-level dashboard view showing an overall dynamic risk score and risk score trend, and enabling drill-down exploration into contributing factors, entity-specific risk, and prioritized remediation recommendations.

13. The cloud-based system of claim 12, wherein the instructions further enable the processing device to prioritize the display information, based at least in part on the dynamic risk score or one or more of the risk components, to cause the GUI to exhibit a prioritized list of a plurality of remediation recommendations.

14. The cloud-based system of claim 12, wherein communicating the display information includes enabling the processing device to cause the GUI of the user device to exhibit the multi-level visualization including a high-level dashboard view of the dynamic risk score, an intermediate "explore" view of contributing factors, and a lower-level "investigate" view showing detailed events and remediation actions.

15. The cloud-based system of claim 12, wherein communicating the display information includes enabling the processing device to customize the display information based on responsibilities that are assigned to the person associated with the enterprise, wherein the person associated with the enterprise is a technician, an Information Technology (IT) professional, a Chief Information Officer (CIO), a Chief Information Security Officer (CISO), an administrator, or a security operator.

16. The cloud-based system of claim 12, wherein the GUI displays the dynamic risk score and associated risk components in respective graphical panels comprising at least one of a line graph showing temporal trends, a heat map illustrating severity distribution, or a geographic map showing locations of associated risk events.

17. A non-transitory computer-readable medium configured to store a risk assessment tool having computing logic that enables one or more processing devices to:

detect one or more cybersecurity risk factors associated with an organization to determine a risk posture of the organization, wherein the one or more cybersecurity risk factors are detected via inline monitoring of encrypted and unencrypted traffic through a cloud-based security system comprising a plurality of distributed enforcement nodes coordinated by a central authority, and wherein the detecting further includes analyzing policy configurations, license status, and traffic attributes of the organization to derive multiple risk components;

attain one or more remediation recommendations for enabling a person associated with the organization to select one or more actions for mitigating the one or more cybersecurity risk factors and improving the risk posture of the organization, wherein the one or more remediation recommendations are attached by computing a dynamic risk score from the multiple risk components, the multiple risk components comprising at least an external attack surface component, a compromise likelihood component, a lateral propagation component, and a data loss component; and communicate display information to a user device associated with the organization, the display information including at least the one or more cybersecurity risk factors and the one or more remediation recommendations to be exhibited on a Graphical User Interface (GUI) of the user device, wherein the display information is communicated causing the GUI to exhibit a multi-level risk visualization including a high-level dashboard view showing an overall dynamic risk score and risk score trend, and enabling drill-down exploration into contributing factors, entity-specific risk, and prioritized remediation recommendations.

18. The non-transitory computer-readable medium of claim 17, wherein the GUI is configured to enable the person to select a view showing one or more cards, wherein each card includes one or more of risk index information, detection time information, a title of a risk event, a problem associated with the risk event, and recommendation action information for resolving the problem.

19. The non-transitory computer-readable medium of claim 17, wherein communicating the display information includes an action of enabling the person to select an entity category among a plurality of entity categories related to the organization, the entity categories including a user workforce, third party actors, applications, and assets.

20. The non-transitory computer-readable medium of claim 17, wherein the GUI includes a first section configured to exhibit information related to the one or more cybersecurity risk factors, a second section configured to exhibit information related to the one or more remediation recommendations, and one or more additional sections configured to exhibit other information related to one or more of risks, risk levels, risky users, trends, graphs, maps, most significant asset types, most significant regions, most significant categories, most significant contributing factors to financial risk, cyber insurance information, high impact risk mitigation recommendations, and insights regarding known vulnerabilities.

* * * * *